US012062114B2

(12) United States Patent
Wiesel et al.

(10) Patent No.: US 12,062,114 B2
(45) Date of Patent: **\*Aug. 13, 2024**

(54) METHOD, SYSTEM, AND DEVICE OF VIRTUAL DRESSING UTILIZING IMAGE PROCESSING, MACHINE LEARNING, AND COMPUTER VISION

(71) Applicant: WALMART APOLLO, LLC, Bentonville, AR (US)

(72) Inventors: Yael Wiesel, Ramat Gan (IL); Nir Appleboim, Tel Aviv (IL); Alon Kristal, Tel Aviv (IL)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/578,404

(22) Filed: Jan. 18, 2022

(65) Prior Publication Data

US 2022/0138250 A1    May 5, 2022

Related U.S. Application Data

(63) Continuation of application No. 16/693,548, filed on Nov. 25, 2019, now Pat. No. 11,227,008, which is a
(Continued)

(51) Int. Cl.
*G06T 11/00* (2006.01)
*G06F 16/538* (2019.01)
(Continued)

(52) U.S. Cl.
CPC ............ *G06T 11/00* (2013.01); *G06F 16/538* (2019.01); *G06F 16/583* (2019.01); *G06N 20/00* (2019.01); *G06T 7/11* (2017.01); *G06T 7/194* (2017.01); *G06T 19/00* (2013.01); *G06V 40/10* (2022.01); *G06N 7/01* (2023.01); *G06N 20/10* (2019.01)

(58) Field of Classification Search
CPC . G06T 11/00; G06T 7/11; G06T 7/194; G06T 19/00; G06F 16/538; G06F 16/583; G06N 20/00; G06N 7/01; G06N 20/10; G06V 40/10

See application file for complete search history.

(56) References Cited

U.S. PATENT DOCUMENTS 5,960,411 A   9/1999 Hartman et al.
6,307,568 B1  10/2001 Rom
(Continued)

OTHER PUBLICATIONS

Wikipedia, "Polyvore" Feb. 2007 (4 pages) Feb. 2007.
(Continued)

*Primary Examiner* — YuJang Tswei
(74) *Attorney, Agent, or Firm* — BRYAN CAVE LEIGHTON PAISNER LLP

(57) ABSTRACT

A computerized method, system and computer program product may comprise: generating or receiving a search result in response to a user query by a user that searches for an item, the search result depicting the item; and modifying the search result by generating a combination image that depicts user-defined subject matter engaging with the item. The present invention may provide other and/or additional benefits or advantages.

20 Claims, 48 Drawing Sheets

Related U.S. Application Data continuation-in-part of application No. 16/657,121, filed on Oct. 18, 2019, now Pat. No. 10,740,941, which is a continuation of application No. 16/279,558, filed on Feb. 19, 2019, now Pat. No. 10,489,955, said application No. 16/693,548 is a continuation of application No. 16/158,313, filed on Oct. 12, 2018, now Pat. No. 10,534,809, which is a continuation-in-part of application No. PCT/IL2017/050829, filed on Jul. 24, 2017, and a continuation-in-part of application No. 15/263,034, filed on Sep. 12, 2016, now Pat. No. 10,290,136, said application No. 16/279,558 is a continuation of application No. 15/263,034, filed on Sep. 12, 2016, now Pat. No. 10,290,136.

(60) Provisional application No. 62/571,889, filed on Oct. 13, 2017, provisional application No. 62/482,195, filed on Apr. 6, 2017, provisional application No. 62/372,813, filed on Aug. 10, 2016.

(51) Int. Cl.

| | | |
|---|---|---|
| *G06F 16/583* | (2019.01) | |
| *G06N 7/01* | (2023.01) | |
| *G06N 20/00* | (2019.01) | |
| *G06N 20/10* | (2019.01) | |
| *G06T 7/11* | (2017.01) | |
| *G06T 7/194* | (2017.01) | |
| *G06T 19/00* | (2011.01) | |
| *G06V 40/10* | (2022.01) | |

(56) References Cited

U.S. PATENT DOCUMENTS

| | | | |
|---|---|---|---|
| 6,556,222 B1 | 4/2003 | Narayanaswami | |
| 9,063,952 B2 | 6/2015 | Moraleda | |
| 9,470,911 B2 | 10/2016 | Fonte | |
| 10,290,136 B2 | 5/2019 | Kristal et al. | |
| 10,474,670 B1* | 11/2019 | Hoover | G06N 7/01 |
| 10,489,955 B2 | 11/2019 | Kristal et al. | |
| 11,386,601 B2 | 7/2022 | Kristal et al. | |
| 2002/0126132 A1 | 9/2002 | Karatoassos et al. | |
| 2009/0002397 A1 | 1/2009 | Forlines | |
| 2009/0300676 A1 | 12/2009 | Harter, Jr. | |
| 2010/0030578 A1* | 2/2010 | Siddique | H04W 4/00 705/26.1 |
| 2010/0111370 A1 | 5/2010 | Black et al. | |
| 2010/0201682 A1 | 8/2010 | Quan et al. | |
| 2010/0231583 A1 | 9/2010 | Furukawa et al. | |
| 2010/0262616 A1* | 10/2010 | Eskolin | G06F 16/51 705/14.54 |
| 2011/0078055 A1* | 3/2011 | Faribault | G06Q 30/0643 705/27.2 |
| 2011/0234615 A1 | 11/2011 | Hanson | |
| 2012/0306918 A1 | 12/2012 | Suzuki | |
| 2013/0063550 A1 | 3/2013 | Ritchey et al. | |
| 2013/0081083 A1 | 3/2013 | Yu et al. | |
| 2013/0097197 A1 | 4/2013 | Rincover et al. | |
| 2013/0120442 A1* | 5/2013 | Dhawan | G06T 3/0012 382/162 |
| 2013/0215116 A1* | 8/2013 | Siddique | G06Q 20/40 705/26.7 |
| 2013/0339190 A1 | 12/2013 | Yu et al. | |
| 2014/0176565 A1 | 6/2014 | Adeyoola | |
| 2014/0188670 A1 | 7/2014 | Ajala | |
| 2014/0193047 A1* | 7/2014 | Grosz | G06Q 10/10 382/118 |
| 2014/0226900 A1 | 8/2014 | Saban et al. | |
| 2014/0281918 A1* | 9/2014 | Wei | H04L 67/56 715/234 |
| 2014/0314313 A1 | 10/2014 | Kennedy | |
| 2014/0359483 A1* | 12/2014 | Forutanpour | H04L 67/10 715/753 |
| 2015/0026155 A1 | 1/2015 | Martin | |
| 2015/0088970 A1* | 3/2015 | Wei | H04L 67/01 709/203 |
| 2015/0279113 A1 | 10/2015 | Knorr et al. | |
| 2015/0302036 A1* | 10/2015 | Kumar | G06F 16/3325 707/711 |
| 2015/0339348 A1* | 11/2015 | Joo | G06F 16/433 707/722 |
| 2015/0348273 A1 | 12/2015 | Chapiro | |
| 2016/0042233 A1* | 2/2016 | Sen | G06T 19/00 345/633 |
| 2016/0165989 A1 | 6/2016 | Glasgow et al. | |
| 2016/0210602 A1* | 7/2016 | Siddique | G06Q 30/0601 |
| 2018/0047192 A1 | 2/2018 | Kristal et al. | |
| 2020/0118318 A1 | 4/2020 | Kristal et al. | |
| 2021/0090209 A1 | 3/2021 | Appleboim et al. | |

OTHER PUBLICATIONS

McKinsey, R., "Israeli Start-Ups Make Online Shopping Easier," The Times of Israel, http://www.timesofisrael.com/shoes-style-and-startups/, Feb. 18, 2014 (4 pages) Feb. 18, 2014.

Goldenberg, R., "The Google of Fashion," Globes Israel's Business Arena, http://www.globes.co.il/en/article-the-google-of-fashion-1000951381, Jul. 3, 2014 (4 pages) Jul. 3, 2014.

Wolf, J., "Meet the Top Ten Israeli Companies Revolutionizing Fashion Tech," Nocamels Israeli Innovation News, http://nocamels.com/2015/02/israel-fashion-tech/, Feb. 2015 (34 pages) Feb. 2015.

Pajevic, J., "How to Blend an Image into a Background Using Photoshop_Creating a Webstore," Mar. 30, 2016, http://www.creatingawebstore.com (12 pages) Mar. 30, 2016.

Rogge, L., et al., "Garment Replacement in Monocular Video Sequences," 2014, ACM (Year: 2014) (10 pages) 2014.

International Search Report and Written Opinion from Int'l Application No. PCT/IL2017/050829 dated Dec. 7, 2017 (12 pages) Dec. 7, 2017.

Tag Talk, "FaceCake Swivel," Aug. 24, 2011, YouTube.com (Year: 2011) Aug. 24, 2011.

Adriano Oliviera, Guilherme Fickel, Marcelo Walter, Cl'audio Jung, "Selective Hole-Filling for Depth-Image Based Rendering", 2015, ieee (yEAR: 2015) 2015.

* cited by examiner

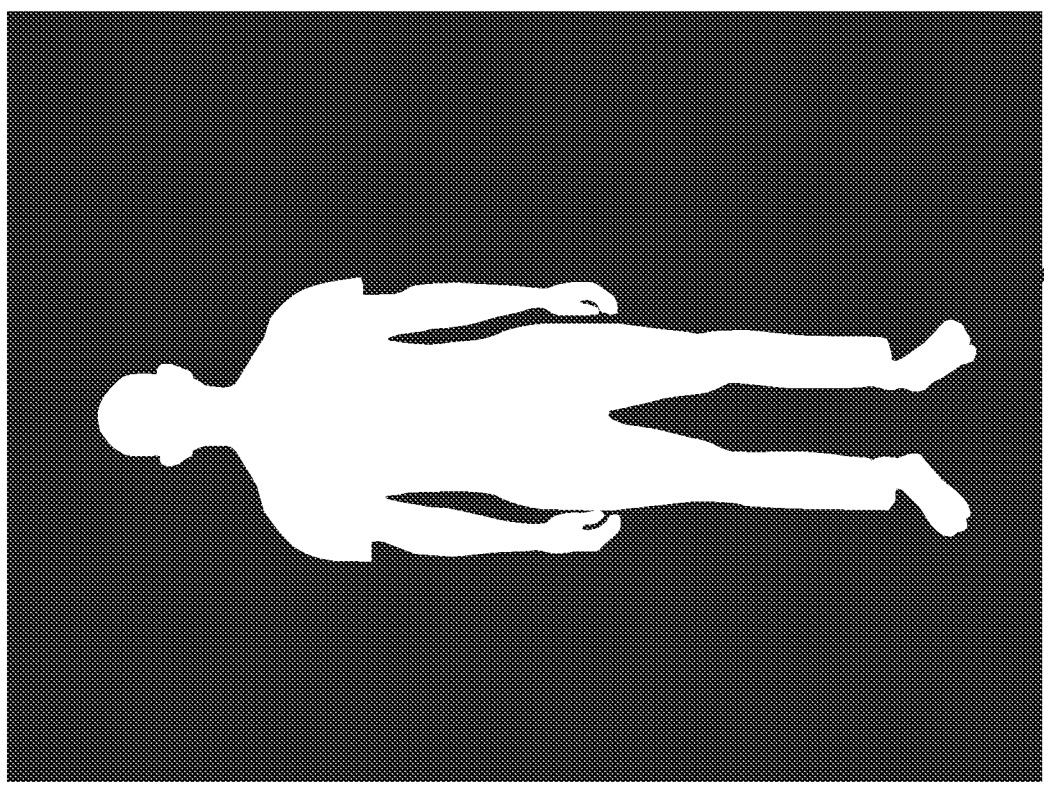
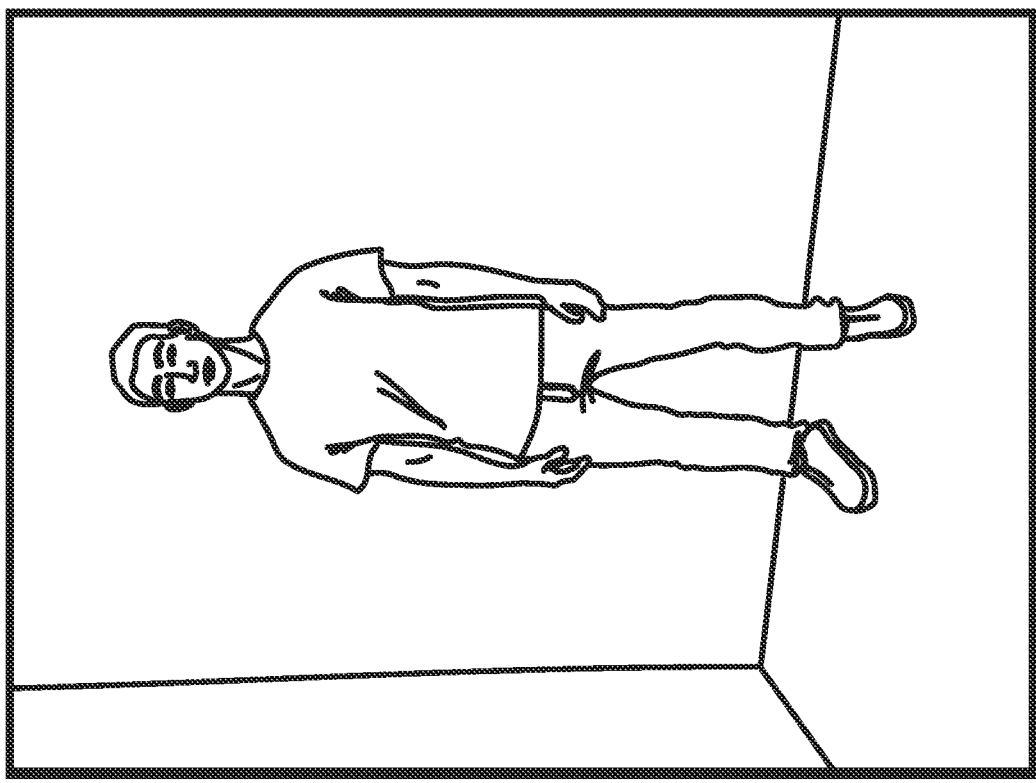
Fig. 8

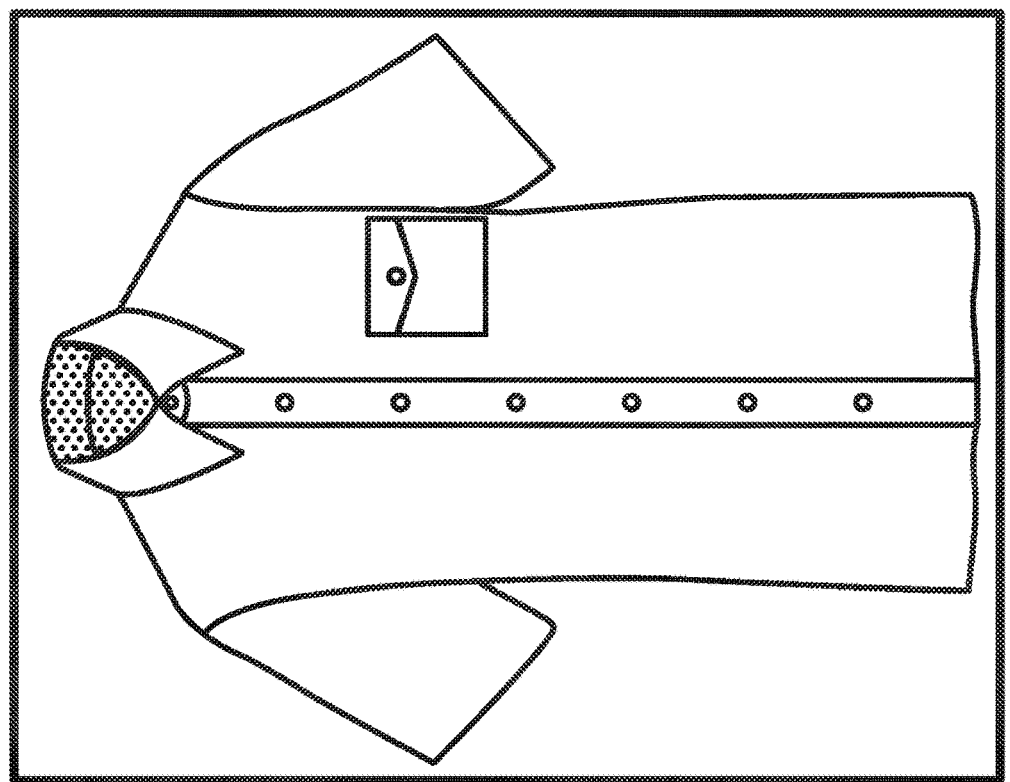
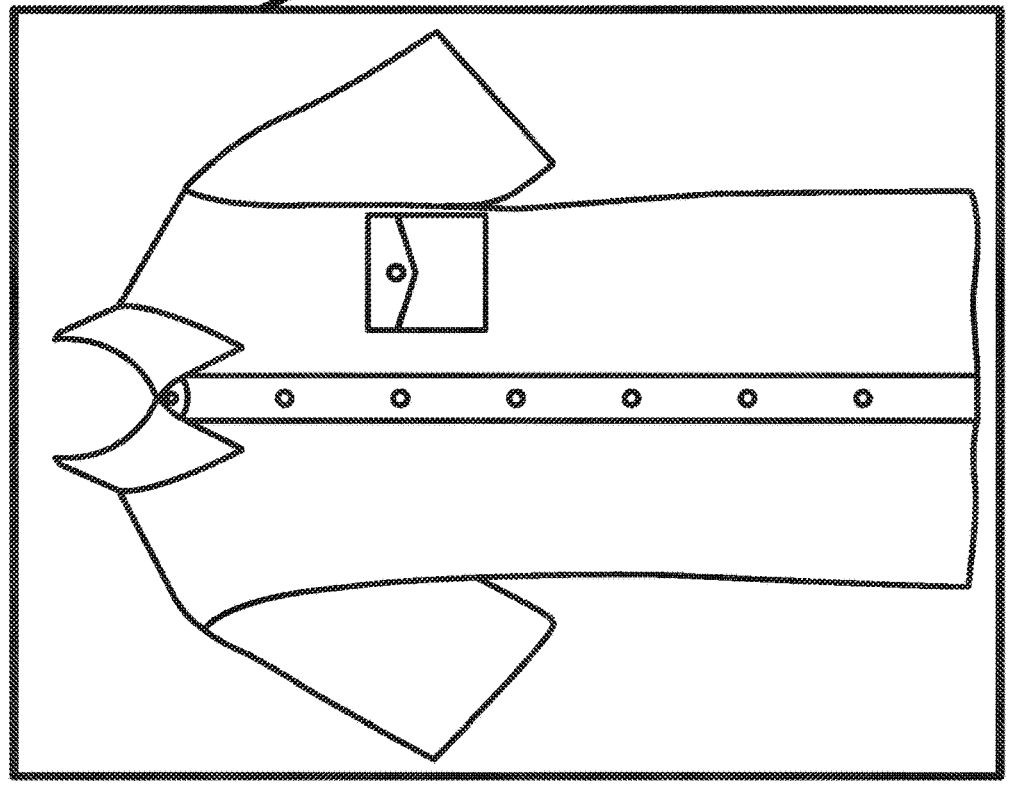
Fig. 11

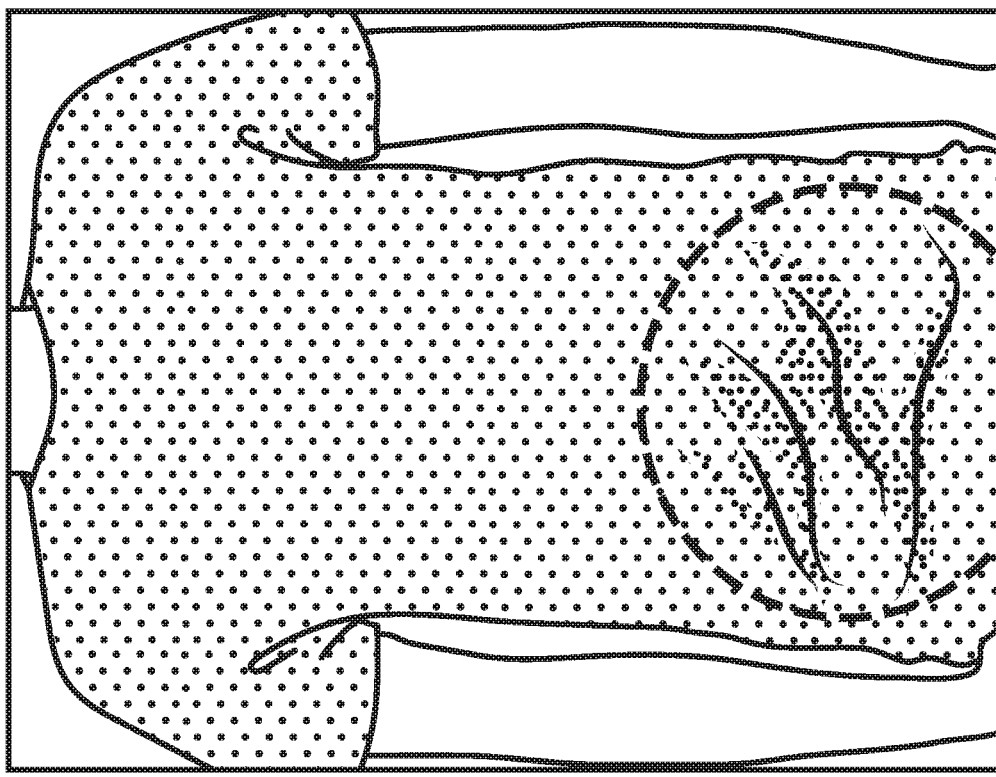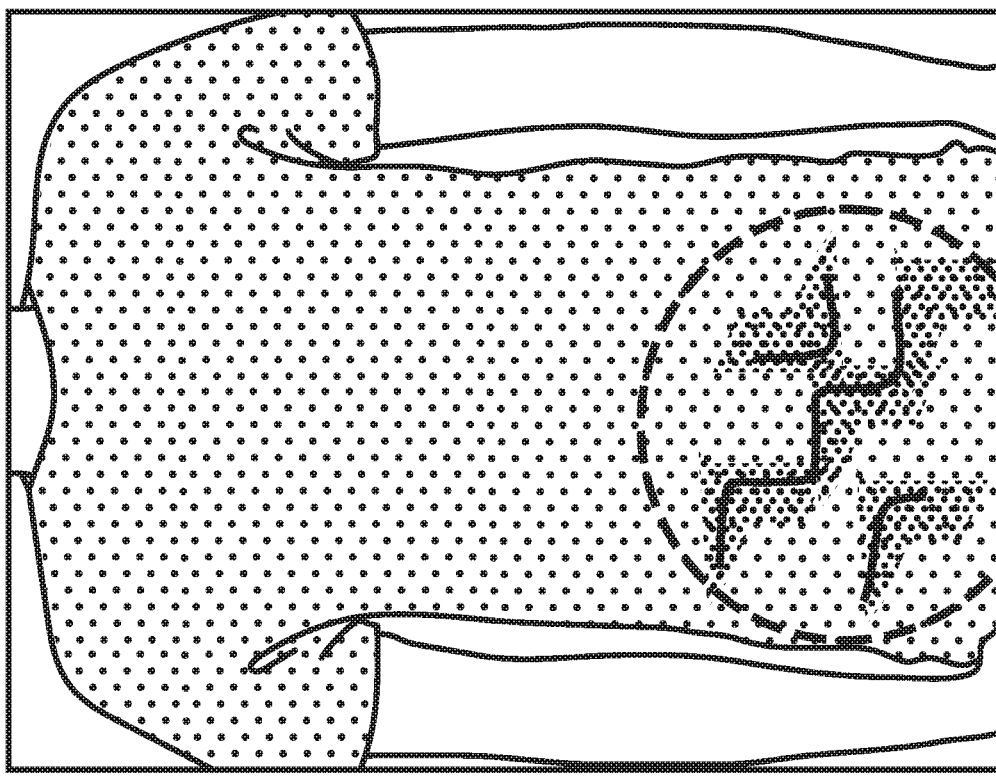
Fig. 12

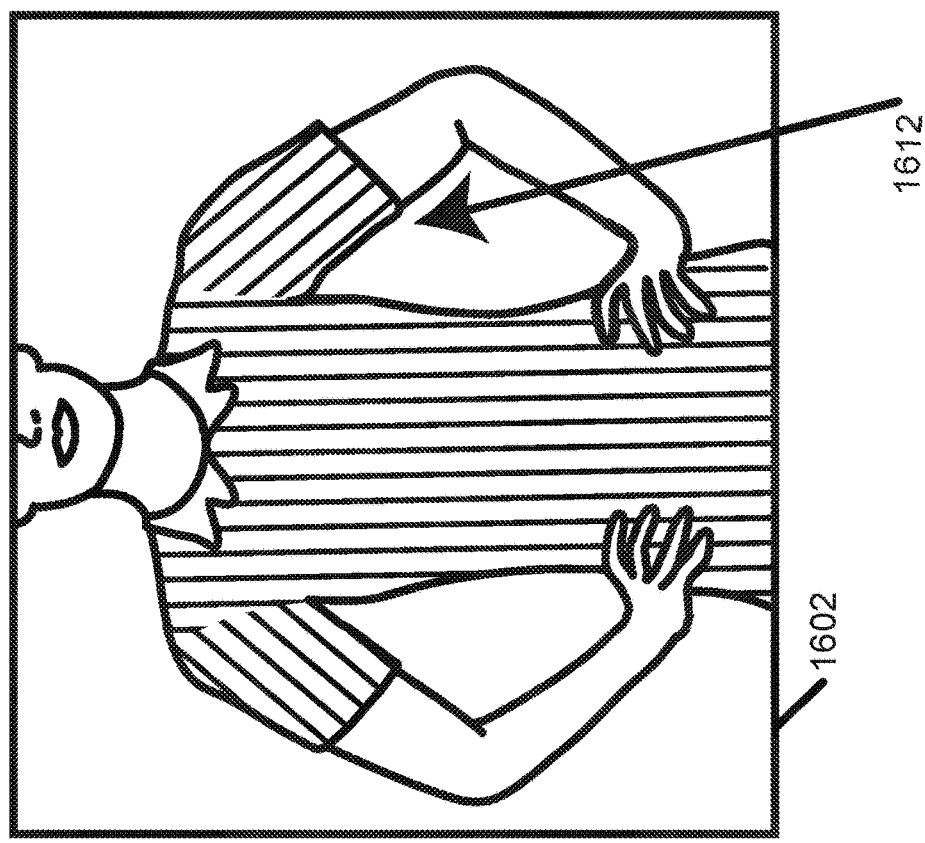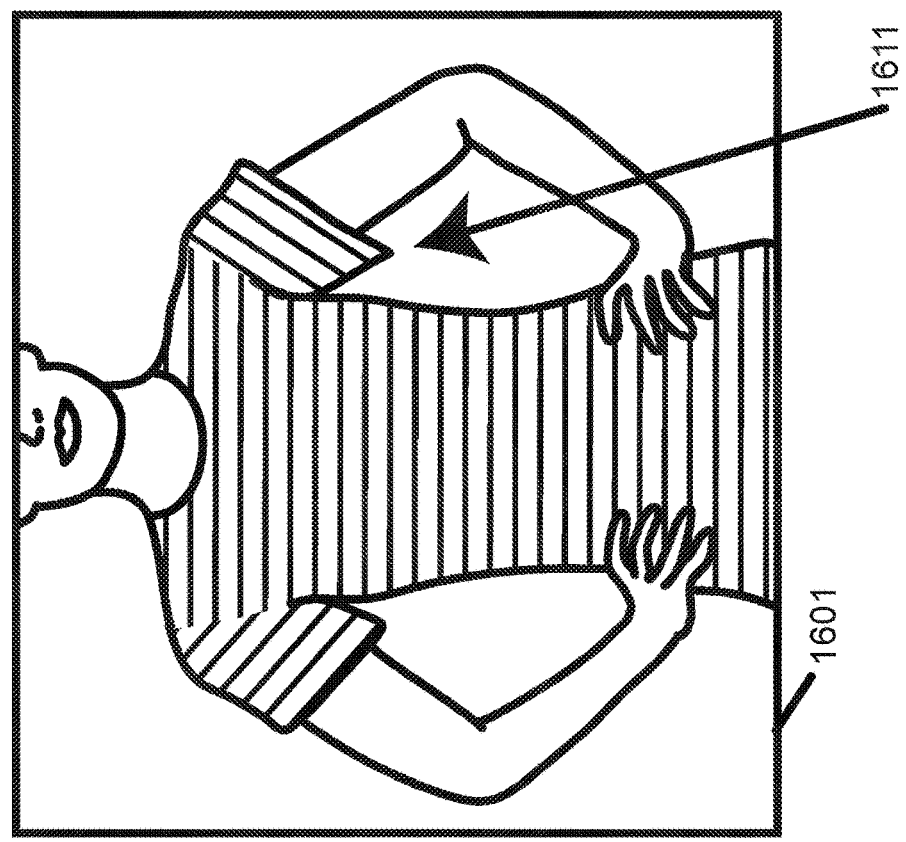
Fig. 16

Marni
Floral print dress

Size:
Best size for you is: 4

Price:
$76 (was $105)

Save

Share

Ask

1 / 5

Buy
(Buy it now from Vendor.com)

Product Description:...     Read More: ...

Shoppers who loved this look also loved:
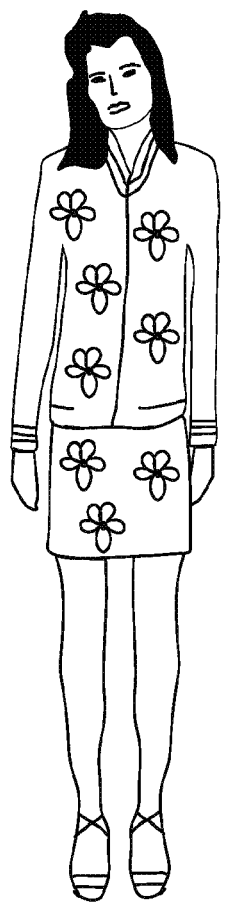 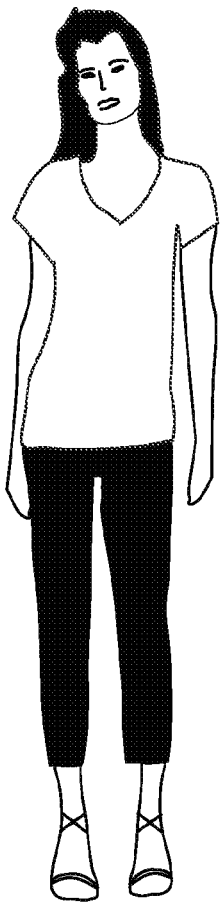 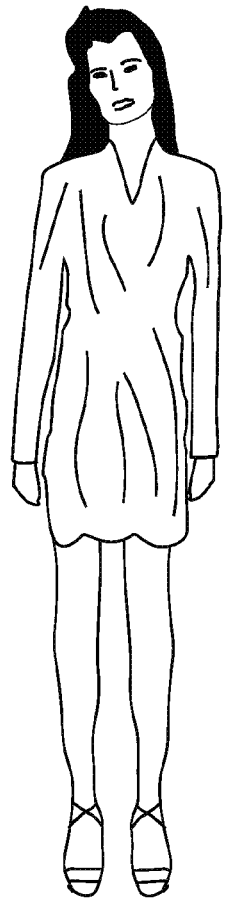
 Home  Search  Favorites  Me
Fig. 39 3900

Fig. 40

Judith            2 hours ago
Brands Manager
Find your weekend style!
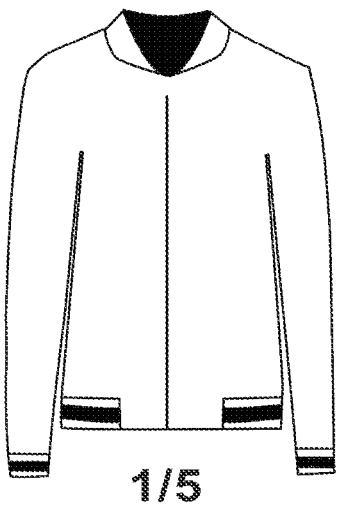
1/5
Love Moschino
Bomber Jacket
Size:
Best size for you is: 4
Price:
$155
[ Save ]  [ Ask ]  [ Share ]
Buy
(Buy it now from Vendor.com)
Product Description:... Read More...
Fig. 43      4003

Zara
Floral Skirt

Size:
Best size for you is: 6

1 / 3

Price:
$89 (was $109)

| Save | Share | Ask |

Buy
(Buy it now from Vendor.com)

Product Description:... Read More: ...

4004

Fig. 45        4005

Wish-List
Judith                               2 hours ago
Brands Manager
Find your weekend style!
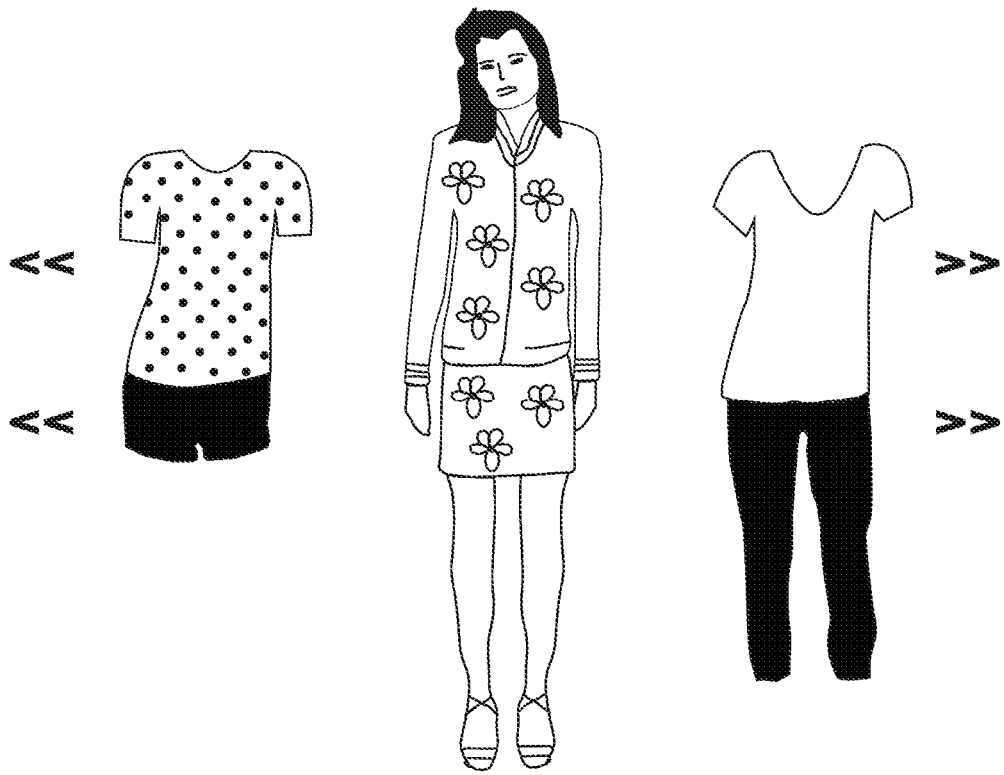
Jacket: Channel Bomber Jacket $155
Skirt: Zara Floral Skirt $88 (was $99)
[Shop]  [Save]  [Ask]
Fig. 46                    4006

Maggy asks:
What should I wear to my office party?
Vote and help me pick the best look!
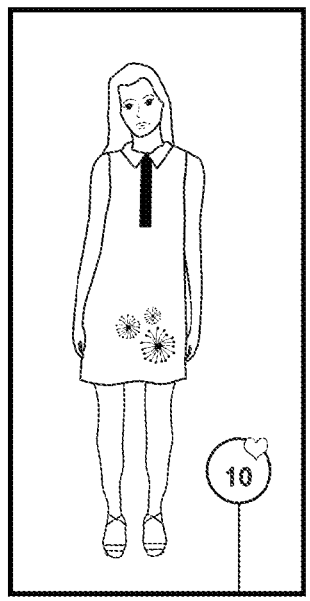
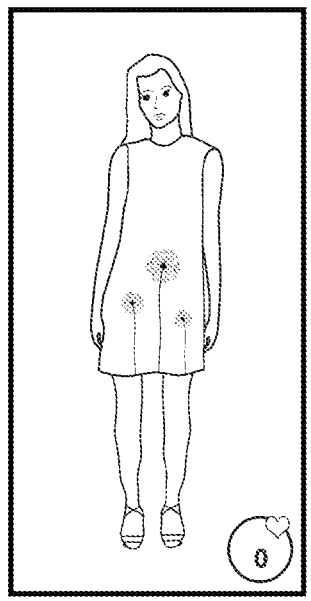
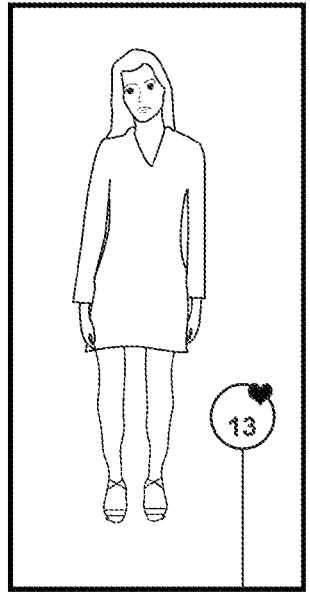
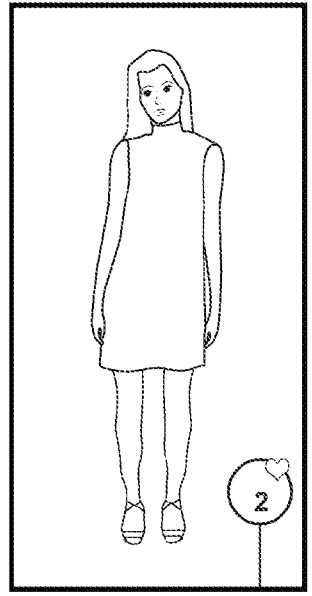
Fig. 48

METHOD, SYSTEM, AND DEVICE OF VIRTUAL DRESSING UTILIZING IMAGE PROCESSING, MACHINE LEARNING, AND COMPUTER VISION

CROSS-REFERENCE TO RELATED APPLICATIONS

This patent application is a Continuation of U.S. Ser. No. 16/693,548, which issues at U.S. patent Ser. No. 11/227,008 on Jan. 18, 2022, which is hereby incorporated by reference in its entirety; which claimed priority and benefit from a Continuation of United States patent application number U.S. Ser. No. 16/158,313, filed on Oct. 12, 2018, which is hereby incorporated by reference in its entirety; which claimed priority and benefit from United States provisional patent application number U.S. Ser. No. 62/571,889, filed on Oct. 13, 2017, which is hereby incorporated by reference in its entirety; and which is a Continuation-in-Part (CIP) of PCT international application number PCT/IL2017/050829, having an International Filing Date of Jul. 24, 2017, published as International Publication number WO 2018/029670 A1, which is hereby incorporated by reference in its entirety; which claimed priority and benefit from both: (i) United States provisional patent application number U.S. Ser. No. 62/372,813, filed on Aug. 10, 2016, which is hereby incorporated by reference in its entirety; and (ii) United States provisional patent application number U.S. Ser. No. 62/482,195, filed on Apr. 6, 2017, which is hereby incorporated by reference in its entirety, and which is a continuation-in-part CIP) of U.S. Ser. No. 15/263,034, filed on Sep. 12, 2016, now U.S. Pat. No. 10,290,136 which is hereby incorporated by reference in its entirety; which claimed priority and benefit from United States provisional patent application number U.S. Ser. No. 62/372,813, filed on Aug. 10, 2016, which is hereby incorporated by reference in its entirety.

U.S. Ser. No. 16/693,548 is also a Continuation-in-Part (CIP) of United States patent application number U.S. Ser. No. 16/657,121, filed on Oct. 18, 2019, which is hereby incorporated by reference in its entirety, which is a continuation of United States patent application number U.S. Ser. No. 16/279,558, filed on Feb. 19, 2019, now U.S. Pat. No. 10,489,955, which is hereby incorporated by reference in its entirety, which is a Continuation of U.S. Ser. No. 15/263,034, filed on Sep. 12, 2016, now U.S. Pat. No. 10,290,136 which is hereby incorporated by reference in its entirety; which claimed priority and benefit from United States provisional patent application number U.S. Ser. No. 62/372,813, filed on Aug. 10, 2016, which is hereby incorporated by reference in its entirety.

FIELD

The present invention is related to image processing.

BACKGROUND

Millions of users utilize desktop computers, laptop computers, smartphones, tablets, and other electronic devices on a daily basis, for personal and professional goals. Many such electronic devices contain a camera, allowing the user to capture images, audio, and audio-video clips. Electronic devices are further used for a variety of purposes, for example, to browse the Internet, to play games, to perform word processing tasks, to engage in video conferencing, for Instant Messaging (IM) and online chat, and/or other suitable purposes.

SUMMARY

The present invention may include, for example, systems, devices, and methods of virtual dressing, utilizing image processing, computer vision, and machine learning. For example, an electronic device may be used to capture one or more images of a user; to analyze and process the image(s); and to generate a realistic image that emulates or simulates how that particular user would appear if he or she wears a particular article of clothing, or other article (e.g., accessory item).

In some embodiments, a computerized method, system and computer program product may comprise: generating or receiving a search result in response to a user query by a user that searches for an item, the search result depicting the item; and modifying the search result by generating a combination image that depicts user-defined subject matter engaging with the item.

The present invention may provide other and/or additional benefits or advantages.

BRIEF DESCRIPTION OF THE DRAWINGS

FIG. 8 is a schematic illustration of two images, generated or processed in accordance with some demonstrative embodiments of the present invention.

FIG. 11 is a schematic illustration of a full image of a shirt, which is converted by the system of the present invention to a carved out image of the shirt.

FIG. 12 is a schematic illustration of images which demonstrate added wrinkle effects in accordance with some demonstrative embodiments of the present invention.

FIG. 16 is a schematic illustration of images as processed by the gravity effect estimation module of the system of the present invention.

FIG. 25 is a schematic illustration of an enhanced user-specific Product Page that is generated by the system of the present invention.

Figure 28:
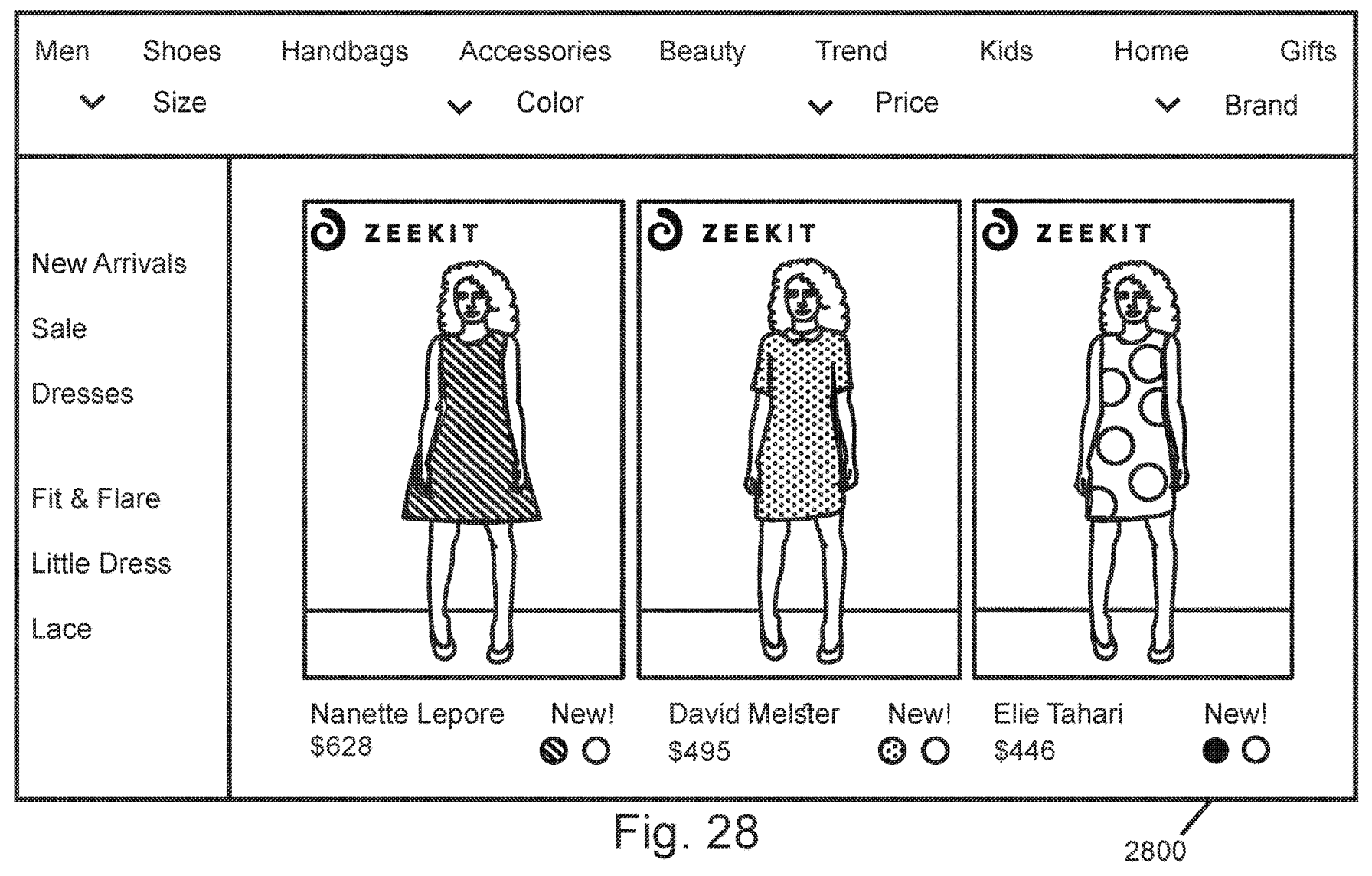

FIG. 28 is a schematic illustration of a user-specific Search Results page, generated by the system of the present invention.

FIG. 39 is a schematic illustration demonstrating another screen of a Collection Card, which may be generated, displayed, and operated in accordance with some demonstrative embodiments of the present invention.

FIG. 40 is a schematic illustration demonstrating a screen of a Collection Card or a Feed Card, which may be generated, displayed, and operated in accordance with some demonstrative embodiments of the present invention.

FIG. 43 is a schematic illustration demonstrating a screen of a Feed Card or a Mix-and-Match Card, which may be generated, displayed, and operated in accordance with some demonstrative embodiments of the present invention, and particularly showing an expanded item of a previous set of products that were previously shown as virtually-dressed on the user.

FIG. 45 is a schematic illustration demonstrating a screen of a Wish-List Card, which may be generated, displayed, and operated in accordance with some demonstrative embodiments of the present invention.

FIG. 46 is a schematic illustration demonstrating another screen of a Wish-List Card, which may be generated, displayed, and operated in accordance with some demonstrative embodiments of the present invention.

FIG. 48 is a schematic illustration demonstrating a screen of a Voting Card, which may be generated, displayed, and operated in accordance with some demonstrative embodiments of the present invention.

DETAILED DESCRIPTION OF SOME DEMONSTRATIVE EMBODIMENTS OF THE PRESENT INVENTION

Figure 1:
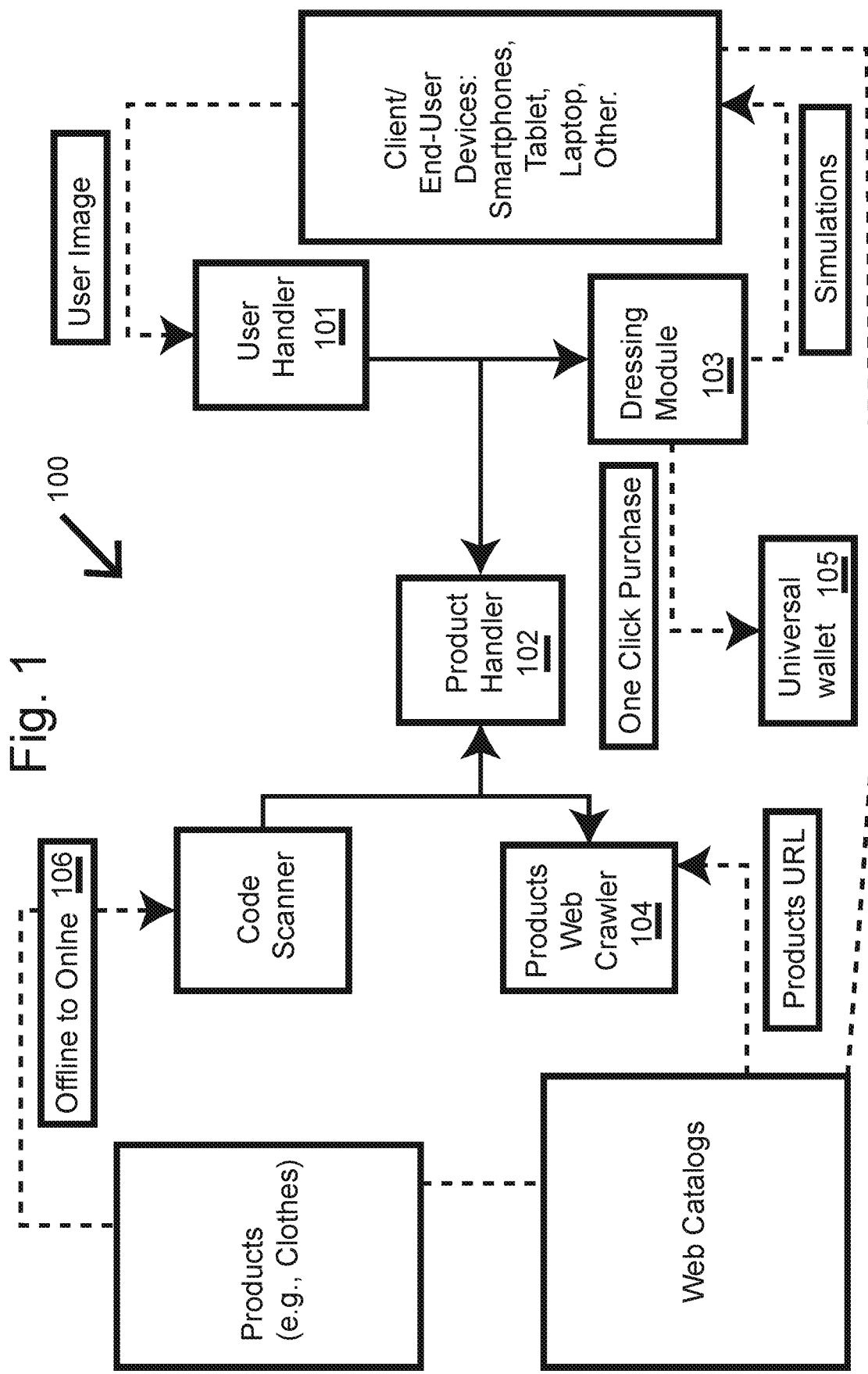
FIG. 1 is a schematic block-diagram illustration of a system, in accordance with some demonstrative embodiments of the present invention.

A number of embodiments can include a computerized method. The method can include generating or receiving a search result in response to a user query by a user that searches for an item, the search result depicting the item. The method also can include modifying the search result by generating a combination image that depicts user-defined subject matter engaging with the item.

Various embodiments can include a system including one or more processors operably coupled to one or more memory devices and program instructions stored in the memory and executable by the one or more processors to perform certain acts. The acts can include generating or receiving a search result in response to a user query by a user that searches for an item, the search result depicting the item. The acts also can include modifying the search result by generating a combination image that depicts user-defined subject matter engaging with the item certain acts.

Several embodiments can include a computer product that includes program instructions stored on the data storage media and executable by one or more processors to perform certain acts. The acts can include receiving a search result in response to a user query by a user that searches for an item. The acts further can include modifying the search result by replacing the search result with a combination image that depicts user-specified subject matter engaging with the item.

Various embodiments can include a system including one or more processor and one or more non-transitory computer-readable media storing computing instructions that, when executed on the one or more processors, cause the one or more processors to perform certain acts. The acts can include generating a first search result comprising a first item in response to a first user query. The acts also can include generating two or more second search results comprising two or more second items in response to two or more second user queries. The two or more search queries are for items of a different kind from the first user query. After generating the first search result and the two or more second search results, the acts additionally can include modifying the first search result by generating a combination image that depicts subject matter engaging with the first item of the first search result and at least one of the two or more second items of the two or more second search results.

Several embodiments can include a method being implemented via execution of computing instructions configured to run at one or more processors and stored at one or more non-transitory computer-readable media. The method can include generating a first search result comprising a first item in response to a first user query. The method also can include generating two or more second search results comprising two or more second items in response to two or more second user queries. The two or more search queries are for items of a different kind from the first user query. After generating the first search result and the two or more second search results, the acts additionally can include modifying the first search result by generating a combination image that depicts subject matter engaging with the first item of the first search result and at least one of the two or more second items of the two or more second search results.

For demonstrative purposes, some portions of the discussion herein and/or some portions of the drawings, may relate to "clothes" or to a "product", which may be virtually dressed or may be put-on an image or a user. This is only a non-limiting example; and terms such as "clothes" or "product" may comprise various types of items, for example, shirt, pants, dresses, skirts, shoes, and various other articles of clothing; accessory items or jewelry items or decorative items (e.g., necklace, bracelet, earrings, sunglasses, watch, reading glasses, piercing items, purse, bag, handbag, or the like), and/or other products or items that a person need not necessarily "wear" but that a person may wish to view how such item or product would look in proximity to that person (e.g., a decorative suitcase that a person considers to purchase, and would like to visualize how that particular suitcase would look when placed in proximity to himself). Accordingly, the terms "product" or "clothes" may comprise all such items; and/or may comprise a plurality or combination or assembly of such items, for example, a shirt and pants, a shirt and handbag, a skirt and shoes, sunglasses and necklace, or the like.

In accordance with the present invention, a user may capture a single image (or multiple images, or a video clip) of the user; for example, by taking a "selfie" image (or self-portrait image) of himself, or by photographing herself standing in front of a mirror, or by asking a friend to take a photo of the user. A local or remote application (e.g., client side, server side, native application or "app", mobile application, web-site, web-page, or the like) may utilize the image, and may process or analyze the image of the user, in order to automatically improve it or prepare it for virtual dressing.

Optionally, the user may manually enter his gender, and/or his height, and/or other optional user parameters (e.g., weight; shirt size; pants size; or the like); and these optional parameters may further be utilized for enhancing or preparing the user of the image for virtual dressing of clothes or other products. Optionally, such data or parameters may be determined autonomously by the system, based on one or more other data; for example, based on the user's name (e.g., "Adam" indicating a male; "Eve" indicating a female), based on the user's appearance (e.g., identifying anatomical structure or features that are typical of a male, or a female); utilization of other objects to infer user height (e.g., if the photo also shows a standard-size item, such as an electrical socket on a wall, or a banana or an orange located on a shelf behind the user, or a published book whose dimensions may be obtained from an online source, or a smartphone or tablet whose dimensions may be known or estimated). Optionally, user height may be estimated by the system, based on a ratio between head-size and body-size of the user; or based on a ratio between head-size and size of other body organ or body part (e.g., arm; leg).

The system may further receive an indication of a product, such as a clothes item, that the user would like to virtually dress on his image. The indication may be provided by the user, who may select the item from an online catalog; or may scan a barcode or a QR code or a price-tag or a clothes-tag of an actual product in a store; or may capture an image of the product; or may enter or dictate or say a name of a product or vendor, for example, "Old Navy, skirt, model Barbara" which the system may look-up online or at a vendor's website in order to extract therefrom the items' data and image. The obtained image may then be analyzed and/or processed, to prepare it for enhanced virtual dressing or enhanced virtual fitting onto the image of the user.

The system may then perform a virtual dressing process, in which the image of the item is resized, enhanced, and/or modified, and then superimposed or pasted or otherwise inserted onto or into the image of the user. Optionally, shading effects may be added or removed, from the user's portion of the combined image and/or from the product's portion of the combined image, in order to generate a more realistic look of the combined image of the user and the product.

Optionally, gravitational effects may be added or removed, from the user's portion of the combined image and/or from the product's portion of the combined image, such as by causing portions of the product (e.g., portions of the sleeve) to appear to be "dropping down" due to gravity, to in order to generate a more realistic look of the combined image of the user and the product. Optionally, folding or wrinkling effects may be added or removed, from the user's portion of the combined image and/or from the product's portion of the combined image, such as by causing particular portions of the product (e.g., stomach area of a shirt) to appear slightly wrinkled or slightly folded-in, in order to generate a more realistic look of the combined image of the user and the product. Other suitable effects may be used.

In some embodiments, the system may perform actual resizing of the product's image, in a manner that does not merely attempts to forcefully fit the product onto the image of the body of the user; but rather, in a manner that would allow the user to visualize whether a particular size of a particular product would actually fit this particular user. In a demonstrative example, a user who is 160 centimeter tall, and who typically wears a "small" size T-Shirt, may scan a barcode of an Extra Large T-Shirt. The system may perform suitable calculations to determine, that this particular shirt, if worn by this particular user, would create a visual appearance in which the lowest edge of the shirt reaches the knees of the user; and in which the short-sleeve of the shirt reaches below the user's arm. Accordingly, instead of trying to "precisely fit" the image of the shirt onto the image of the user, and instead of trying to show a perfectly-fitting shirt that is shown together with the face of the user or with an avatar or a model figure, the system of the present invention may actually generate as output, for example: an image of the actual user, showing his actual head and arms and legs, and showing thereon the pasted or superimposed image of the particular selected shirt, with the particular proportions true to life; such that the image that is shown to the user actually shows to him that if he would purchase and wear this shirt, then it would reach his knees and below his elbows.

Accordingly, instead of performing a simple resize operation, that would attempt to merely resize the chest area of the T-Shirt image to fit on the chest area of the actual user, the system of the present invention may perform improved re-sizing, that would allow the user to see an actual image of the user emulating his virtual wearing of this particular shirt (or other item) having this particular item-size, even if such item does not fit this particular user (at all, or partially, or perfectly).

The present invention may further enable a user, to obtain an emulated or simulated image which shows the user to appear to be wearing, concurrently, two different products that optionally originate from (or are sold by) two different vendors or sources; such as, a shirt made or sold by Vendor A, and a skirt made or sold by Vendor B. Each one of the products may be separately resized and enhanced, and the two (or more) items may then be overlayed or superimposed or pasted or otherwise inserted onto or into the image of the user; while also keeping true-to-life dimensions or ratios, allowing an oversized item to appear oversized in the combined image, or the like. Furthermore, the user may proceed to place a purchase order for the two (or more) items, via a single click mechanism, or via a single checkout mechanism; and a universal digital wallet or payment mechanism may be used in order to enable the user to perform a single checkout process with regard to multiple items that were collected from multiple different vendors.

The present invention may comprise a system, device and method that may allow a user to take a one or more photos of himself or herself, in order to virtually try-on countless products sold online and/or sold offline, and to see different looks of such products (e.g., clothes, accessories, or the like) shown in a realistic manner on the user's own image. The user may also virtually dress himself by scanning physical codes, such as QR-codes, barcodes, price tags, clothes tags, or the like, captured from physical clothes located in real-life shops; in order to similarly achieve a virtual dressing of the user's image with such items or clothes.

For each product, the user may also receive from the system one or more computed properties, such as the correct size estimation that fits one's body shape and/or measurements.

The dressing process may utilize image processing and/or computer vision methods, for example, with regard to the user's image and/or with regard to the product (e.g., clothes) image; and may include additional parameters inserted by the user and/or generated from external resources regarding the user and/or the cloth properties; for example the user may be asked to manually insert his height and/or weight and/or gender, and such data may be used by the system in order to further improve the output shown to the user. After the dressing process, the user may proceed to purchase a single product, or an entire multiple-item attire or assembly of clothes, from a single vendor or even from multiple different vendors (e.g., online vendors and/or offline vendors), optionally by using a single click mechanism, utilizing a universal digital wallet or payment mechanism.

Reference is made to FIG. 1, which is a schematic block-diagram illustration of a system 100, in accordance with some demonstrative embodiments of the present invention. In a demonstrative embodiment, the system 100 may comprise six main components or units or modules, for example: a User Handler Module 101; a Product Handler Module 102; a Universal Dressing Module 103; a Products Web Crawler Module 104; a Universal Wallet Module 105; and an Offline to Online Dressing Module 106. Other suitable modules or units may be used. The User Handler Module 101 prepares the user image, which can be taken from different client types, for the dressing process using image processing, computer vision and machine learning. This module only needs a single user image that may be invariant, but is not limited to quality and camera angles in order to create a 3D estimation of the user. The process is not limited to using a single image; it may capture more images, videos or the like, for different scenarios (e.g., taking two pictures of the front and back in order to create a 360 degree look). The user handler module is further discussed herein, for example, with reference to FIG. 2.

The Product Handler Module 102 prepares the clothes image (or product image) taken from different vendor catalogs for the dressing process using image processing, computer vision and machine learning. This module needs only a single product image that may be invariant, but is not limited to quality and camera angles in order to create a 3D estimation of the product. Additionally, multiple product images or videos may give a better estimation and be suited for different scenarios. The product handler module is further discussed herein, for example, with reference to FIG. 3.

The Universal Dressing Module 103 virtually dresses a user (or an image of the user) with one or more different products that may differ in image size, vendor, type, fabric, light, shading, or other properties; while taking into consideration the user pose, user light scene, shading, and real-world gravitation, in order to create the most realistic simulation or emulated image. For each product, module estimates the recommended size for every user and changes the simulation accordingly. This module may evaluate the simulation combined with manual or external properties regarding the user and/or the product to give a better outcome; for example, the system may ask the user to manually enter or provide his or her height and/or weight and/or gender and/or clothes size (e.g., Small Medium or Large for a T-Shirt). The universal dressing module is further discussed herein, for example, with reference to FIG. 4.

The Products Web Crawler Module 104 allows the automatic or autonomous preparation of any web catalog product for dressing. The web crawler uses machine learning in order to get textual information about each product. The web crawler validates products' textual information in the web catalog. This module may be invariant, but is not limited to the products' vendors. The products web crawler module is further discussed herein, for example, with reference to FIG. 5.

The Universal Wallet Module 105 is a secure, safe, quick, and optionally one-click online shopping mechanism enabling the user to efficiently and rapidly purchase multiple different products from one or more different brands, vendors, e-commerce sites or other sources; including from online vendors, offline vendors, real-life stores, brick-and-mortar stores, used or pre-owned online stores or markets (e.g., eBay or CraigsList), or the like. A user may use the dressing module to create different looks that can instantly be bought as an entire look, or as an assembly of multiple items. The look may combine different products from different brands, vendors, e-commerce sites and/or retailers, and may optionally be available for purchase as a one-click purchase button or process, or as a multiple-steps purchase process.

The Offline to Online dressing module 106 allows users to scan codes such as the QR-code, Barcode, Near Field Communication (NFC) tag, or the like, which may be attached to physical clothes or items in actual real-world shops or locations. This module allows for an instant virtual dressing experience of the specific in-store item onto the virtual user image, bringing the consumer from offline medium (physical shop/physical clothes) to online medium (application, web, electronic device, or any other platform that shows the simulation on the taken user image). This may further allow a user, that is physically located within a store, to virtually try on a product or an article of clothing, without actually finding and walking to a changing room, waiting in line, taking off clothes, putting on new clothes to try them on, taking off the new clothes, and putting on the user's own clothes; thereby saving the user precious time and efforts, and enabling the user to receive on-the-spot immediate visual feedback with regard to the look of a clothes article or other product that is virtually dressed on an image of the user.

Figure 2:
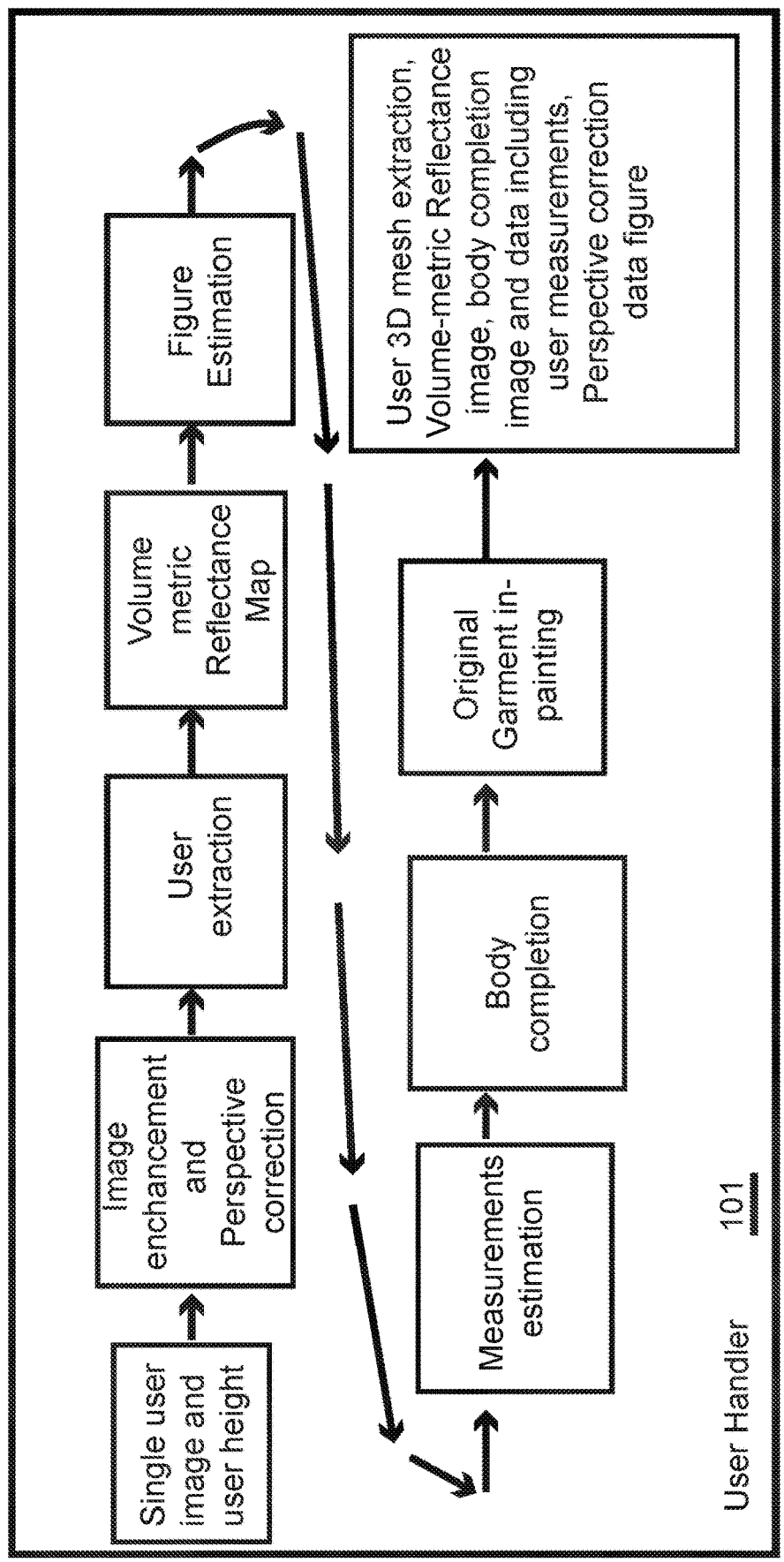
FIG. 2 is a schematic block-diagram illustration of User Handler Module, in accordance with some demonstrative embodiments of the present invention.

These features and modules may be platform agnostic, and may operate on different client types (mobile, tablet, desktop, or the like) and/or infrastructures (server, cloud, web based, etc.) Reference is made to FIG. 2, which is a schematic block-diagram illustration of User Handler Module 101, in accordance with some demonstrative embodiments of the present invention. It may comprise or utilize the following processes or sub-modules or unit.

Image enhancement and perspective correction module—this unit or process enhances the user image before segmentation. The enhancements fix a large set of problems resulting from improper usage of the camera including, but not limited to a dark photo, a blurry photo, a noisy photo, and a grayish photo (very low saturation). The same applies, but is not limited to multiple photos and/or a video. This unit or process also corrects the user distortion caused by different camera angles using the user's height. This allows the unit or process to recreate the user coordinates in a 3D world (understanding, but not limited to the user 3D surface, one's distance from the camera, and the correct perspective distortion to add to the products that will be dressed on the user in the dressing process).

User extraction module—this unit or process extracts the image of the user from the background. This unit or process uses artificial intelligence techniques in order to distinguish between the user's body and clothes from the background. This unit or process may be invariant, but not limited to different user poses and different backgrounds.

Volume-metric reflectance map generator—this unit or process creates a 3D light map of the user. This unit or process uses machine learning and computer vision algorithms in order to create the user scene light map used in the dressing process. The light map creation may be invariant, but not limited to the user's original colors and shapes of the clothes and skin color. This process also creates the 3D surface for the user using the user's height.

Figure estimation module—This unit or process estimates the user figure under the clothes. This unit or process uses machine learning and image processing techniques in order to interpolate the user's body in areas where the skin is not visible because of, but not limited to clothes, light, and shadows. This unit or process may be invariant, but not limited to the user's pose and original clothing type, and the camera's perspective distortion.

Measurements estimation module—This unit or process estimates the user's measurements. This unit or process uses machine learning and computer vision techniques in order to correctly estimate the user's body measurements. This process estimates, but is not limited to the bust, waist, hips, and, for women, the cup size; and/or other suitable properties of a person.

Body completion module—This unit or process creates an artificial user body where clothes are covering the user's body. This unit or process uses computer vision and image processing in order to extrapolate the correct, but not limited to color, light, and shadows on the user's skin in areas where the body was hidden due to clothes.

Original garments in-painting handler—This unit or process erases the original user's clothes which are outside the user's figure estimation. This unit or process uses in-painting techniques in order to estimate the background which was hidden behind the clothes. The clothes in-painting may be invariant, but not limited to the user's clothing type, clothing fabric, and background colors.

Figure 3:
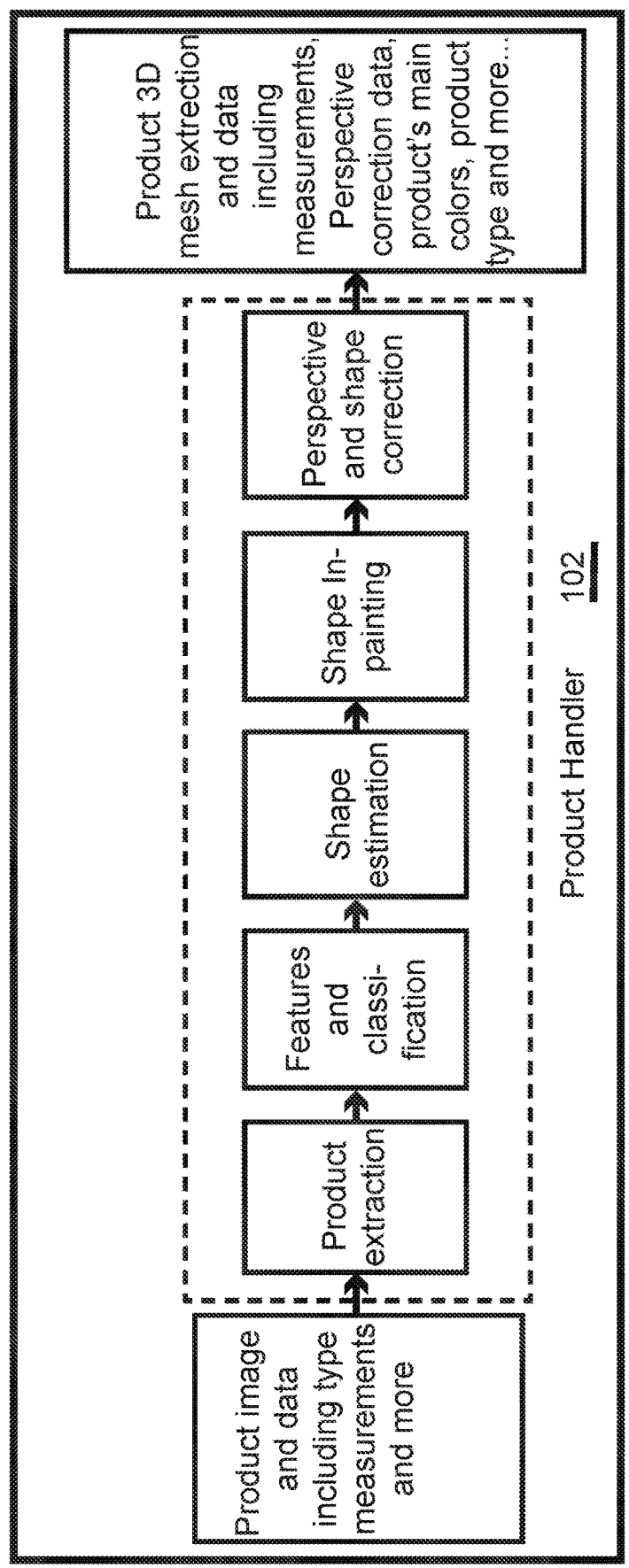
FIG. 3 is a schematic block-diagram illustration of Product Handler Module, in accordance with some demonstrative embodiments of the present invention.

Reference is made to FIG. 3, which is a schematic block-diagram illustration of Product Handler Module 102, in accordance with some demonstrative embodiments of the present invention. It may comprise or utilize the following processes or sub-modules.

Product extraction module—this unit or process extracts the product from the background and from the model (if it exists). This unit or process uses artificial intelligence techniques and textual data in order to distinguish between the model's body, the background, and different clothes. This unit or process may be invariant, but not limited to different model poses, backgrounds, product shape, angles, and different product vendors.

Features and classification module—this unit or process finds the fundamental features of the product (shoulders, sleeves, etc.). If necessary, where the textual information does not exist, the method classifies the product into sub categories using machine learning and computer vision. For example: long sleeve, tights, and T-shirt.

Shape estimation module—this unit or process interpolates the product shape if the product was hidden by the model's pose using machine learning and curve fitting techniques. This unit or process may be invariant, but not limited to the model's pose and the areas hidden by the model.

Shape in-painting module—this unit or process fills in the hidden areas in the product that were interpolated by the shape estimation. This unit or process uses image processing and computer vision in order to fill the hidden areas and may be invariant, but not limited to the hidden areas' shapes, product color, texture, light, shadow, and folds.

Perspective and shape correction module—this unit or process prepares the product for the dressing by, but not limited to, giving the product a 3D volume, perspective distortion, and realistic color (if the product was not worn by a model). If the product was worn by a model, this unit or process prepares the product for dressing by, but not limited to, extrapolating inner parts of the product that were hidden by the model's body.

Figure 4:
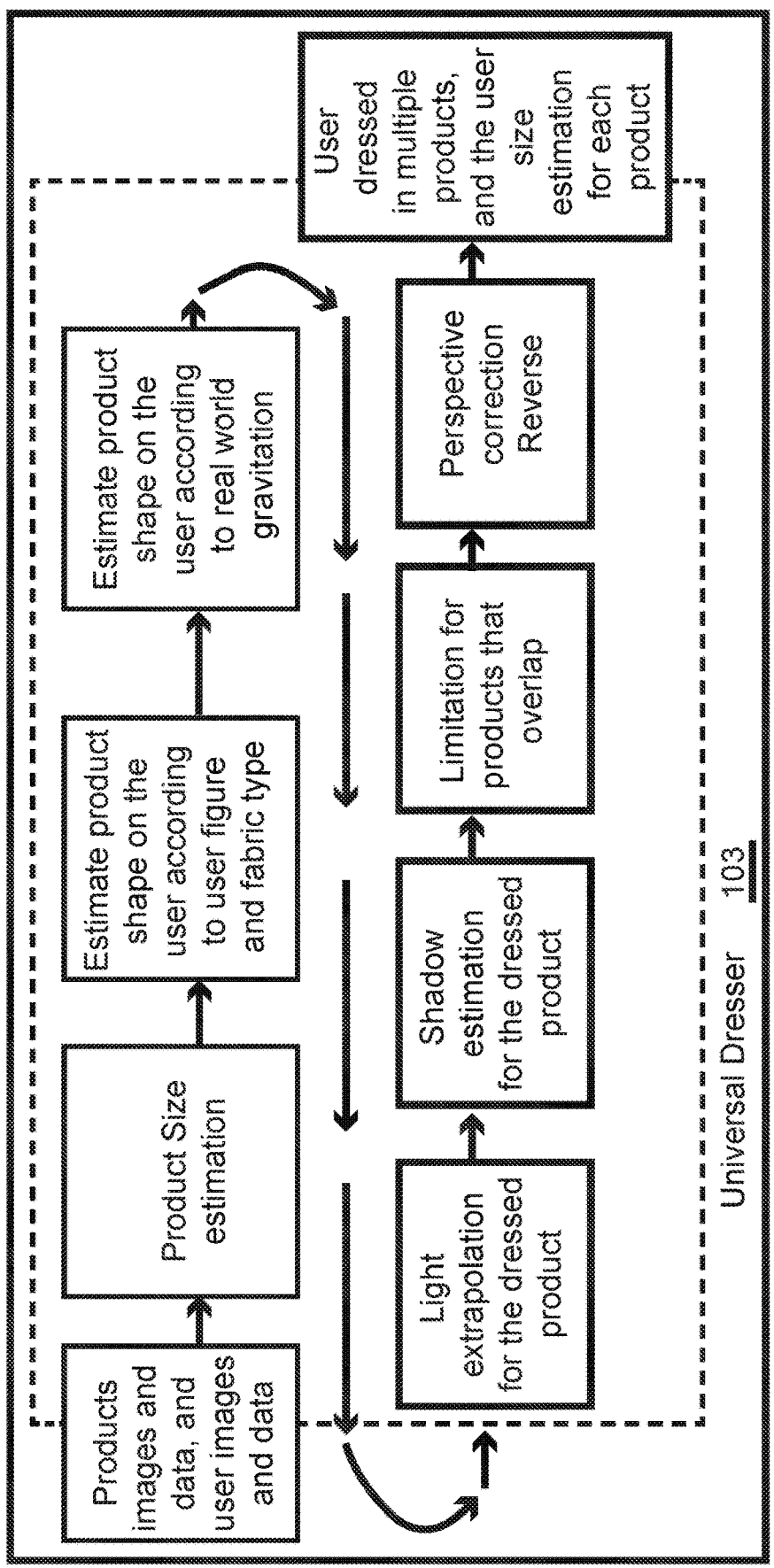
FIG. 4 is a schematic block-diagram illustration of a Universal Dressing Module, in accordance with some demonstrative embodiments of the present invention.

Reference is made to FIG. 4, which is a schematic block-diagram illustration of a Universal Dressing Module 103, in accordance with some demonstrative embodiments of the present invention. It may comprise or utilize the following processes or sub-modules.

Product size estimation module—this unit or process estimates the recommended size for each product dressed on the user according, but not limited to the product size chart, type, and fabric. This unit or process uses machine learning to estimate the recommended size for each part of the body; for example, the method estimates if the product is tight, relaxed, or perfectly fits on the waist. This unit or process may be invariant, but not limited to different vendors and product size charts.

Product shaper estimator, to estimate product shape on the user according to user figure and/or fabric type: this unit or process transforms the product on the user using computer vision. This unit or process takes into consideration, but is not limited to the product fit, size, shape, and type, in order to dress the user as accurately as possible. This unit or process may be invariant, but not limited to product image size, product vendor and pose.

Estimator to estimate product shape on the user according to real world gravitation: this process or unit transforms the product on the user using computer vision. This process or unit takes into consideration the user's pose and gravitation of the real world and how it affects the product on the user.

Module for Light extrapolation for the dressed product—this unit or process extrapolates the 3D volume-metric light map of the user to the products dressed on the user using computer vision algorithms. This generates the products, the user scene light and shadow that cause the dressed product to look more realistic. This unit or process may be invariant, but not limited to the products' types and colors.

Module for Shadow estimation for the dressed product—this unit or process creates an artificial shadow on the user's body using computer vision algorithms. The shadows stem from the products dressed on the user; for example, short sleeves create a shadow on the arms. The process may be invariant, but not limited to the product type and color and user pose.

Module that generates and/or takes into account Limitations for products that overlap: this unit or process creates the limitations and conditions of dressing multiple products. For example, if a tight shirt is above a high-waist puffy skirt, then the skirt will be tighter on the body in the area where the products overlap. The skirt will start to expand after the overlapping area ends.

This process uses a combination of real-world physics, fashion rules, and computer vision algorithms and is capable of handling every type of overlapping product, even those products that do not necessarily exist in the real world (such as pants on a skirt). This unit or process may be invariant, but not limited to the products vendor and size and user pose.

Module for Perspective correction reverse—after dressing the user in multiple products, this unit or process reverses the perspective and distortion correction that was performed on the user image in the user handler process. This action causes the products to get the same perspective and distortion as the user had, making the simulation more realistic.

Figure 5:
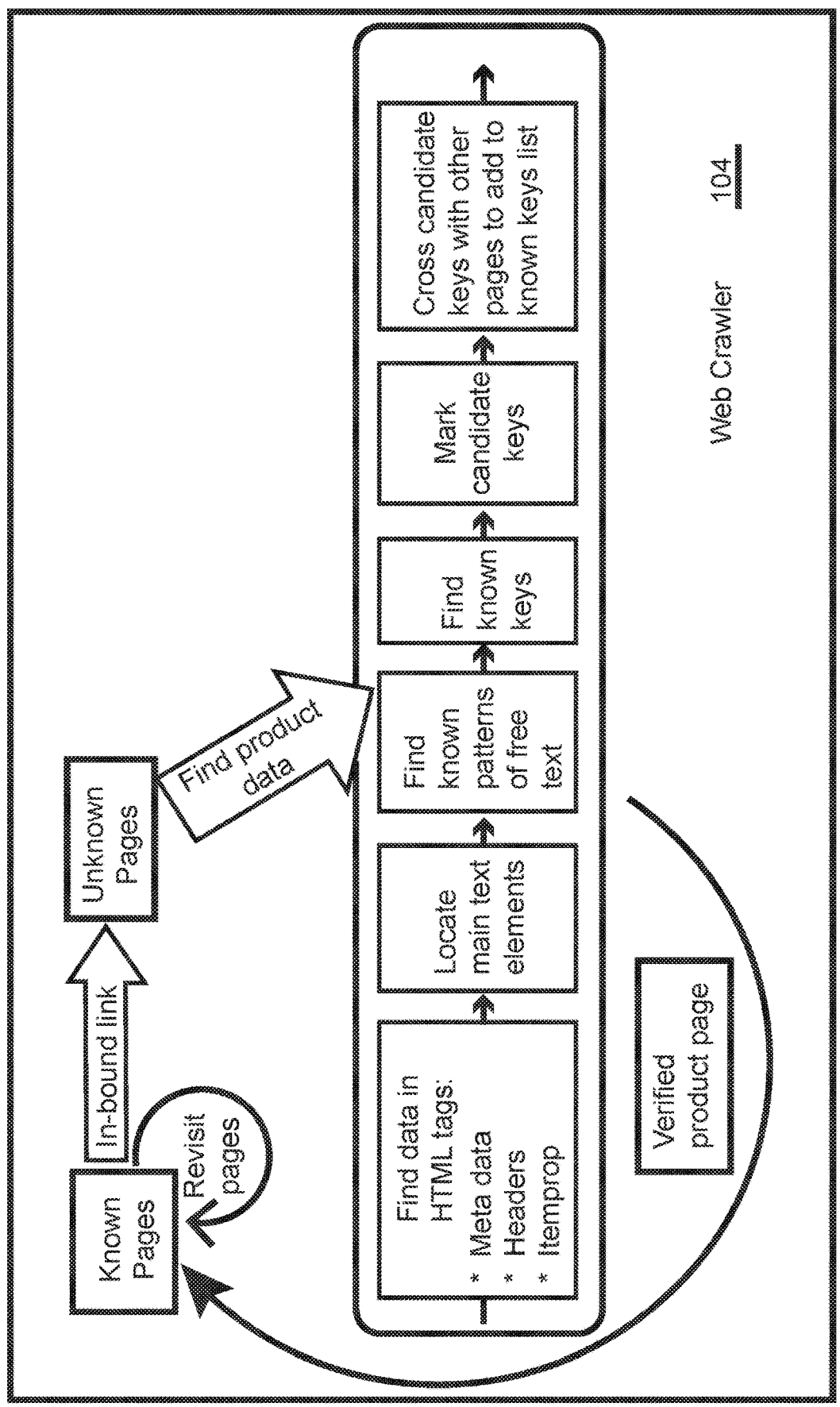
FIG. 5 is a schematic block-diagram illustration of Products Web Crawler Module, in accordance with some demonstrative embodiments of the present invention.

Reference is made to FIG. 5, which is a schematic block-diagram illustration of Products Web Crawler Module 104, in accordance with some demonstrative embodiments of the present invention. It may comprise or utilize the following processes or sub-modules.

The crawler utilizes a learning unit to track scanned pages. Navigation through the different pages of a website is done by following inner website links. Each page visited is identified as a product page (through data gathering, as explained below) or marked "unneeded" for further update. The process of updating data from a previously visited page is the same from this point forward.

The crawler operates to Find data in HTML tags—locate data in common HTML tags according to W3 conventions, which may include but not limited to: Meta data tags—provide trusted data provided by the page owner; Headers—hold major information in any web page.

Itemprop module: identifies and/or utilizes common HTML attributes found in well-formed e-commerce websites. Elements with the Itemprop attribute specify data such as price, brand, name, category, etc.

Module to Locate main text elements—scan web page to find large elements containing text such as description or summery fields. Many sites allow free text sections or lists with abundant information.

Module to Find known patterns in free text—Using a machine learning algorithm, locate patterns and known data structures (such as key-value pairs or table structure).

Module to Find known keys—Compare keys in found data against a known keys list and locate desired data. Unknown keys may be entered in the key candidate list.

A unit executing a machine learning algorithm which marks recurring keys in multiple pages with the same connotation and enters them to the known keys list.

The present invention may comprise a method and system for virtually dressing clothes on users, based on one full user body image (or, based on a set of two or more images of the user; or based on a single photo of at least a portion of the user's body, such as from the belt upward; or based on a set of such photos), using image processing, computer vision and/or machine learning. In some embodiments, the user may take several pictures or videos. In some embodiments, additional parameters and preferences, from the user and or external resources, are taken into account. In some embodiments, the clothes or products are from different brands, vendors and e-commerce sites. In some embodiments, the user scans a code attached to physical clothes (or other items, such as an accessory) in a shop. In some embodiments, the method may enable for shopping for clothes from different brands, vendors and e-commerce sites immediately, using a one-click universal wallet. In some embodiments, the method may comprise crawling clothes data from the web using machine learning; and the data stays constantly up-to-date.

Some embodiments may comprise or may perform the following: (a) virtual dressing, by overlaying or inserting or otherwise combining, a two-dimensional image of a product, onto a two-dimensional image of a user; (b) identification or determination or estimation of the precise body contour of a particular user, based on one or more images of that user in which he wears one or more clothes; (c) identification and extraction of the body contour of a particular user, based on a video clip that shows that user; (d) generation of a lighting map and/or a volume map, based on a user image, even if the user is wearing clothes or items that have different colors or that have different shading levels; (e) adding, removing, enhancing and/or modifying one or more portions or regions of an image of a product, and/or of an image of a user, in order to generate a realistic appearance of a combined user-and-product image; (f) enabling the user to purchase one item, or two or more items, which may be sold or made by different vendors, optionally by using a single-click or single-checkout button or process; (g) optionally, performing one or more of the methods or features that are described above or herein, with regard to (or by utilizing) a set of images, or a video clip, or a three-dimensional representation or a stereoscopic image of the user and/or of the product, and/or generating as output such three-dimensional representation or a stereoscopic image of simulated combined user-withproduct.

The system may process user image(s) of himself or herself (or, of another person, if the user would like to check how a particular clothing article would look on another person), and may optionally extract or determine or estimate, for example, user gender, user height, user dimensions; without necessarily requiring the user to manually input such data; and optionally by utilizing machine learning to increase the type or number of images that the system is able to accurately process. Additionally, analysis of "big data" repositories and data-mining may enable the system to suggest to the user similar items, or items that the system estimates that may be of interest to the user, based on his past history of virtual dressing.

Figure 6:
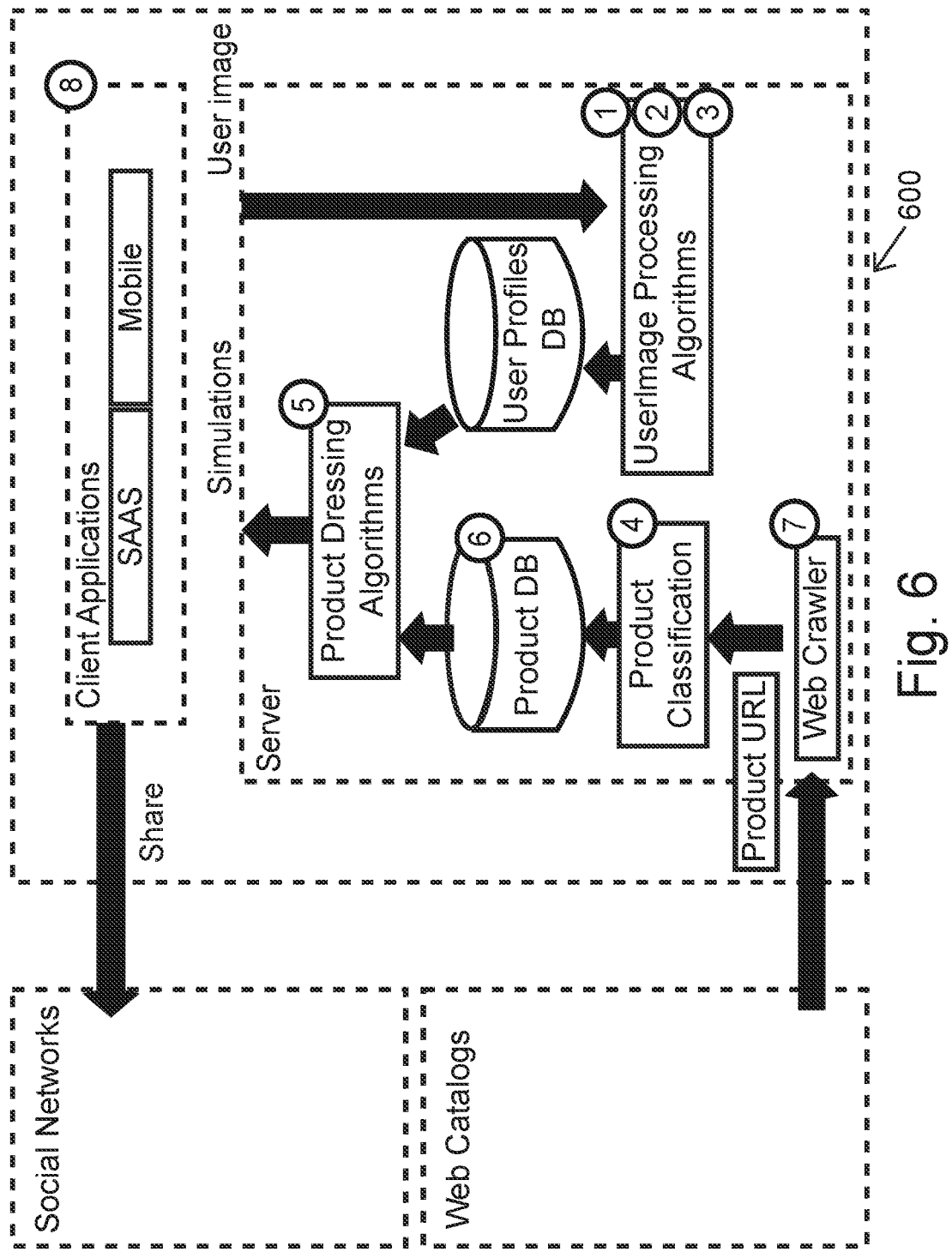
FIG. 6 is a schematic block-diagram illustration of a system, in accordance with some demonstrative embodiments of the present invention.

Reference is made to FIG. 6, which is a schematic block-diagram illustration of a system 600, in accordance with some demonstrative embodiments of the present invention. For example, a product dressing module or algorithm receives input from two branches of modules: from a user image processing branch, and from product data processing branch. In the product data processing branch, a web crawler may crawl the Internet to obtain product data, including product URL data; and a product classification module may perform classification into classes or categories, as well as product image enhancement and improvement, prior to storage of product data and product image into a product database, that in turn feeds the product dressing module. In the user image processing branch, a user image is obtained from an application or an electronic device or from other source (e.g., from a profile page of the user on a social network); the user image is processed, analyzed and improved; and is stored in a user profiles database, together with other user data that is obtained or extracted or received. The output of the virtual dressing algorithm is provided to the user, via his electronic device; and may be further shared or sent by the user to selected recipients.

In some embodiments, the system may operate to separate the image of the user's body by itself, from any background that may be shown in the user's image, or to otherwise identify and erase or remove any such background that surrounds or that is behind the user's body in such image(s). For example, a user's image may be analyzed by using a computer vision process, in order to locate multiple (e.g., eight) initial points of interest: right shoulder, left shoulder, right elbow, left elbow, right wrist (or palm), left wrist (or palm), right foot, left foot.

Optionally, two (or more) images, or a video clip, or stereoscopic image(s) of the user, may be analyzed; may be selected out of a plurality of images, or out of a video clip containing frames; and may be aligned to each other. Optionally, a volume map may be generated, indicating the three-dimensional volume and/or distance and/or depth of each point or region in the image of the user. Optionally, a computer vision algorithm may be used, or other image processing techniques, to trace around the determined shape or contour of the particular body of the particular user as shown in the image; and to cut-off or remove or discard the data of the background, leaving only a "net" image of the user himself, or a masking component of the user's image by itself and sans its background.

The system may generate a volume-metric reflectance map, and may further perform equalization and image enhancement. For example, a blurry clothing article that was originally worn by the user in his original image, may be replaced by a focused or non-blurry image of the target product intended for virtual dressing; or, in some implementations, with an intentionally reduced-sharpness or increased-blur version of the product.

The Applicants have realized that typically, a user's image is captured in non-optimal conditions and/or by using a smartphone or tablet, thereby generating generate a user image having noise, blur, insufficient light, shaded portions, or other imperfections; whereas, in contrast, a product's image is typically or often captured by a professional photographer in a well-it photography studio. The Applicants have realized that an attempt to merely insert a resized version of a studio-quality product image, into a blurry or amateur-quality photograph of the user, produces non-realistic results. Accordingly, the present invention may, in some implementations, intentionally introduce noise and/or blur and/or shades and/or other imperfections, into a high-quality image of the product, prior to (or during) the insertion of such product image into the user's image; in order to thereby generate a combined image that features a generally constant level of quality, and thereby avoiding a situation in which the combined image shows a blurry user "virtually wearing" a high-quality image of a product. Optionally, the user's image may be enhanced or improved, e.g., by sharpening, noise removal, noise reduction, artifacts removal or reduction, anti-blur processing, lighting equalization, or other enhancements; in order to prepare the user's image to be close to the quality of the product image that needs to be adapted and inserted into it. Similarly, volume-metric map, lighting map, or other image-related data may be modified or enhanced, in order to subsequently allow compatible fusion of the user image with the product image.

In some embodiments, the virtual dressing module may utilize one or more superposition algorithms, in the frequency domain and/or in the time domain; and may optionally fuse together insights from two or more such algorithms. In some implementations, for example, frequency domain analysis may be performed by a Zheng and Chellappa algorithm; a time domain or temporal domain analysis may be performed by an Ikeuchi and Horn algorithm; and insights from both may be fused or accumulated.

Some embodiments may perform unification of the blur level, sharpness level, lighting, noise level, and/or other features of the user image and the product image; in order to contribute to a realistically-looking combined image. For example, blur level may be determined by using a Park algorithm and/or by Cepstral image analysis, to detect the strength (or intensity) of the blue and/or the blue direction. Optionally, a blue kernel may be determined, and may be applied via convulation onto the image of the product, in the virtual dressing process.

Similarly, unification of the noise level of the two images (user image, product image) may be performed. The noise level in the user image may be estimated or detected, for example, by using Kernel Laplacian algorithm for image convulation, and/or by using Fast Noise Estimation algorithm on the resulting data; thereby generating the noise level (e.g., the noise standard deviation) of the user image, and subsequently utilizing such or similar noise level in order to intentionally introduce a matching noise level to the product image that is being combined with the user image.

Similarly, unification of the lighting conditions may be performed; for example, based on statistical analysis of one or more regions or the user image, particularly of the human eye area or the white-portions therein, and optionally using such computed result as an anchor value for the lighting level of the user image; and subsequently utilizing such computed data in order to modify, or particularly to reduce or increase, the lighting level in the product image, in order to contribute to a realistically looking combined image.

The system may perform recognition and/or reconstruction of the user's body shape or body contour. For example, an initial mask of image of the user may be extracted or isolated; and a volume-metric reflectance map, as well as image equalization, may be used in order to improve the user image, and/or to particularly detect that the user image is of the type of "mirror selfie" in which the user stands in front of a large mirror and captures a "selfie" image by holding a smartphone or a tablet or other device, typically near or at the user's chest or stomach area; optionally by performing image analysis processes, which may detect or recognize a smartphone or a tablet that appears in the image, and/or by taking into account reflected flash illumination that is reflected from the mirror in such situation.

Optionally, the system may generate a correspondence between the user's image and a given mask; for example, by tilting or slanting body parts (e.g., arm, elbow, palm, hand) that are shown in the user's image in order to correspond to a pre-defined mask or visual template. Upon general or raw correspondence, a fine-tuning process may be performed, to fine-tune the correspondence and/or to correct imperfections in the user's image (e.g., to complete or to add body portions that were hidden or obstructed in the original user image). Optionally, user characteristics or dimensions may be deduced, based on image analysis, ratio calculations, and/or by using a height input that may be provided by the user.

The system may thus convert a user image, in which the user was standing in a non-neutral position (e.g., one arm behind his back; or, one arm folded and holding a smartphone over the chest; or, two arms bent and holding the waist), into a mask or template of a neutrally-standing depiction of the user. Optionally, a user's image that is not fully squared towards the camera, or that is slanted or tilted, may be modified to appear generally aligned towards the camera. The system of the present invention may modify or cure such deficiencies, that may be detected by the system to exist in pre-processing user images.

Figure 7:
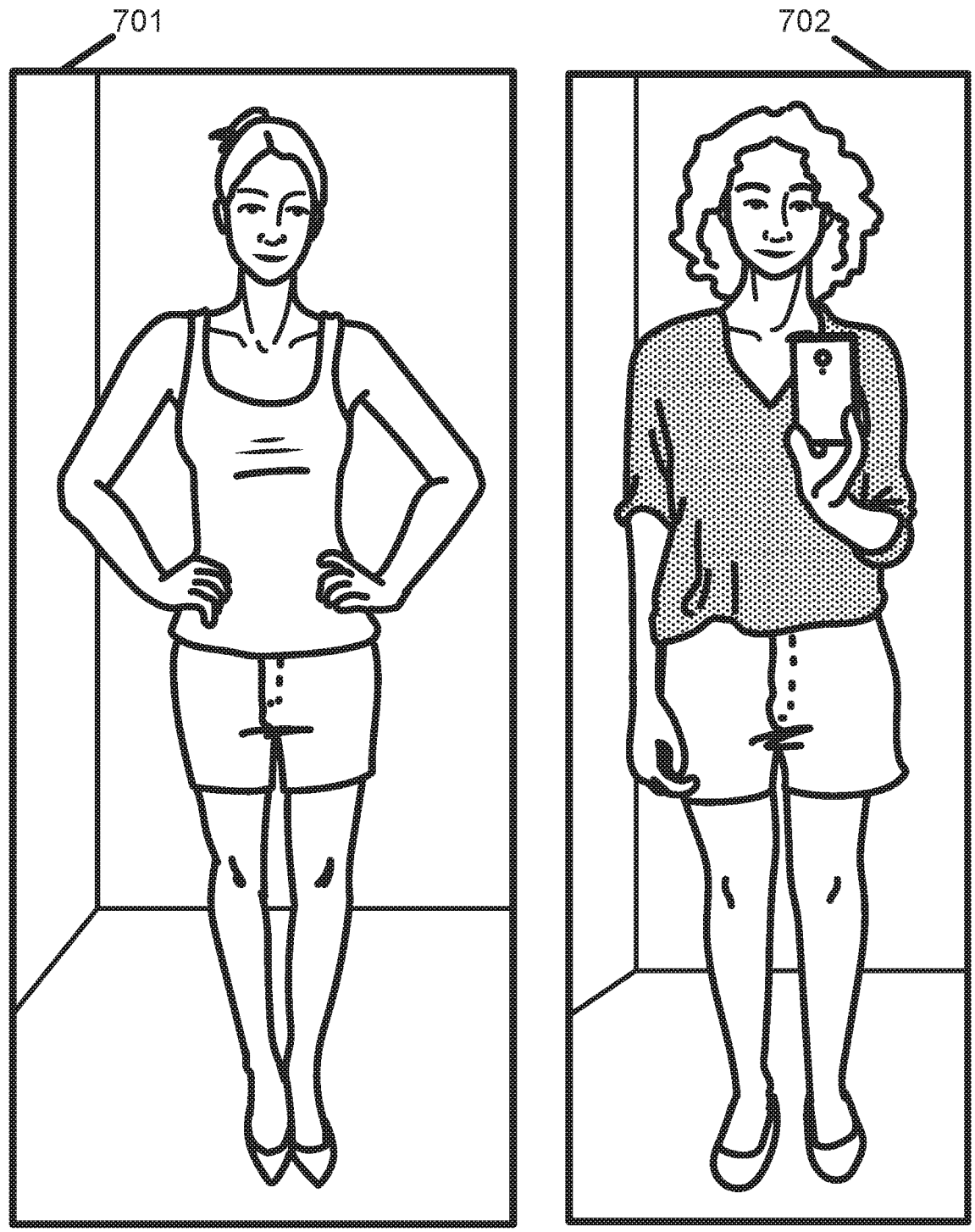
FIG. 7 is a schematic illustration of two pre-processing images, which the system of the present invention may modify or may process.

Reference is made to FIG. 7, which is a schematic illustration of two pre-processing images 701-702, which the system of the present invention may modify or may process. For example, an Arms/Hands Position Modifier may analyze image 701, may detect that the user's arms are being placed on her waist, and may perform a process that modified image 701 such that the user's arms would be generally-vertical towards the floor. Similarly, a Mirror Selfie Detection and Correction module may detect that in image 701, the user takes a selfie photograph in front of a mirror, such that the smartphone of the user is visible, and such that the arm or hand of the user is not in a natural position but rather is holding the smartphone facing towards the mirror; and that module may modify the image 702 to emulate or simulate a more natural position or location of the arm and hand.

Reference is made to FIG. 8, which is a schematic illustration of two images 801-802, in accordance with some demonstrative embodiments of the present invention. For example, an original user image 801 (shown on the left side), may be converted into a User Mask or User Template 802 (shown on the right side), by a User Mask Generator module which may analyze the original image 801 and may generate the mask image 802.

The system may proceed to process: (a) the original user image, and/or (b) the "net" or cut-out image of the user's body only, sans the background, and/or (c) a mask or template corresponding to a user's body (e.g., the mask received from the product classification/segmentation module); and may proceed to generate a user-image mask that depicts the net contour of the body of the user, while also removing "bloated" areas that appear to be bloated due to the fact that the user is wearing clothes in his own image. The system may take into account various sizes and shapes of clothes, that the user may be wearing in his originally-captured image of himself, which may distort or bloat the body contour. The system may estimate the actual non-bloated or non-distorted contour or dimensions of the user (and his particular body parts); by analyzing one or more user image in order to extract volume or depth information. The system may estimate the dimensions of the torso of the user and/or of other relevant body parts (e.g., height and width of shoulders, chest, stomach, waste, pelvic area). The system may correct or modify the angular perspective of the user's image, may modify or correct or align the appearance of body parts in the user's image, and may modify or correct the horizontal perspective in order to generate an image of the user in a neutral position.

The system may modify or fix or cure inconsistencies or imperfections in the user's image, by smoothing and/or improving and/or modifying the contour line of the user's body image. For example, a Cost Matrix algorithm for matching among points, describing the distance(s) between histograms, may cause a match between two (or more) points in the user's contour image and one single point in the generic mask or template; and the system may intentionally avoid or cure this phenomena, by ensuring that each point in the user's body image is matched to a single and different point in the mask or template. Additionally or alternatively, the system may cure or avoid a situation in which a cross-matching of points occurs, such as, a lower point (A1) in the user image is matched to an upper point (B2) in the mask, whereas an upper point (A2) in the user image is matched to a lower point (B1) in the mask, thereby creating an "X" shaped matching, rather than two non-intersecting matching lines; and the system may cure of avoid this, by matching A1 to B1, and matching A2 to B2, to avoid such cross-matching. Optionally, local smoothing of the line or the curve may be performed, as part of such modification; and the cross-matching demonstrated on the following left diagram, may be corrected to non-crossing matches.

Figure 9:
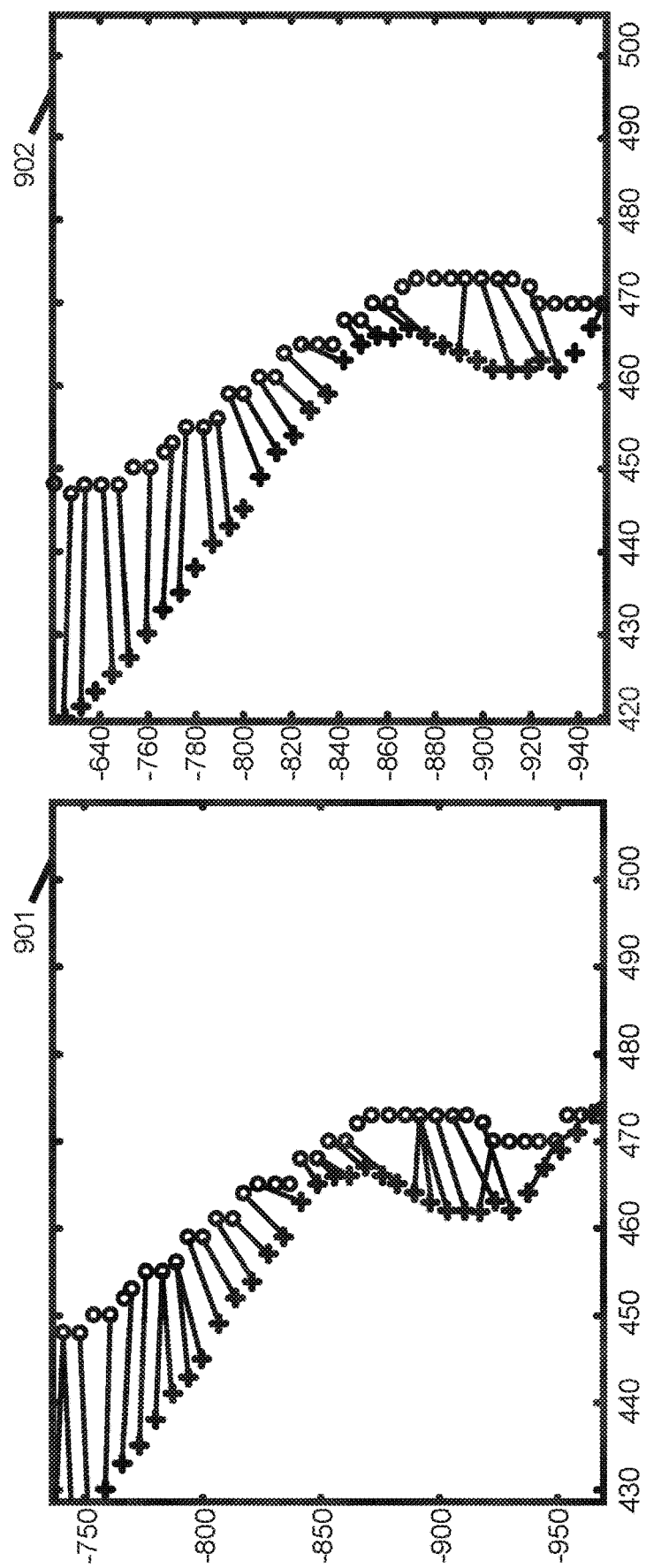
FIG. 9 is a schematic illustration demonstrating a first image which includes cross-matching lines, and an improved second image in which no cross-matching (or less cross-matching) lines are included, in accordance with some demonstrative embodiments of the present invention.

Reference is made to FIG. 9, which is a schematic illustration demonstrating a first image 901 which includes cross-matching lines, and an improved second image 902 in which no cross-matching (or less cross-matching) lines are included, in accordance with some demonstrative embodiments of the present invention; for example, by a cross-matching removal or mitigation module, or other line-smoothing unit.

The system may perform product segmentation and classification. For example, the system receives a product's image, such as a clothing article that is worn by a human model. An equalized volume-metric reflectance map is generated and utilized (e.g., in conjunction with an equalized lighting map), and textual information or meta-data about the product is obtained by the products web crawler. The system identifies uncovered body parts (e.g., arms of the human model, who is wearing a T-shirt); and performs separation among multiple clothing items that appear in the image (e.g., between the T-shirt and the pants, worn by the human model who is modeling the T-shirt). The internal and/or external boundaries of the product (e.g., the T-shirt) are cut. Optionally, contour or external boundaries of the product may be automatically completed, if some regions are missing (e.g., due to being obstructed by the hand of the human model). Optionally, the area or surface of such hidden or obstructed portions of the product, may be completed or filled-in. The system may cure or correct angular perspective of the product image, and/or perform horizontal alignment towards the camera if the original product image was not properly aligned. The system may thus generate a "net" image of the product, sans the modeling human, after filling-in missing portions or obstructed portions or hidden portions; removal of internal portions; curving of a lower-edge of the item (e.g., shirt) in order to provide a realistic non-linear edge view; and/or other suitable modifications or corrections.

Figure 10:
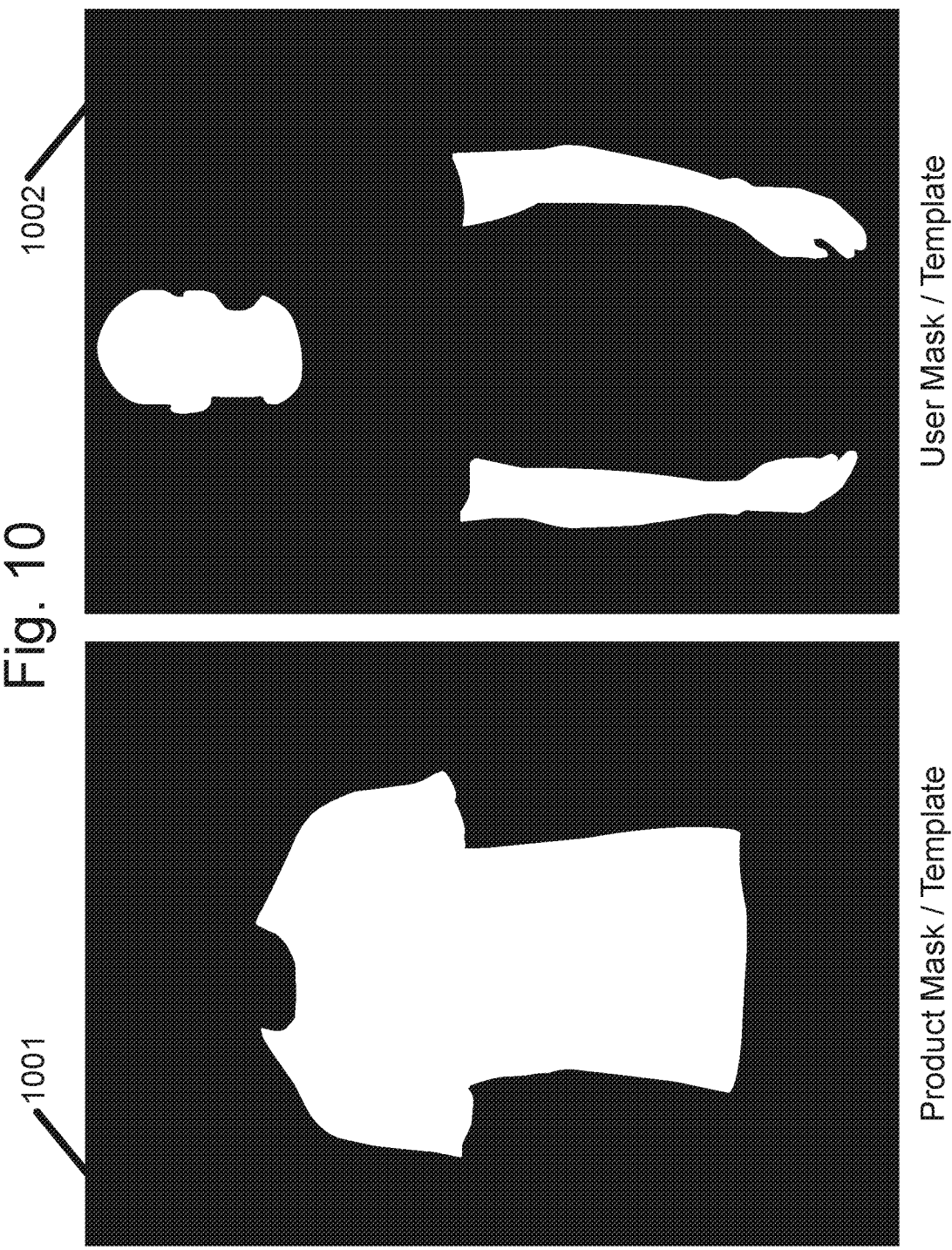
FIG. 10 is a schematic illustration of a product mask image and a user body mask image, in accordance with some demonstrative embodiments of the present invention.

Reference is made to FIG. 10, which is a schematic illustration of a product mask image 1001 and a user body mask image 1002, in accordance with some demonstrative embodiments of the present invention. For example, a product image may be converted into a Product Mask/Template (image mask 1001); and a user's image may be converted into a User Body Mask/Template (image mask 1002).

Such conversions may be performed in advance for each new user, and for each new product enrolled or added to the system; thereby enabling the subsequent processing of "virtual dressing" to be rapid and efficient, and to build-upon the previously-prepared Masks of the product and of the user.

As part of the preparation of the Product Mask, portions of the product image may be removed, added, completed, or modified. For example, if the original product image (shown herein on the right side) depicts a shirt that is not worn by a human model, then the top area of the image shows a shirt region that should be hidden or obstructed if such shirt is later superimposed or overlaid upon an image of the user that performs virtual dressing. Therefore, such top area is cut or discarded or carved-out from the image, in order to allow the product mask to be ready for virtual fitting upon the user's image.

Reference is made to FIG. 11, which is a schematic illustration of a "full" image 1101 of the shirt (shown on the right side), which is converted by the system to a "carved out" image 1102 of the shirt; for example, by a carving-out module that detects and remove such excess portions of the clothing article that are typically obstructed or hidden when the clothing article is worn by a user.

In the above example, the Applicants have realized that this particular task may require a highly-sensitive or highly-accurate Edges Detection algorithm; since the internal portion of the original shirt image has colors that are almost identical to the colors of the external portions of the shirt. Optionally, the system, may utilize textual information or contextual analysis, in order to determine automatically that this item is a "buttoned shirt", and to estimate that the Edges Detection algorithm should run at high accuracy at the top-central area of the image in which a collar typically exists.

The present invention may add, reduced, create and/or modify Wrinkle effect(s) on the product image or product mask, by a Wrinkle Effect adder or generator or creator module, in order to improve the realistic appearance of the product when virtually fit over an image of the user. Reference is made to FIG. 12, which is a schematic illustration of images 1201-1202 which demonstrate added wrinkle effects in accordance with some demonstrative embodiments of the present invention. For example, the left-side image 1201 shows low-quality wrinkle effects with square-shaped wrinkles, and the right-side image 1202 shows high-quality wrinkle effects with non-square wrinkles that appear more realistic.

In the above example, the improved wrinkle effect may be achieved, for example, by ensuring that each pixel that is missing or modified, is completed by taking into account the information from at least two (or at least three, or at least four, or at least N) neighboring pixels.

Figure 13:
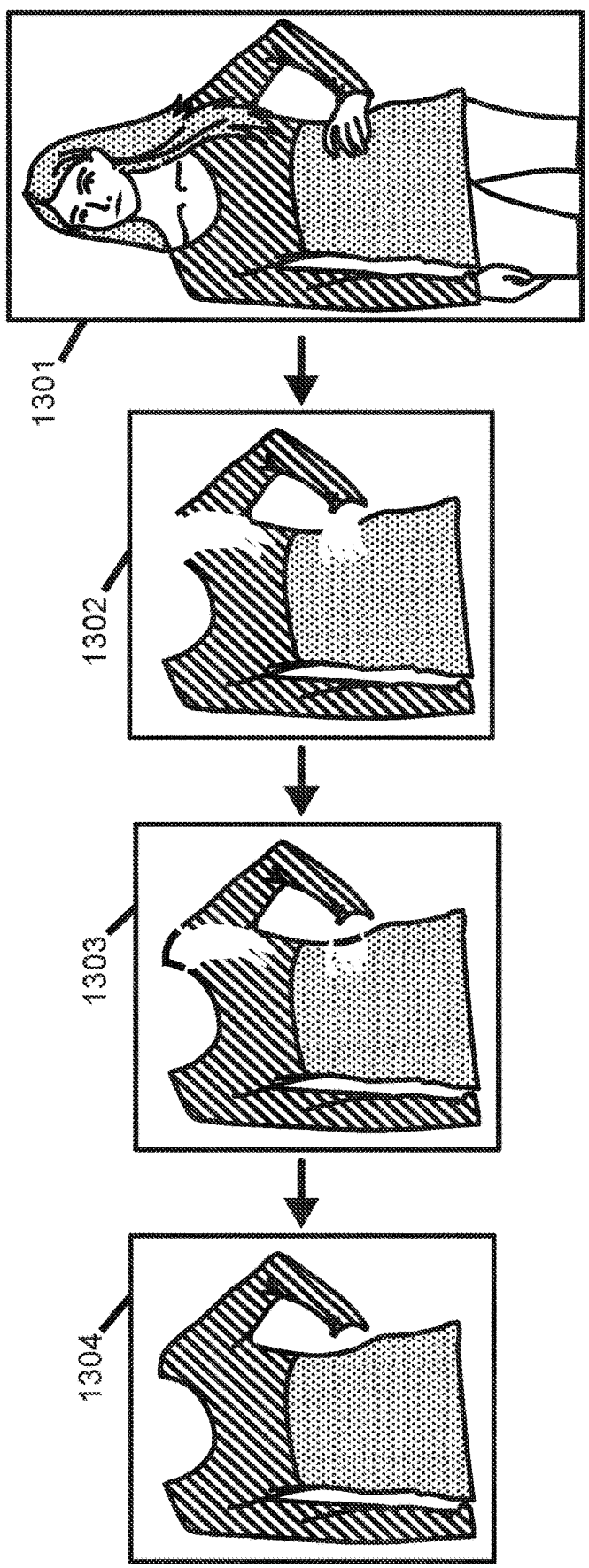
FIG. 13 is a schematic illustration of a set of images as processed by the system of the present invention.

Reference is made to FIG. 13, which is a schematic illustration of a set of images 1301-1304 as processed by the system of the present invention. For example, the present invention may process a product image by completing hidden or obstructed regions of the product. In this example, a Dress (product) is worn by a human model, with two obstructions: the model's hair obstructs a portion of the top side of the dress, and the model's fingers obstruct a portion of the middle area of the dress. As demonstrated, the system may determine the general contour of the dress (e.g., removing the head and neck of the human model); and may then add the estimated contour lines that are missing (e.g., the top shoulder line, and the right-side dress contour line); and may then fill-in those areas with the suitable color(s) or texture(s) based on the nearby colors or textures; thereby generating (shown on the left side) a product mask that is useful for further virtual fitting, with curing of the previously-obstructed product regions.

In the above example, the filling-in process may be achieved, for example, by ensuring that each pixel that is missing or modified, is completed by taking into account the information from at least two (or at least three, or at least four, or at least N) neighboring pixels.

In the above example, the system may utilize multiple images of the same product, as well as machine learning, in order to complete the hidden or obstructed product regions. For example, some online vendors provide multiple images of the same product, from different angles, or with different models, or with a single model that appears at different positions (e.g., front view, side view). The products web crawler may obtain all such images; and the system may utilize multiple images of the same product, in order to deduce the location and/or the features (e.g., colors, texture) of an area that is obstructed or hidden in the front-view image of the product. Optionally, the system may search for a repeating pattern (e.g., dove-tail pattern, zigzag pattern, chess-board pattern, zebra pattern, circles pattern, polygonal patterns, lines pattern) in the product, and may attempt to complete the hidden region by further repeating a detected pattern. In some embodiments, adaptive extrapolation may be used, utilizing regional hash tables.

The system may divide or isolate between two or more clothes that appear to exist within a single product image that is intended to correspond to a single product. For example, the products web crawler may obtain an image, that corresponds to meta-data or textual description of "shirt"; whereas the actual product image depicts a human model that wears a shirt and also pants. Based on contextual analysis, and/or based on meta-data analysis or classification analysis, the system may determine that it is required to isolate only the Shirt image from the product image, and to discard from that image not only the human model, and not only the background image (if any), but also to discard the pants image-data from that product image. A suitable grab-cut algorithm may be applied, by utilizing the textual or contextual analysis results, to isolate only the shirt image, and to discard the pants image-portion and the other elements.

The system may further cure or modify or fix, a particular type of distortion that may occur due to angular perspective of imaging as well as the three-dimensional structure of the human body, as opposed to the generally-flat two-dimensional appearance of a shirt which is merely laid-down on a table for photography. The system may detect a non-curved, or a generally-linear, contour line of a product image, and may classify such product image as requiring modification. Classification may also be performed by checking points-of-interest in the product, which may be generated by the product classification and Big Data similarity module.

Once the system detects a linear or non-curved contour line, an emulation or simulation may be performed, modifying the angular perspective of imaging to create curved contour lines; for example, modifying the angular perspective of the product image, from a full-frontal perspective, to an angular perspective as if the product is imaged from chest-level or neck-level.

Figure 14:
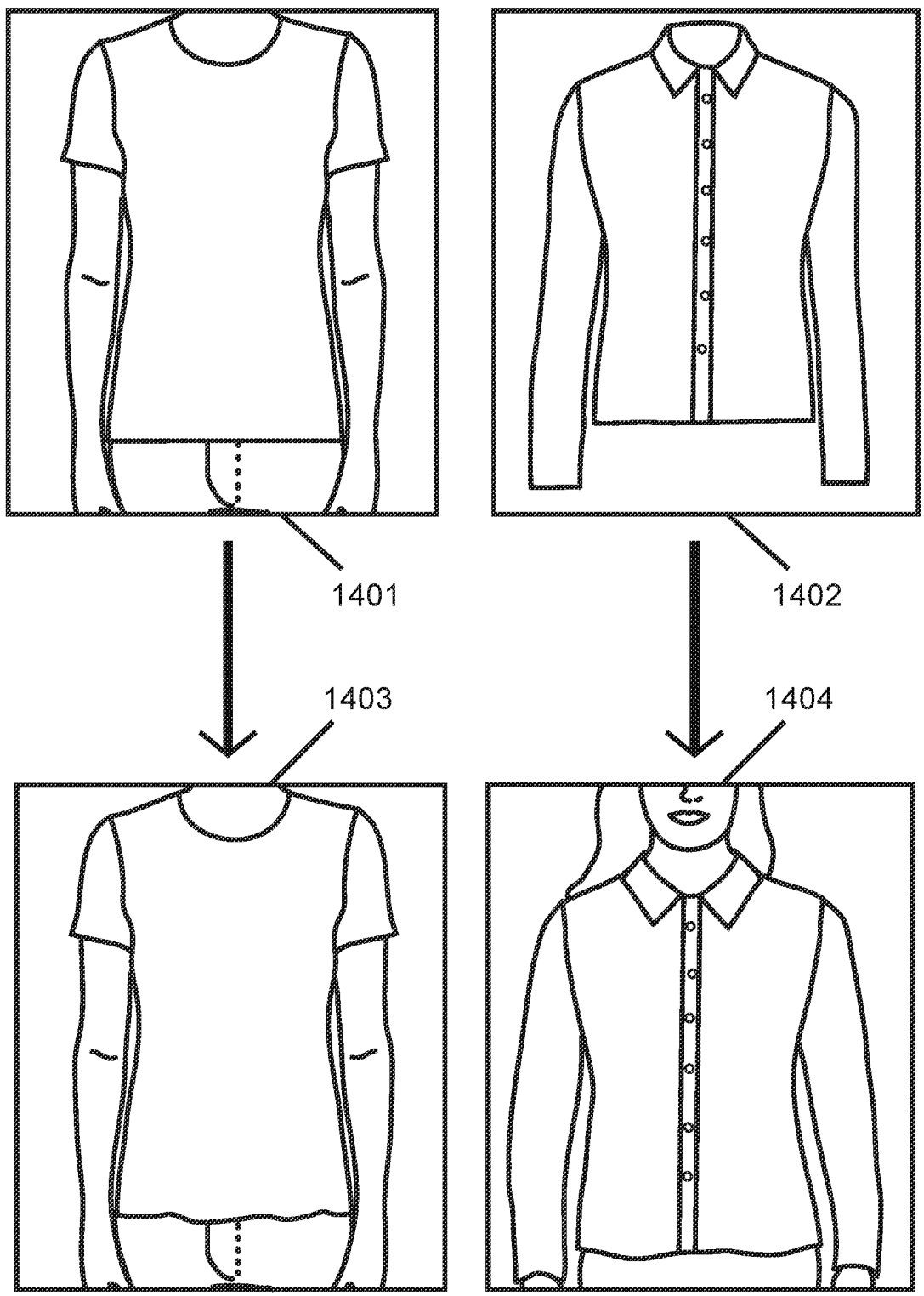
FIG. 14 is a schematic illustration of other images as processed by the system of the present invention.

Reference is made to FIG. 14, which is a schematic illustration of images 1401-1404 as processed by the system of the present invention. For example, image 1401 and image 1402 depict a less-realistic product image, in which the lower edge of the shirt is generally straight or generally linear or generally non-curved. In contrast, image 1403 and image 1404, generated by the system based on the previous images 1401 and 1402, depict a more-realistic product image, in accordance with the present invention, in which the lower edge of the shirt is generally non-straight or generally non-linear or generally curved. The Applicants have realized that in some implementations, modifying the edge or contour of a clothing article in an image, from a generally straight line to a curved line, increases the realistic appearance of such item.

Figure 15:
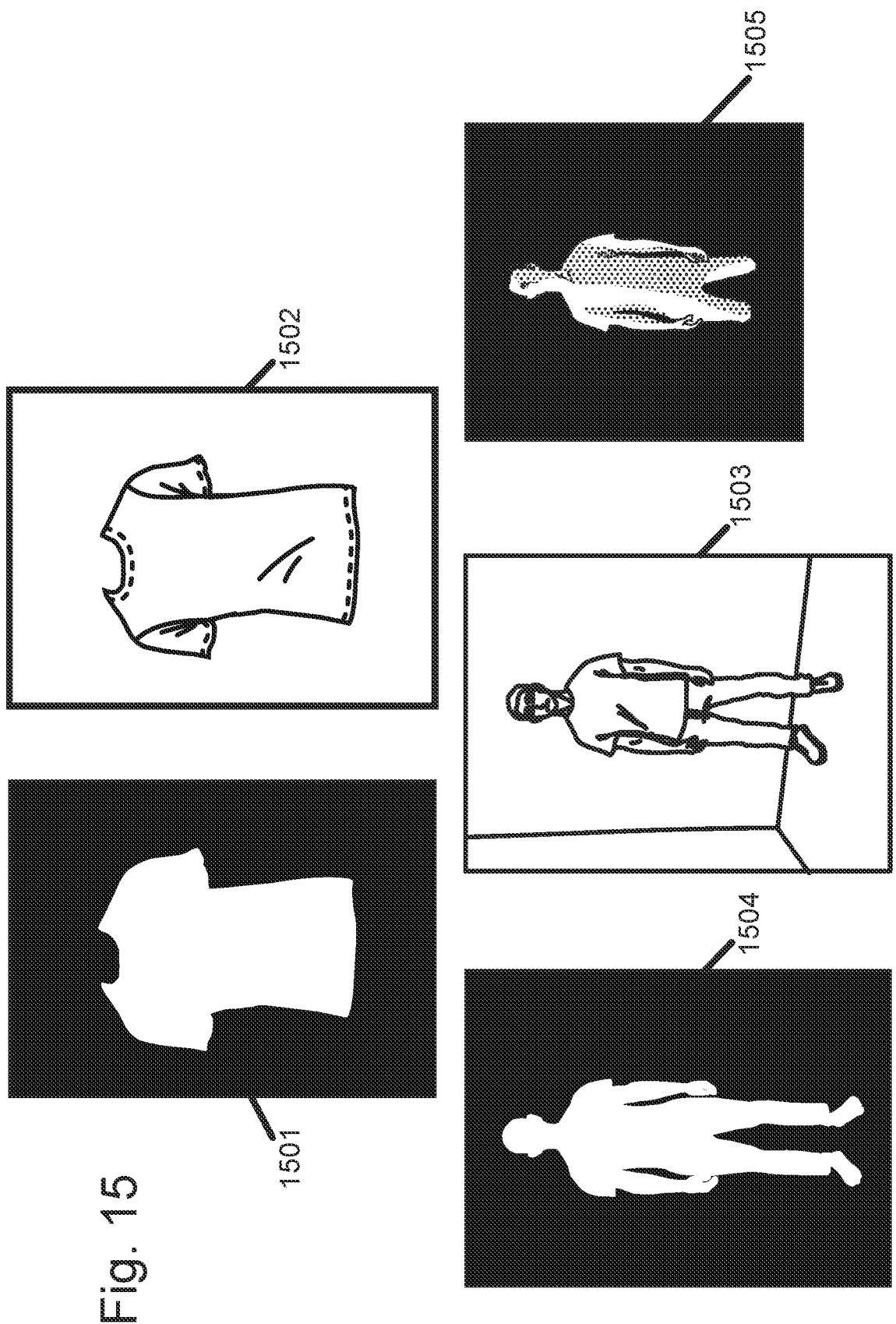
FIG. 15 is a schematic illustration of still other images as processed and utilized by the system of the present invention.

Reference is made to FIG. 15, which is a schematic illustration of images 1501-1505 as processed and utilized by the system of the present invention. The system may utilize a virtual dressing module, to perform the actual fusion or combining or overlay or insertion or assembly or construction, of the product image and the user image.

The virtual dressing module may receive as input, the product image 1502 (optionally with points-of-interest locations identifiers) and the product mask 1501.

The virtual dressing module may further receive as input, the user image 1503 (optionally with points-of-interest locations identifiers) and the user body contour mask 1504, and optionally also a lighting map of the user 1505.

The virtual dressing module may ensure that the product image fits accurately when overlaid over the user image; optionally by resizing the product image (or product mask) and/or the user image (or the user mask).

Optionally, a gravitational effect module may modify the appearance of the product, when overlaid onto the user's image or mask, by simulating the effect of gravity on certain regions of the product; such as, by modifying sleeves to "drop down" or to have slightly lower edges, thereby creating a more-realistic combined image. The module may take into account, how gravity is estimated to affect each particular region or portion of the product, and not just the entirety of the product; but without obstructing the actual characteristics (e.g., patterning) of the product. For example, the module may estimate the effect of gravity on whether a shirt would, or would not, be immediately adjacent to a body part, or be spaced apart from it (e.g., vertically, diagonally, or the like), and may estimate how "form fitting" or non-form-fitting each region of the product is (e.g., sleeve, upper sleeve area, lower sleeve area, shoulders area, torso area).

Reference is made to FIG. 16, which is a schematic illustration of images 1601-1602 processed by the gravity effect estimation module of the system of the present invention. In some embodiments, for example, the module may take into account the particular shape of the product being processed; for example, some shirts may have a short-sleeve that opens up like a bell shape, and therefore tends to drop down due to gravity (as demonstrated in the left-side example of image 1601, and as indicated particularly by arrow 1611); whereas other shirts may have a short-sleeve that is tubular or elongated or pipe-shaped, thereby appearing to cling better to the arm and to have a reduced drop-down due to gravity (as demonstrated in the right-side example of image 1602, and as indicated particularly by arrow 1612). The gravity effect estimation module may take into account the detected or the recognized shape or style of the garment, in order to differently estimate the effect of gravity on each such garment, thereby producing a more realistic-looking processed image.

Furthermore, after performing separate estimations of gravity effect for each such discrete area or region, the module may proceed to ensure that the transition from one area to the next area is smooth and/or gradual, and that the depiction avoids or cures or modifies any sudden "jumps" or "steps" between portions (e.g., between upper sleeve area, which is form-fitting, and lower sleeve area which may be dropped-down due to gravity).

Optionally, a shading module may generate and insert shading effects, at selected places of the combined image, to make the combined image appear more realistic. The shading module may take into account, for example, the gravity effects as calculated, the level of clinginess of the product to the user's body, the lighting map that is associated with the user's image or user's mask, the existence (or the addition) of wrinkles or folded portions (which may thus cast a slight shade nearby), the position of the arms (or other body parts of the user), and/or other suitable parameters.

The product classification/segmentation module may utilize the product image, the produce mask or template, and data or meta-data about the product (e.g., as extracted or obtained by the products web crawler); may extract product characteristics and points-of-interest; may perform classification of the product; and may further generate tags or meta-data or classifiers about the product or its characteristics (e.g., has a collar; has long sleeves; has buttons; has shoulder-straps; generally symmetric product; generally a-symmetric product) which may subsequently be utilized to improve the virtual dressing process. The classification, classifiers, tags and/or other characteristics may be utilized for creation of a Training Database, which may be utilized by a machine learning module in order to efficiently and accurately absorb into the system new products. For example, insights or techniques that were already extracted with regard to a Dress that has a Collar and Buttons and Long Sleeves, may later be applied or re-used when a new product is absorbed or imported into the system and its meta-data (or its initial image processing analysis) indicates that it is, similarly, such a particular Dress. This may allow efficient and accurate absorption of new products, even if little or no meta-data exists about them.

The products web crawler may crawl the web, by using Discover techniques and/or Re-Visit techniques; and may import, download and/or extract images of products, as well as data, meta-data, descriptors, and/or other product information (e.g., price, vendor, maker, model name, model number, or the like). Textual analysis and/or contextual analysis may be used, to extract available product sizes, product dimensions, available destinations for shipping, or the like. Pairs of Key/Value items may be extracted and analyzed (e.g., "Size"/"Medium"). Optionally, textual analysis and rule-based learning techniques may be used; as well as extraction and mapping of HTML tags, and prioritizing them based on level of relevancy or importance for the purpose of virtual dressing, and/or prioritizing them or ordering them by taking into account on-screen location and/or font size and/or font characteristics (e.g., a larger, bold font, may be associated with information of greater priority or greater relevance). Optionally, higher-priority elements may be processed or analyzed before lower-priority elements, in order to ensure that the system resources are utilized efficiently.

In some embodiments, the system may comprise, or may be implemented as, a Software Development Kit (SDK) or an Application Programming Interface (API), that may allow third-party developers or vendors to interface with the system, or to implement their own version (e.g., branded, white label, or the like) of the system, in an efficient manner.

Some embodiments may utilize one or more algorithms to determine or estimate real-life dimensions of a user, or of particular body parts or body regions of a user, based on one or more images of the user.

A first demonstrative algorithm estimates or determines the hips circumference of the user. The algorithm utilizes one or more of the following data, which may be generated by the system and/or may be extracted from an image of the user: the Mask image of the user; the point in which the two legs of the user connect to each other (p); the central points of the two knees (lk, rk); the external or most-external points of the left hip and the right hip (lh, rh); the head point, such as the highest point of the forehead (fh); a point in the ground or floor on which the user is standing, such as the floor point that is closes to the user (f); the height of the user (H). Some or all of these parameters may be extracted from the user image; optionally after removing possible image distortion due to an original angular perspective, thereby enabling a constant conversion ratio all across the image between pixel-based dimensions and on-screen centimeter-based (or inches-based) dimensions. The constant ratio may be obtained by dividing the height of the user in pixels, by the height of the user in centimeters (or inches); and this constant ratio is used further in this algorithm.

The estimation or calculation of hips circumference of the user may take into account the following: (a) that the cross-section of the leg, in the region of connection of the leg to the pelvic area, is generally circular; (b) that the cross-section of the region that is subject of the estimation, namely the two hips cross-section, is generally elliptic or generally oval; (c) that the sum of two cross-sections of the two legs, at the point of the legs connection, is generally similar to the area of the subject of estimation, namely the area of the two hips cross-section; (d) that the two generally-circular areas, of the two cross-sections of the legs at the legs connection point, are generally tangent to each other or are just touching each other, with little or with no overlap between the two circular areas; and/or (e) that the generally-elliptic area of the two hips, is generally tangent or just touching (or, is generally overlapping with, or is a good estimation of) the two circles of the legs cross-section, at two points that are furthest from the touching point of the two circles themselves.

Figure 17:
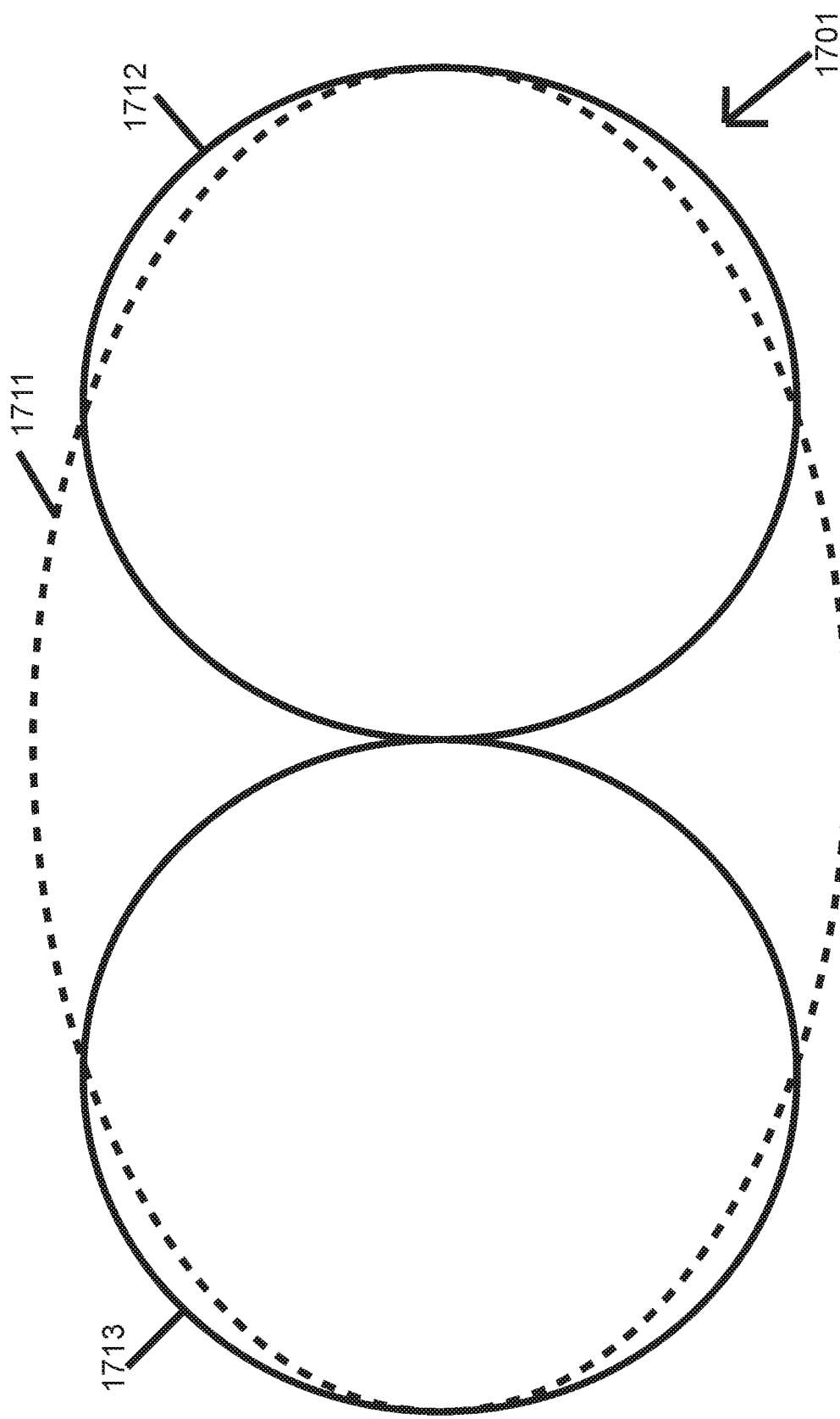
FIG. 17 is a schematic illustration of a shape-diagram which may be used by the system of the present invention.

Reference is made to FIG. 17, which is a schematic illustration of a shape-diagram 1701 which may be used by the system of the present invention. For example, demonstrated are the generally-elliptic area 1711 of the two hips cross-section, which corresponds to the two circles 1712-1713 of the legs' cross-sections.

By using the User Image Mask, the point of legs connection (p), and the external points of the hips (lh, rh), the system computes the radius of each one of the circular cross-sections; and thus computes the areas of those two circular cross-sections. The sum of the two circular areas, is identical or is similar to the area of the ellipse which corresponds to the two hips area. The ellipse is described by the equation: $x2/a2+y2/b2=1$. The value of "a" is computed as twice the radius of one circle. Based on the above equation and data, and since the area of the ellipse is known (as the sum of the areas of the two circles), the value of "b" can be computed. Based on the values of "a" and "b", the circumference of the ellipse is computed, which in turn corresponds to the estimated hips circumference.

Some embodiments may estimate or determine the waist circumference of a user, based on an image of the user. The process may utilize some or all of the following: the user image Mask, optionally after removing from it angular perspective; the point of height of the waist (w), after removal of perspective; the hips circumference (HC) as computed above; the "b" parameter of the ellipse as computed above; the constant ratio of pixel-to-centimeter conversion, as computed above; the user height (denoted H or UH).

Based on the user image Mask, and the point of height of the waist (w), the waist diameter (or the waist width) is computed (WD), in pixels; and is then converted to centimeters by using the constant conversion ratio. The waist circumference (WC) may then be computed by using the following equation:

$$4 \cdot \frac{0.1 \cdot n(252) + 0.15 \cdot n(253) + 0.2 \cdot n(254) + 0.6 \cdot n(255)}{N} \geq 0.01$$

The values of parameters "α" and "β" may be established, for example, by analyzing data of actual waist circumferences of a large number of persons (e.g., over 100 or over 1,000 persons). Some embodiments may estimate or determine the bust circumference, or the circumference of the chest area of a user, based on a user's image. The process may utilize some of the above-mentioned parameters and data, as well as the external or most-external points of the bust (lb, rb) after removal of angular perspective.

Based on the user image Mask, and the external points of the bust (lb, rb), the bust diameter (or bust width) is computed (BD), and converted from pixels to centimeters via the constant conversion ratio. The bust circumference (BC) may be computed by using the following equation:

$$BC = 2*BD + (HC/UH)^\gamma \cdot BD - (HC/UH)^\delta \cdot WD \quad\quad 5$$

The values of parameters "γ" and "δ" may be established, for example, by analyzing data of actual bust circumferences of a large number of persons (e.g., over 100 or over 1,000 persons). Some embodiments may estimate or detect the cup size of a user, particularly of a female user, based on the image of the user and/or based on one or more of the parameters or data that were obtained or computed above. For example, the cup size may be estimated based on a ratio between: the waist circumference (WC) and the hips circumference (HC) of the user.

In a demonstrative embodiment, the following determinations or conditions may be used: if WC/HC is smaller than or equal to a first pre-defined ratio R1, then the cup size is "B"; if WC/HC is greater than R1, and is smaller than or equal to R2, then the cup size is "C"; if WC/HC is greater than R2, then the cup size is "D". In a demonstrative implementation, R1 is 0.71, and R2 is 0.78. Other suitable ratio values and/or conditions may be used.

Some embodiments of the present invention may utilize a Gravitational Effect module, which may utilize the following algorithm for gravitational simulation of dressing or virtual dressing.

Demonstrative Algorithm for Gravitational Simulation of Dressing

This algorithm transforms the control and the sample points of the dress according to the gravitational forces that are acting on the cloth. The algorithm is transforming the control and the sample points of both shirts and pants. It is considering all the gravitational forces that are acting on all parts of the user's body as a function of the user's posture.

Gravitational transformation of the control points: This algorithm is transforming the dress' control points according to the gravitational forces.

This algorithm is using the following data: The dress' control points; the user's mask.

Demonstrative Description of the Algorithm's Operation:

The algorithm is calculating the distance between each of the control points and the user's mask. The distance between a control point and the user's mask is defined as the distance between the control point and the point on the mask which is the closest to it.

The algorithm decides if the garment is a shirt or pants according to the set of control points in the input.

A. If the garment is a shirt, then:
  The shirt is divided into multiple parts; for example:
    The part between the shoulder and the elbow (right arm and left arm). Herein part 1.
    The part between the elbow and the wrist (right arm and left arm). Herein part 2.
    The part between the arm pit and the hips. Herein part 3.
  The algorithm is calculating the angle of each part of the shirt with respect to the ground.
  The left and the right shoulder points are transformed to the closest point on the mask.
  The left and the right armpit points are not being transformed.
  On the arms, each outer point is transformed so that its new distance from the mask is:

$$l' = l \cdot \sin(\alpha)$$

Where l' is the new distance between the point and the mask, l is the initial distance between the point and the mask, and a is the angle between the relevant part of the arm and the ground. For the elbow points, the relevant part on the arm is part 1, for the wrist points the relevant part is part 2.

The inner points on the arm are transformed so that their new distance from the mask will be:

$$k' = k + l - l \cdot \sin(\alpha)$$

Where k' is the new distance between the point and the mask, k is the initial distance between the point and the mask, l is the initial distance between the corresponding outer point and the mask, and a is the angle between the relevant part of the arm and the ground.

The algorithm is transforming the control points on part 3 of the shirt. The algorithm decides which of the left and right hips points is farther from the ground according to the angle of part 3. The algorithm then transforms the farther hips point so its distance from the mask will be:

$$m' = m \cdot \sin(\beta)$$

Where m' is the new distance of the point from the mask, m is the initial distance of the point from the mask, and β is the angle between part 3 and the ground. The hips point that is closer to the ground is transformed so that its distance from the ground is:

$$n' = n + m - m \cdot \sin(\beta)$$

Where n' is the new distance of that hips point from the mask, n is the initial distance of this point from the mask, m is the initial distance of the farther hips point from the ground, and β is the angle between part 3 and the ground.

B. If the garment is pants, then:
  The pants are divided into multiple parts, for example:
    The part between the hips and the knee (right leg and left leg). Hereafter part 4.
    The part between the knee and the ankle (right and left legs). Hereafter part 5.
  The algorithm is calculating the angle of each part of the pants with respect to the ground.
  The left and the right hips points are transformed to the closest point on the mask.
  The left and the right middle leg points are not being transformed.
  Each outer point on the legs is transformed so its distance from the mask is:

$$p' = p \cdot \sin(\gamma)$$

Where p' is the new distance between the point and the mask, p is the initial distance between the point and the mask, and γ is the angle between the relevant part of the leg and the ground. For the knee points, the relevant part is part 4 and for the ankle points the relevant part is part 5.

The inner points on the legs are transformed so that their distance from the mask is:

$$q' = q + p - p \cdot \sin(\gamma)$$

Where q' is the new distance between the point and the mask, q is the initial distance between the point and the mask, p is the initial distance between the corresponding outer point and the mask, and γ is the angle between the relevant part of the leg and the ground.

Initial Transformation of the Sample Points:

This algorithm is transforming the dress' sample points according to the transformation of the control points. The algorithm is using the following data:
- The dress' initial control points (before the transformation).
- The dress' new control points.
- The sample points.
- The user's mask.

Demonstrative Description of the Algorithm Operation:
- The algorithm first calculates an equation of a straight line (initial line) between each couple of initial control points of each part (inner and outer).
- The algorithm is calculating the distance between each sample point and the relevant initial line.
- The algorithm is calculating an equation of a straight line (new line) between each two new control points of each part (inner and outer).
- The algorithm is transforming each sample point to a new position that uphold the conditions:
  - Its distance from the relevant new line is the same as its initial distance from the relevant initial line.
  - In the initial position of the sample point, the algorithm is finding the point on the initial line which is closest to it. Then it calculates the distance between the point on the line and the left edge of the initial line. We denote this distance by d1. The definition of d2 is the same as d1 but for the new position of the sample point and the new line. Then the algorithm calculates the length of the initial line (l1) and the length of the new line (l2). Then the condition is:

$$\frac{d1}{d2} = \frac{l1}{l2}$$

Gravitational Transformation of the Sample Points:

This algorithm transforms the sample points according to the gravitational forces that are acting on the dress. The algorithm is using the following data:
- The dress' sample points.
- The user's mask.
- The angles of parts 1-5.

Demonstrative Description of the Algorithm Operation:
- Each sample point is related to a specific part of the body (parts 1-2 left arm or right arm, inner or outer, part 4 left or right, and part 5 left leg or right leg, inner or outer).
- The inner sample points (parts 1, 2, and 5) and the hips point that is closest to the ground are not being transformed.
- The algorithm is calculating the distance of all the other sample points from the user's mask.
- Each of these sample points is transformed so that its new distance from the mask will be the current distance times the sine of the angle of the relevant part.

Figure 18:
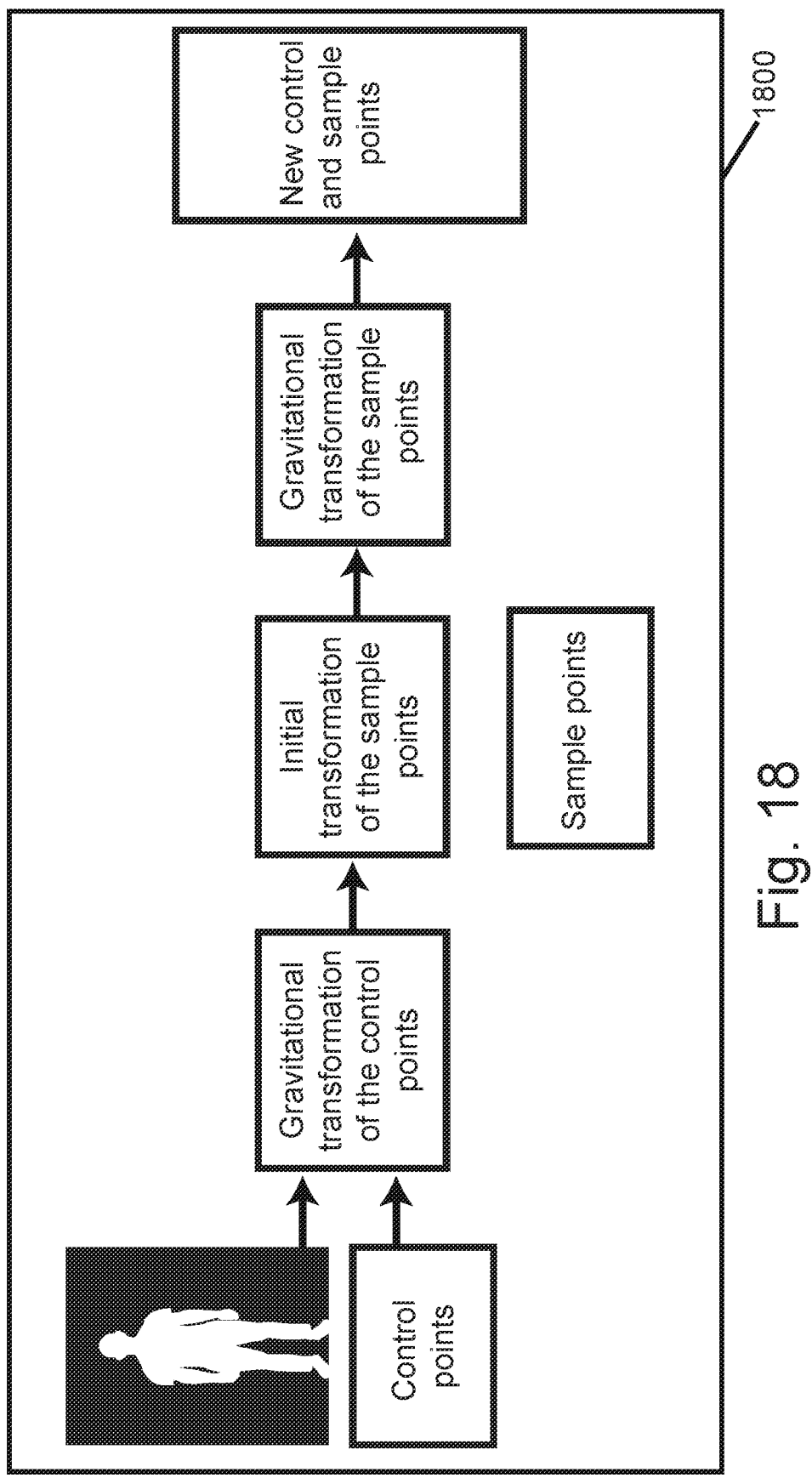
FIG. 18 is a schematic block-diagram illustration demonstrating a process of the Gravitational Effects algorithm of the present invention.

Reference is made to FIG. 18, which is a schematic block-diagram illustration demonstrating a process 1800 of the above-mentioned Gravitational Effects algorithm, as described above.

The present invention may utilize an algorithm for removal, modification, reduction and/or adding of shades or shading or shadows from an image of a user and/or from and image of a product and/or from a combined image of user-and-product; for example, the following demonstrative algorithm may be used.

Demonstrative Algorithm for Removal/Reduction/Modifications of Shadows (e.g., from User Images) and an Improvement of the Quality of the Image This algorithm detects a shadow on a user and removes it, balance the colors in the image, brightens the image, and reduces red color from the user's skin if necessary.

1. Shadow detection

This function checks detects a shadow on the user. The function's decision is based on the face of the user.
The function is using the following data:
- The original image.
- The seen body mask.

Description of the Algorithm Operation:
- The function is using "Viola-Jones Algorithm" for face detection. Then the seen body mask is cut down from the lower part of the face box. The seen body mask is now a face mask.
- The function is using "Viola-Jones Algorithm" for eyes detection. The function splits the face mask to right and left according to the horizontal center between the left and the right eyes of the user. The function now has the user's left face mask and right face mask.
- The function is using the left and the right face masks to calculate the median value of the luminance of both sides of the face, as well as the standard deviation value of the luminance of both sides of the face. Then the function checks the following conditions:
  - If the difference in the median of the luminance between the left and the right sides of the user's face is higher than 80 AND the amount of pixels with luminance of 255 in the left side of the face is less than 5 AND the amount of pixels with luminance of 255 in the right side of the face is less than 5 then the function returns true for shadow.
  - If the standard deviation of the luminance of both the left and the right sides of the face is higher than 32, then the function returns false for shadow.
  - If the median of the luminance of both the left and the right sides of the face is higher than 90, then the function returns false for shadow.
  - In any other case the function returns true for shadow.

2. Background Flash Detection

This function checks if there is a certain amount of bright pixels in the background (outside the user's body) of the image.
The function is using the following data:
- The original image.
- The user's mask that is composed from the shirt mask, the pants mask, and the seen body mask.

Description of the Algorithm Operation:
The algorithm counts the number of pixels of luminance: 252, 253, 254, and 255, here denoted as n(252), n(253), etc. The function returns true for background flash if the following condition is true:

$$4 \cdot \frac{0.1 \cdot n(252) + 0.15 \cdot n(253) + 0.2 \cdot n(254) + 0.6 \cdot n(255)}{N} \geq 0.01$$

Where N is the total number of pixels in the image.

3. Shadow Removal Algorithm

This algorithm removes a small amount of shade from the image in each iteration until the shadow detection function does not detect a shadow.

The algorithm is using the following data:
   The original image.
   The seen body mask.

Description of the Algorithm Operation:

This algorithm operates in iterations. The two conditions two enter an iteration are:
   a. The shadow detection function detects a shadow.
   b. The fraction of pixels with a red value of 255 on the face of the user is less than 0.007.

The algorithm is working in the luminance space of the image. It is using a pre-defined function that describes the output luminance of the image as a function of its input luminance. In each iteration this function is applied to the image. The more iterations, the brightened the image will be.

4. Black Balance Algorithm

This algorithm is stretching down the luminance of each of the three color channels: red, green, and blue down to zero.

The algorithm is using the following data:
   The image after the shadow removal algorithm.

Description of the Algorithm Operation:

The algorithm is calculating the mean luminance of each of the three color channels: red, green, and blue. Hereafter, the channels with highest, second highest, and lowest luminance are called: first channel, second channel, and third channel respectively.

The algorithm maps the pixels of the image in terms of color domination. I.e. the dominant color of a pixel is the one with the highest luminance.

The algorithm stretches the third channel so that 5% of the pixels in this channel will have a luminance value of 0 (a stretch is not being performed in the case where there are already 5% or more pixels in this channel with a luminance value of 0).

The algorithm is stretching the second channel. The algorithm is stretching this channel as much as possible, under two conditions:
   a. The mean luminance of the second channel does not become lower than the mean luminance of the third channel.
   b. In pixels where the third channel had originally lower luminance than the second channel, after this stretch, the third channel must have a lower luminance than the second channel.

The algorithm is stretching the first channel. The algorithm is stretching the channel as much as possible under two conditions:
   a. The mean luminance of the first channel does not become lower than the mean luminance of the second channel.
   b. The order of color domination in each pixel after the stretch must remain as it was in the original image.

5. White Balance Algorithm

This algorithm is stretching up the three color channels of the image: red, green, and blue.

This algorithm is using the following data:
   The image after the black balance algorithm.
   The user's mask.
   The seen body mask.

Description of the Algorithm Operation:

The algorithm is calculating the mean luminance of the three color channels: red, green, and blue.

The algorithm is mapping the pixels of the image in terms of color domination. I.e. the dominant color of a pixel is the one with the highest luminance.

The algorithm is stretching the luminance of the first channel up until one of the following conditions met:
   a. 5% of the pixels in the background have a luminance of 255 in the first channel.
   b. There are pixel on the user's mask that have luminance of 255 in the first channel.

The second channel is stretched up as much as possible under the following conditions:
   a. The mean luminance of the second channel does not exceed the mean luminance of the first channel.
   b. For pixels with a total luminance higher than 40 where the first channel had ORIGINALLY higher luminance than the second channel; after the stretch, in no more than a fraction of 0.04 of these pixels, the first and the second channels can change orders in terms of luminance magnitude.
   c. For pixels on the user's skin, with a total luminance higher than 40 where the first channel had ORIGINALLY higher luminance than the second channel; after the stretch, in no more than a fraction of 0.01 of these pixels, the first and the second channels can change orders in terms of luminance magnitude.

The third channel is stretched up as much as possible under the following conditions:
   a. The mean luminance of the third channel does not exceed the mean luminance of the second channel.
   b. For pixels with a total luminance higher than 40 where the second channel had originally higher luminance than the third channel; after the stretch, in no more than a fraction of 0.08 of these pixels, the second and the third channels can change orders in terms of luminance magnitude.
   c. For pixels with a total luminance higher than 40 where the first channel had originally higher luminance than the third channel; after the stretch, in no more than a fraction of 0.08 of these pixels, the first and the third channels can change orders in terms of luminance magnitude.
   d. For pixels on the user's skin, with a total luminance higher than 40 where the second channel had originally higher luminance than the third channel; after the stretch, in no more than a fraction of 0.09 of these pixels the second and the third channels can change orders in terms of luminance magnitude.
   e. For pixels on the user's skin, with a total luminance higher than 40 where the first channel had originally higher luminance than the third channel; after the stretch, in no more than a fraction of 0.07 of these pixels, the first and the third channels can change orders in terms of luminance magnitude.

6. Uniform Stretch Algorithm

This algorithm is stretching up uniformly the three color channels of the image.

The algorithm is using the following data:
  The original image.
  The image after the white balance algorithm (color balanced image).
  The user's mask.
  The seen body mask.
  The face mask.
Description of the Algorithm Operation:
The algorithm is stretching up the total luminance of the color balanced image under several conditions. The conditions depend on the result of the background flash detection function and on whether the shadow removal algorithm was applied to the image at least once.
  A. The background flash detection function returns true and the shadow removal algorithm was applied. Here the term "new pixels" refers to pixels whose luminance in the original image was less than 255. The conditions to stop the stretching in this case are:
    The amount of new pixels with a luminance value of 255 in the image is not allowed to exceed a fraction of 0.03 of the total amount of pixels in the image.
    The amount of new pixels with a red channel value of 255 in the image is not allowed to exceed a fraction of 0.05 of the total amount of pixels in the image.
    The amount of new pixels with a luminance value of 255 on the user's body is not allowed to exceed a fraction of 0.02 of the total amount of pixels on the user's body.
    No more than a fraction of 0.005 of the pixels on the face are allowed to have a luminance value of 255.
  B. The conditions to stop the stretching in the case where the background flash detection function returns false OR the shadow removal algorithm was not applied to the image:
    No more than a fraction of 0.04 of the pixels in the image are allowed to have a luminance value of 255.
    No more than a fraction of 0.06 of the pixels in the image are allowed to have a red channel value of 255.
    No more than a fraction of 0.05 of the pixels on the user's body are allowed to have a luminance value of 255.
    No more than a fraction of 0.005 of the pixels on the user's face are allowed to have a luminance value of 255.
The algorithm also returns the stretch factor for the case where only the first condition was applied in both A. and B.
7. Red Skin Reduction Algorithm
  This algorithm reduces the amount of red on the user's skin if necessary.
  The algorithm is using the following data:
    The image after the uniform stretch algorithm (uniformly stretched image).
    The original image.
    The seen body mask.
    The user's mask.
  Description of the Algorithm Operation:
    The algorithm first considers the difference between the medians of the red channel and the green channel on the user's skin both in the original image and in the uniformly stretched image. The algorithm sets a value to a variable called redSkin according to these differences:
      The difference in the new image is higher or equal to 100 and the difference in the original image is less than 100: redSkin=the difference in the new image times 0.8.
      The difference in the new image is higher or equal to 80 and the difference in the original image is less than 80: redSkin=the difference in the new image times 0.9.
      The difference in the new image is higher or equal to 70 and the difference in the original image is less than 70: redSkin=the difference in the new image times 0.92.
      The difference in the new image is higher or equal to 60 and the difference in the original image is less than 60: redSkin=the difference in the new image times 0.94.
      The difference in the new image is higher or equal to 50 and the difference in the original image is less than 50: redSkin=the difference in the new image times 0.96.
      The difference in the new image is less than 50: redSkin=0
    If redSkin is 0 then no more operations are applied to the image and the final results of the "removal of shadows from users and improvement of the quality of the image" algorithm is the uniformly stretched image.
    If redSkin is more than 0, then the image is transformed from the RGB color space to the HSV space and the S channel is decreased until the difference between the red and the green channels is less than the value of redSkin. The image is transformed back to the RGB space and returned as the final result of the "removal of shadows from users and improvement of the quality of the image" algorithm.

Figure 19:
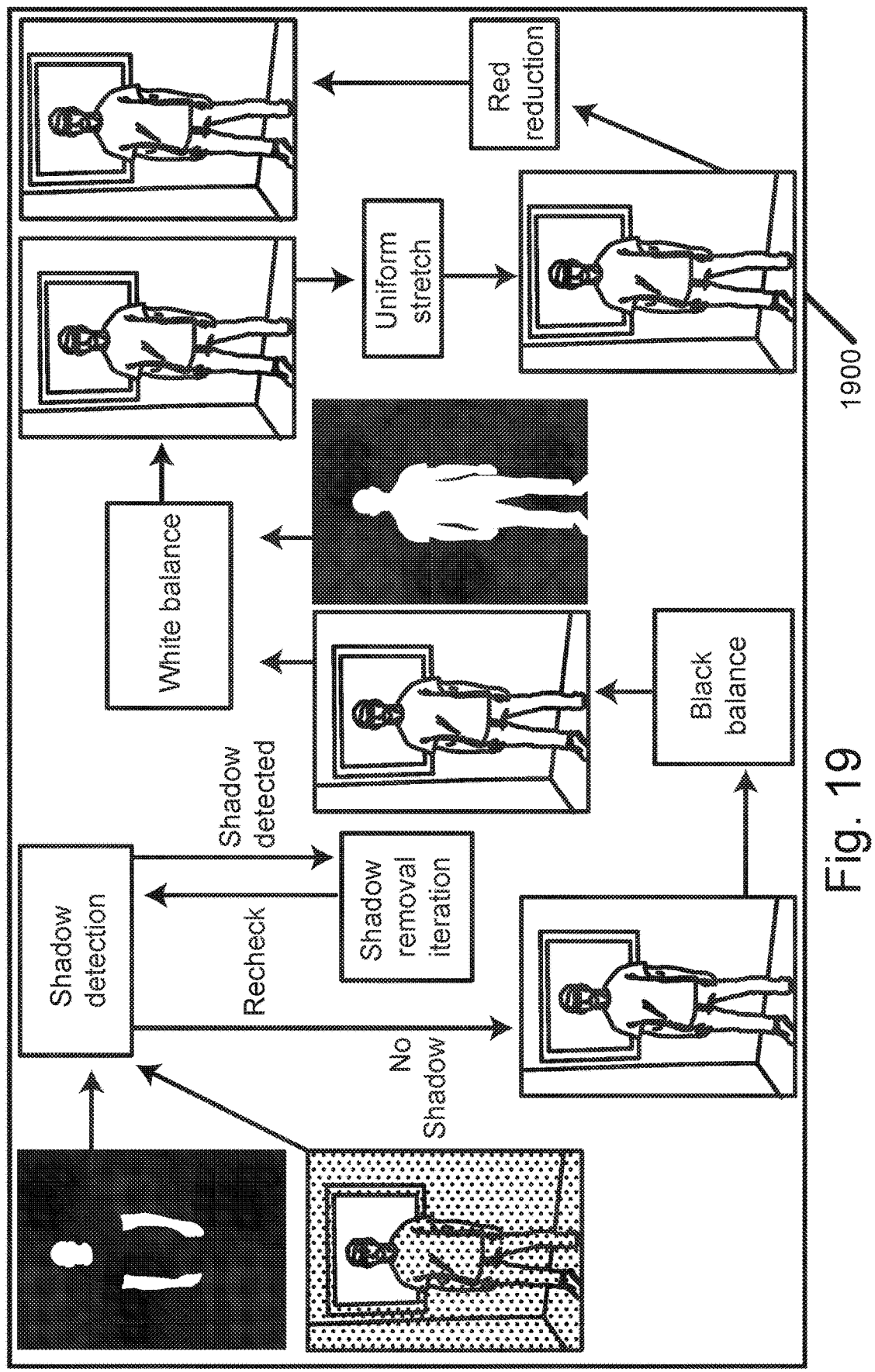
FIG. 19 is a schematic illustration of a process of image enhancement, in accordance with the present invention.

Reference is made to FIG. 19, which is a schematic illustration of a process 1900 of image enhancement, in accordance with the present invention, as described above.

Some embodiments of the present invention may utilize methods and modules for Estimating Clothing Size based on User Measurements and Cloth Properties, by utilizing a Non-Parametric Machine Learning Approach.

The system may utilize an automated algorithm for estimating a user's clothing size. The algorithm estimates the size based on the user's body measurements and the properties of the specific cloth. User measurements include the bust, hips and waist circumference and the user's height. Clothes properties include whether it is a stretchable material and a full size chart. The algorithm uses machine learning tools to learn a non-parametric model based on tens of thousands of past users' acquisitions.

The algorithm has two parts:
  1. Learning phase: learning from past experience a non-parametric model
  2. Application phase: recommend the user the cloth size given the cloth's properties and the user's measurements.

Learning Phase

The present invention may use Machine Learning with a supervised learning approach. The system may utilize labeled examples. Each such example is denoted as a data point. Table 1 define the features that compose a data point.

TABLE 1

| features in data point | |
| --- | --- |
| User height | in inches |
| Bust circumference | in inches |
| Hips circumference | in inches |
| Waist circumference | in inches |
| Is the cloth stretchable | True/False |
| Full size chart | Maps body measurements to sizes |
| Size bought by the user | One of the sizes from the full size table. |

To train the algorithm the system may harvest from the web tens of thousands of such data points. Some of the data points contain errors and need to be cleansed.

In a demonstrative embodiment, a chart or look-up table may be generated and utilized, defining the size of bust, waist and hip per each "size" (e.g., garment size, or body size). For example, body size "2" may correspond to bust size 24, waist size 21, hip size 25; whereas, body size "8" may correspond to bust size 27, waist size 24, and hip size 28.

Cleansing the Data:

The system may encounter three types of erroneous data points:

1. Some of the data is missing: for example, a user did not provide the bust circumference. For this type of errors, the system may drop the data point (do not take it into account in the learning phase) because it is not reliable, and may harm the model more than help.
2. Some of the data is ill-formatted: the system may encounter mainly two issues:
   2.1. Some of the data is given in the wrong units. In such case the system may transform it into the suitable units (e.g., from cm to inches).
   2.2. For some users instead of the bust size, the user provide her bra size. In that case the system may use a mapping of the cup size to inches according to table 2 and add the band size to come up with the bust size.

TABLE 2

| cup size contribution to circumference to inches. | | | | | | | | | | |
| --- | --- | --- | --- | --- | --- | --- | --- | --- | --- | --- |
| AA | A | B | C | D | E | F | G | H | I | J | K |
| 0 | 1 | 2 | 3 | 4 | 5 | 6 | 7 | 8 | 9 | 10 | 11 |

3. The data is non-standardized: this means that each data point is provided with respect to its own size chart. Actually, every clothes manufacturer may use its own chart. In order to learn a consistent model, the system may first transform all the data points to a single reference size chart.

GetProbabilityTable is the function that maps one size chart to another.

Input:
Current clothes size chart: denoted CSC
Reference clothes size chart: denoted RSC Output:
Probability mapping from the current clothes size chart to the reference's size chart. For example, if the user is '2' on CSC the output will provide the probability for 'S', 'M', 'L' 'XL' which are the sizes in the current size chart.

Algorithm:
  i. Compute the $L_P$ norm (p is a parameter) between measurements in CSC to those in RSC:

$$L_p(SZ_{RSC}^j, SZ_{CSC}^k) = \sqrt[p]{\sum (SZ_{RSC}^j(i) - SZ_{CSC}^k(i))^p}$$

Where $SZ_{RSC}^j(i)$ is the $i^{th}$ feature of the $j^{th}$ size in RSC and $SZ_{CSC}^k(i)$ is the $i^{th}$ feature of the $k^{th}$ size in CSC. For example $SZ_{RSC}^j$ might be 'Medium' $SZ_{CSC}^k$, might be '2' and the $i^{th}$ feature might be the bra size in inches.

ii. Use a Gaussian Kernel to transform the distances to affinities:

$$G(SZ_{RSC}^j, SZ_{CSC}^k) = \exp\left(\frac{-L_p(SZ_{RSC}^j, SZ_{CSC}^k)}{2\sigma^2}\right)$$

Were $\sigma$ is a parameter.

iii. Normalize the affinities to a probability:

$$P(SZ_{RSC}^j, SZ_{CSC}^k) = \frac{G(SZ_{RSC}^j, SZ_{CSC}^k)}{\Sigma_k SZ_{CSC}^k}$$

Where $\Sigma_k SZ_{CSC}^k$ is the sum over all sizes in CSC.

Once the data is cleansed, the system may train the non-parametric model.

Training the Non-Parametric Model:

The system may train, for example, 54 different non-parametric model(s). The reference size chart contains 9 different sizes: 'xs', 's', 'm', '1', 'xl', '1×', '2×', '3×' and '4×'. For each size the system may train two models: one for stretchable and one for non-stretchable clothing. The system may perform this for 3 types of clothing: tops, bottoms and dresses.

TrainModel is the function that performs the training:

Input:
N cleansed data points: specified in table 1. In practice the system may use about 120,000 data points.

Output:
A non-parametric model, that given measurements and clothing properties returns the probability per size.

Algorithm:
1. dissect the data points according to cloth type: top, bottom and dress.
2. further bisect each group into stretchable vs. non-stretchable clothes.
3. Each data point contributes a count of 1 to the model into a bin that corresponds to the body measurements, see FIG. 2. For each clothing type, use a different set of features to identify the bin:
   a. Tops: bust, hip and waist circumference
   b. Bottoms: height and hip and waist circumference
   c. Dress: height and bust, hip and waist circumference
4. Smooth each model with a multidimensional Gaussian kernel:

$$\frac{1}{\sqrt{(2\pi)^k |\Sigma|}} \exp\left(\frac{-1}{2}(x-\mu)^T \Sigma^{-1}(x-\mu)\right)$$

Where $\mu$ and $\Sigma$ are free parameters.

After training, the model is ready for its application phase.

Application Phase:

The goal of the application phase is to use the models to provide the user with a recommended size. In addition, it may provide the user some comments regarding the recommendation. For example, it may recommend the user 'Medium' providing that it would be 'tight on the chest' or 'Large' which is going to be 'lose on the chest'.

To achieve this, the system may utilize two functions:
1. Estimate size: applies all the relevant model and come up with a probability per size for the specific cloth.
2. Evaluate comment: provides comments per cloth size.

Estimate Size:

Input:
a data point for a new user, the cloth properties for the relevant cloth

Output:
probability per size according to the clothing's size chart.

Algorithm:
1. Apply the 9 relevant models on the input data point. The relevant data point is defined by the clothing type: top, bottom or dress and by the stretchable attribute.
2. This may give 9 probabilities, one per size. These probabilities relate to the reference model. Next, use GetProbabilityTable to get a mapping from our reference table to the clothing's actual table.
3. By multiplying the two, get the probability for each size in the current table, and output these probabilities.

Evaluate Comment:

Input:
Size probabilities
User preference towards tight or lose (optional)

Output:
Comment on each size. Comments include 'lose', 'fit' or 'tight'.

Algorithm:
1. Per size find the most probable measure
2. Take the user's measurements and measure the distance for the most probable measures. Assign 'fit' if the distance is bellow a threshold. If the distance is above threshold, assign 'lose' if the user measures are smaller than the most probable measure and 'tight' other-wise.

Some embodiments may utilize a Product Size Adjustment process or algorithm. This algorithm is simulating the appearance of a garment on a user as a function of the size of the garment and the product size recommendation. The measurements algorithm is calculating the circumferences of the user at different areas on his body, as well as the cup size for women. The size estimation algorithm is using these results to recommend on a product size, and/or to correct or modify a product size that a user had suggested. Then, the product size adjustment algorithm is using the output of these algorithms, as well as the choice of garment size in order to simulate the appearance of the garment on the user.

Algorithm and Functions:
1. Size check
   The first operation of the algorithm is comparing the choice of garment size to the product size recommendations. If they are equal, then the algorithm is dressing the user with the default garment and pleats. The default garment is the one with the same size as the size recommendation and it is ready to be used.
2. Vertical rescaling of the garment
   This algorithm is rescaling the default lengths of the garment according to the product size recommendations and the size chart of the garment. The size chart contains the dimensions of the garments for each of its possible sizes. If the garment's size chart does not exist, the algorithm is making use of a default size chart for the specific type of garment.
   The algorithm may utilize the following data:
     The product size recommendation.
     The choice of garment size.
     The default garment's image.
     The garment's control points.
     The user's control points.
     The garment's size chart.
     The default chart size.
   Description of the Algorithm Operation:
     The algorithm is vertically rescaling the default garment according to the product size recommendation, the choice of garments size, and the size chart.
     The control points are rescaled accordingly.
3. Horizontal rescaling of the dress
   The horizontal rescaling of the garment is done by transforming the control points of the garment or the user horizontally.
   The algorithm may use the following data:
     The product size recommendation.
     The choice of garment size.
     The image of the garment.
     The garment's control points.
     The user's control points.
     The garment's size chart.
   Description of the Algorithm Operation:
     If the garment's size is smaller than the product size recommendation, then the algorithm is transforming the user's control points horizontally towards the user's mask. The translation of the control points depends on the product size recommendation, the choice of garment size, and the size chart.
     If the garment's size is larger than the product size recommendation, then the algorithm is horizontally transforming each pair of the garment's control points (points on the same area of the body: elbow, wrist, etc. from both of its sides) towards each other.
4. Bust rescaling for women
   This algorithm is rescaling the bust area of women's garments.
   The algorithm may use the following data:
     The user's bust circumference.
     The user's cup size.
     The choice of garment size.
     The image of the garment.
     The garment's size chart.
   Description of the Algorithm Operation:
     If the choice of garment size is smaller than the product size recommendation, then the under bust area on the garment becomes more tight.
     If the choice of garment size is larger than the product size recommendation, then the under bust area is more loose.
     The algorithm is rescaling the color map of the garment at the bust area to achieve the proper results.
5. Pleats choice
   This algorithm is choosing the proper pleats for the garment out of a large data set of pleats images.
   The algorithm may use the following data:
     The product size recommendation.
     The choice of garment size.
     The image of the garment.
     The size chart of the garment.

Description of the Algorithm Operation:
The algorithm is choosing the proper pleats for the garment based on the following considerations:
The number of vertical pleats is growing as the size of the garment is getting larger, given that it is larger than the recommended size of the product. For garments of size that is smaller than the recommended size of the product, there are almost no vertical pleats.
The vertical pleats are becoming wider as the garment's size is getting larger, given that it is larger than the recommended size of the product.
The number of horizontal pleats is growing as the garment's size is getting smaller, given that it is smaller than the recommended size of the user. Almost no horizontal pleats exist on a garment that is larger than the recommended size.
6. Pleats rescaling
This algorithm is rescaling the chosen pleats according to the vertical and horizontal rescaling of the garment.
The algorithm may use the following data:
The pleats image that was chosen by the "pleats choice" algorithm.
The pleats control points.
The vertical and horizontal rescaling information.
Description of the Algorithm Operation:
The algorithm is rescaling the pleats in the same way that it rescaled the garment.
7. Pleats integration on the garment
This algorithm is integrating the pleats on the garment. The algorithm gets as an input the image of the garment and the image of the pleats, both after the processing of the previous algorithms. The algorithm adds the pleats to the The Applicants have realized that conventional websites or applications or "apps" or search engines, which are requested by a user to find and to display an item (e.g., a shirt that the user considers to purchase), operate in one of two ways: (I) they show the shirt, often together with other shirts, as a stand-alone item that is not worn by any human, thereby making it difficult or impossible for the current user to understand how this shirt would actually look when worn by a human in general, or by himself in particular; or (II) they show the shirt, worn by a human who is not the current user, and is typically a different looking person or model; thereby, again, making it difficult or impossible for the current user to understand how this shirt would look when actually worn by himself or herself, and not by a human model who has different skin color, different body shape, different height, different weight, different dimensions, and/or other different characteristics, relative to the current user.

The Applicants have realized that this creates a gap or barrier or obstacle, that causes many users to avoid purchasing a particular item; since they cannot see an actual appearance of the item on their own body, and thus they hesitate to place the order online. Some embodiments of the present invention may thus provide an improved system and method which enables users to efficiently see and grasp, how a particular item (e.g., garment, artistic garment, accessory, article of clothing, or other type of object) would look or would appear if worn or carried by the particular user; thereby enhancing the user experience and providing to the user artistic inspiration or fashion inspiration based on what the user or other particular users are wearing or are virtually wearing.

The Applicants have also realized that this creates other problems; for example, a user seeing the shirt displayed on a fashion model who is much thinner and taller than the actual user; the user then believes that the shirt would fit her in a similar manner, only to later be disappointed by this purchase; which in turn may cause adverse effects to the vendor, for example, initiation of a Return transaction in which the item is returned to the vendor (often with "free shipping" that the vendor has to pay for), authoring of negative reviews or low scores with regard to the vendor and/or the item, and/or other adverse effects.

The Applicants have realized that it would be beneficial to construct and to operate a new system, which generates search results of items or products, or that shows a single search result or multiple search results, in a particular user-specific context that characterizes the actual current user; rather than displaying one or more images without any context (e.g., just images of shirts, without any human wearer), and rather than displaying one or more images with a foreign context that does not characterize the actual current user (e.g., image of the shirt worn by a fashion model that looks differently from the actual user). Accordingly, the present invention provides a system and a method of generating such search results; as well as generating content that is not necessarily search results or that is not search-related at all, for example, for generating and displaying suggested content or suggested items, or for generating other content (e.g., in a side-by-side view or other suitable format).

The Applicants have realized that it may be beneficial to construct and to operate a system that, when asked to show images of "black leatherjacket", does not merely display 1 or 16 image(s) of a black leather jacket on a hanger; and does not merely display 1 or 12 image(s) of a black leather jacket worn by one or more fashion models; but rather, a system that generates and displays one or more image(s) of a black leather jacket (or multiple, different, such jackets) that is virtually worn by an image of the actual current user; thereby enabling the current user to grasp and to understand how this search result (e.g., onejacket, or 10 jackets) would actually look and would appear if worn by himself or herself. It is noted that for demonstrative purposes, some portions of the discussion herein may relate to a single article of clothing; however, the present invention may be utilized to present multiple garments or multiple items, side-by-side or in a list or a scroll-able format, for example, corresponding to a particular person (e.g., identified by his name or username or screen-name) and further corresponding to a "virtual closet" or "virtual wardrobe" of such user or person.

In some embodiments, for example, the current user may capture an image of herself (e.g., "selfie" image), or may ask a friend to assist in capturing her image; or may otherwise produce a photo of herself (e.g., by photographing herself in a mirror; by scanning a ready-made photograph of herself; by uploading a photo of herself). The image of the current user may be uploaded or otherwise transmitted to a remote server, for example, of an online vendor, or a search engine, or a social network website, or the like.

At the server, an image analysis unit may perform image analysis of the uploaded photograph of the user. For example, a face/head extractor unit may extract an isolate portion of the image that corresponds to the face or the head of the user; a Body Organ extractor unit may extract and isolate one or more portions of the user that are also indicative of the user (e.g., right hand, left hand, neck area, upper chest area; possibly knee area and leg area, for utilization with skirts and dresses and short pants).

Additionally, a dimensions extractor unit may calculate or may estimate the dimensions of the user, based on image analysis and optionally using machine learning and computer vision processes. For example, a ratio between the head of the user and the entire body height, may be used to estimate the height of the user; which in turn may also be used in order to estimate the width (east to west) of the user.

Optionally, a User Features extractor unit may operate to extract other unique characteristics of the user; for example, to analyze the image of the user and to determine that the user has a unique tattoo on her left arm, or a unique birthmark on her neck, or the like.

The server may then perform the requested search, and may internally store the relevant search results to be displayed; such as, a single particular article of clothing (e.g., a single shirt), or multiple such article of clothing (e.g., multiple shirts). However, instead of merely displaying the search results(s) that are obtained from a general database or catalog of items or products, the system may proceed to modify each search result, prior to displaying it to the current user, wherein the modification causes the product to be shown in a user-specific context that is specific to the actual current user.

In a first demonstrative example, user Adam captures a photograph of himself, and uploads it to the server of the search engine or of an online retailer. Later, user Adam searches for "leather jacket 3794" (for example, the number "3794" being a SKU number of a product; or alternatively, by using a model number of a product, or other product identifier), which is a particular type or model of a leather jacket that Adam is considering to purchase. The server fetches from a database, the generic or general-purpose data about that item: a general "stock image" of the jacket, the price, the available sizes, and other data. Then, an image augmentation/modification unit, modifies the stock image of the product; for example, by adding the image-portions of head and neck of the user Adam over the top area of the leather jacket, and by adding image-portions of Adam's hands at the ends of the sleeves of the jacket; thereby generating a user-tailored image that depicts the leather jacket, virtually dressed on the image of the user Adam, and/or by virtual re-construction of an image that emulates or simulates how the user would appear if the user wears or carries that particular item or garment based on the user's own image and based on one or more images of the product or garment; and ensuring that the left-hand of Adam shows his unique tattoo or birthmark that was detected by image analysis of his uploaded photograph. Then, instead of showing to user Adam the Product Page with the "stock photo" of the jacket on a hanger or on a shelf, the server shows or serves the modified image of this particular leather jacket as modified to appear to be worn by user Adam, based on his analyzed user image. Accordingly, Adam can see the product page, with the particular product being virtually dressed on an image of himself, thereby giving to Adam a much better grasping of how this particular jacket would appear on himself in real life, and facilitating his decision whether or not to purchase this item.

In a second demonstrative example, user Bob is not comfortable with capturing and uploading his own photograph to the server; or, user Bob utilizes an electronic device that is not able to capture a photograph (e.g., a desktop computer that lacks a camera). In such case, user Bob may request from the server to show him a set of pre-defined images of fashion models based on one or more user-selected parameters, for example, skin color, height, weight (or width), hair color, gender, body features (e.g., birthmark, tattoo), hair style, or the like. For example, user Bob may indicate to the server (or to a local "app" or application) that he selects a darkskin male image having a beard, a moustache, and long brown hair, and being 6 feet tall; whereas user Carla may indicate that she selects a white-skin female image having short blond hair and being 5 feet tall. Then, when user Bob requests from a search engine (or, from an online retailer or an online catalog or an online vendor) to show search results for the query "black leatherjacket", the search results include various types of such jackets, that are virtually dressed on the selected image that Bob defined (when user Bob performs the search) or that are virtually dressed on the selected image that Carla defined (if Carla performs the search). Accordingly, each one of these users, sees the search results that comprise the relevant items (e.g., jacket) that are virtually dressed on an image of a fashion model (or other person, other than the user himself/herself) based on pre-defined user-specific features that were defined; thereby allowing the user (Bob or Carla) to better grasp and understand how the desired item (black leather jacket) would appear or would look on a body type of their choice.

In a third demonstrative example, user David captures his own image, and uploads it to a server of an online retailer (e.g., "Gap.com"). Then, when user David searches for "washwell slim fit jeans", or for product number (or SKU number) "321515", instead of receiving a search result with a generic photo of jeans pants, on a shelf or on a hanger or worn by a random fashion model who does not resemble the user David, the system generates and serves or displays an image showing David virtually dressed with the desired jeans pants.

The system may thus generate, compose, serve and/or display a set of graphical search results or query results, one next to the other or one after the other (e.g., allowing a user to scroll or swipe among them), each image being an Augmented Reality (AR) item in which an image of the actual user that performs the search, or alternatively, an image of a human that has characteristics that are defined by the searching user (e.g., gender, height, weight, hair color, hair style, body features, etc.), are virtually dressed by the item (e.g., if the item is an article of clothing), or such that the human user (or its selected substitute image) is shown in a modified context based on the search results.

It is clarified that for demonstrative purposes, some portions of the discussion herein may relate to a user uploading a photograph of himself, for the purpose of enabling the system to generate contextual graphical search results of that user (or its defined substitute) virtually dressed with selected clothing article(s). However, the system may be used with a variety of other contexts and items; such as, for automatically replacing a background or at least apportion of a background of an image in order to assist the user to grasp and to see how a particular object would look or would appear if placed in a particular location or context (e.g., room, living room, office, yard); for example, a user may capture or upload a photograph of his living room, may perform a search for a "red carpet", and the system may then show him various types of red carpets that are virtually placed into or onto the particular, imaged, living room of the actual user; thereby enabling the user to more easily grasp how each such "red carpet" search result would actually appear in his own, particular, living room. Similar contextual modification may be performed, for example, if the user searches for a furniture (e.g., "brown chair"), an art piece (e.g., "framed picture of a bird"), and/or other suitable items which may be augments, modified and/or rendered into or onto or within or in proximity to a user-defined context (e.g., an image of the user himself; an image of a fashion model that is selected by the user; an image of a substitute human that the user selects from a pool of options, or that the user defines by selecting particular characteristics; an image of another article; an image of a room or a house or other spatial location or zone; or the like).

Similarly, the system of the present invention may enable a user to check how an accessory (e.g., bracelet, necklace, earrings, glasses, or the like) would appear in the context of his own image; for example, the user uploads a photograph of his upper body or full body, and searches for the query "green necklace", causing the system to display multiple search results of multiple, different, green necklaces, each one being virtually dressed onto or into the image of the particular user that performs the search. It is noted that some embodiments may perform virtual dressing of a user with multiple, different, garments or clothes; thereby enabling the user Becky to see, for example, how she would appear (based on her own, uploaded, image) if she wears (i) a particular red skirt, and (ii) a particular black jacket, and (iii) a particular green necklace.

Similarly, the system of the present invention may enable a user to check how a particular fashion item (e.g., cosmetic product; lipstick; nail polish; makeup shade; etc.) would appear in the context of her own image; for example, the user uploads a photograph of her upper body or full body, and searches for the query "Dark Red Nail Polish", causing the system to display multiple search results of multiple, different, instances of the user's own picture in which various types of dark red nail polish is added to her fingernails.

The system may automatically perform calibration, normalization and/or resizing of image-based search results, in order to enable the user to better grasp how various items that are all search results of a single search query, would appear in a particular AR context. For example, the website of "Gap.com" may include a "black leather jacket" that is represented as a jacket image at a resolution of 600×500 pixels; whereas the website of "OldNavy.com" may include a "black leather jacket" that is represented as a jacket image at a resolution of 640×620 pixels. The system may automatically resize each one of the image search results, for example, to a single, same, size or resolution (e.g., resizing each one of them to be exactly 480×480 pixels); and then the system may modify each one of the already-resized images, to be "virtually dressed" on the image of the actual user Adam, or on the image of a fashion model that user Adam defined (e.g., by choosing the model's gender, height, hair color, hair style, or the like). The multiple AR contextually-tailored images of the two jackets, may be displayed side-by-side for comparison, or sequentially (e.g., allowing the user to swipe or scroll among the search results), all images resized to the same of essentially similar dimensions, enabling the user to compare how each "black leather jacket" would appear on his own body; even though the original, server-side images had resided on different computer servers, which are owned and/or operated by different entities, and are provided initially in different resolutions or image-sizes or image-dimensions. It is noted that the resizing operation is only a non-limiting example of modification operations that may be performed on image search results; and other operations may be performed, for example, shrinking, enlarging, zooming in, zooming out, rotating, flipping, mirroring, replacing background, modifying background, framing, blurring, sharpening, cropping, rotating along one or more axis lines, or the like, in order to ensure that the resulting image is indeed an Augmented Reality (AR) modified image that is as realistic as possible relative to the actual user and/or her actual surroundings.

It is noted that each search result or product page, may further comprise other User Interface (UI) elements to enable the user to proceed with performing other operations; for example, a link or hyperlink or button enabling the user to browse to the product page (e.g., from a list of image-based search results), and/or enabling the user to add a particular product (whose image was contextually-modified) into a virtual shopping cart of the user, and/or enabling the user to initiate or to perform a purchase transaction regarding the depicted product, or the like.

For demonstrative purposes, some portions of the discussion herein may relate to modifying or generating a single two-dimensional image (e.g., of a leather jacket) that is modified based on a user-specific context (e.g., the leather jacket being virtually dressed on an image of user Bob). However, the system of the present invention may similarly generate, modify, augment and/or serve other suitable formats of search results, for example: a set or batch or group of multiple contextually-modified images of the product (e.g., front side of the leather jacket virtually dressed on user Bob; right side of the leather jacket virtually dressed on user Bob; left side of the leather jacket virtually dressed on user Bob); a video clip or animation in which the item is modified based on the context (e.g., a video clip or animation that shows the leather jacket being virtually dressed on user Adam), optionally allowing to view 360 degrees around the product, or to see zoomed-in or zoomed-out features, depth features, shading features, or the like); a three-dimensional model that may be generated, showing the product (e.g., black leather jacket) being virtually dressed on a three-dimensional model of user Bob, enabling the user to rotate or spin the three-dimensional model on his screen; and/or other suitable formats.

In some embodiments, the system may operate in accordance with the following method. A web-crawler or other mechanism may collect data from online sources (e.g., online vendors, online retailers, search engines), and may collect data and meta-data about products (e.g., product name, product SKU number, product price, direct link to product page at the online vendor, generic image(s) of the product, tags or tagging information that is associated with the product, or the like). The collected data is stored in a database or other repository; and a calibration engine analyzes all the images, and optionally re-sizes some or all of the images in order to ensure that all the products in the same category (e.g., "summer dress", or "leather jacket") are resized or converted to a single, common, size or resolution (e.g., 640×640 pixels). A morphologic analysis engine may further analyze the collected data and meta-data, and a tagging engine may extract and/or create tags for each product image (e.g., based on original tags that were obtained from the vendor's web-page; or based on computer vision algorithm that determines that the product includes a Dress or a Jacket). The user uploads her photograph, which is analyzed by an analysis engine that detects body parts (e.g., head, arms, hands, legs, knees, neck), and/or detects other body features (e.g., hair color, hair style, tattoo, birthmark, skin color) or accessories that the user already wears (e.g., necklace, bracelet), and optionally detects or extracts or maintains the background of the user's image in order to maintain the unique background for AR purposes (e.g., user Carla is standing next to her motorcycle in her uploaded image; thus the nearby motorcycle and the street environment is extracted and is maintained for AR rendering of virtually-dressed items that Carla will later browse). Then, when the user enters a search query (e.g., "summer dress"), the search results are obtained from the database via the query; and each image of each search result is modified in a manner that virtually dresses the product on the image of Carla, within the particular background that was included in the original image uploaded by Carla.

In some embodiments, a body dimensions analysis engine may optionally analyze the originally-uploaded image of Carla; and may determine that she is particularly tall, or has a particular set of dimensions (e.g., very thin, or very fat, or very short, or very tall). Optionally, the search engine and/or the online retailer server, or a third party server, may utilize the estimated ratio or dimensions in order to filter and/or discard search results, or in order to at least add a warning notification regarding some search result items, if they do not match the determined ratios or dimensions. For example, the image of user Jane may indicate that she is very tall and fat or wide; and this may cause the search engine or the retailer server to filter-out or to discard or to hide a search result for "summer dress" that is available only in size number "2", as most-probably not fitting such body type; or alternatively, to display that product as a valid search result, but to also add a notification or warning that "This item is only available in size 2, please check that this product is suitable for you".

It is noted that such filters or inclusion/exclusion constraints may be generated to various other (non-clothes) types of products; for example, a user may upload a photograph of his living room, in order to have the living room "virtually dressed" with various Carpets that are offered for sale; the system may analyze the uploaded image of the living room, for example, based on detection of a standardly-size item (e.g., by recognizing that there is a standard Electric Socket on the wall and thus knowing its standard size; by recognizing that there is a Coca Cola bottle of 1.5 liters on the shelf and thus knowing its standard size), and the system may thus further estimate what is the available floor size that can be carpeted (e.g., maximum available floor of 2×3 meters). Once the size is deduced or determined based on computer vision, the system may filter-in or may keep only search results that adhere to such size constraints; or the system may filter-out and may exclude search results of greater carpets, or may display them with a "warning notification" that they may be too large for the particular living room being considered.

Furthermore, a dimensions/ratios estimation unit may be utilized in order to perform data mining and data aggregation, and to provide beneficial information to vendors and retailers, or to be used as filter-out or filter-in search conditions or constraints, or inclusion conditions or exclusion conditions. For example, the system may accumulate data, indicating that 70 percent of female users, that are determined to be tall and thin (based on computer vision analysis of their uploaded photographs), are searching for "flower summer dress"; thereby indicating to a particular retailer that such product has demand for this type of body ratio or body characteristics. It is noted that this insight may not be readily available to the retailer without the system of the present invention; since the retailer may be relying on sales data of actual sales, which may reflect what shoppers has actually purchased, but do not necessarily reflect which items potential shoppers have searched for and did not purchase (e.g., due to lack of inventory). The analyzed data may be used for user clustering, in order to identify a group of users that have a common set of body parameters (e.g., height), and how searched or browsed for a particular item (e.g., summer dress). The system may further generate trends forecast, based on such search patterns of multiple users.

In some embodiments, two different users that perform the same search query, at the same search engine or online retailer, may receive different search results, due to at least one or more of the following parameters: (a) they may receive the "same" list of leather jackets when they search for "black leather jacket" at "Gap.com", but the search results that user Adam gets are virtually dressed on Adam's image, whereas the search results that user Bob gets are the same leather jackets but they are virtually dressed on Bob's image; and/or (b) based on image analysis of the uploaded photograph of user Carla, the system may determine that the "mini skinny summer dress" should be filtered-out and excluded from the search results displayed for user Carla, but should be included in the search results displayed for user Jane (based on the analysis of user Jane's own image); and/or (c) based on other parameters, such as, user-specific purchase history or browsing history, user-specific data obtained from social media account or from user-defined settings or preferences, or the like).

Figure 20:
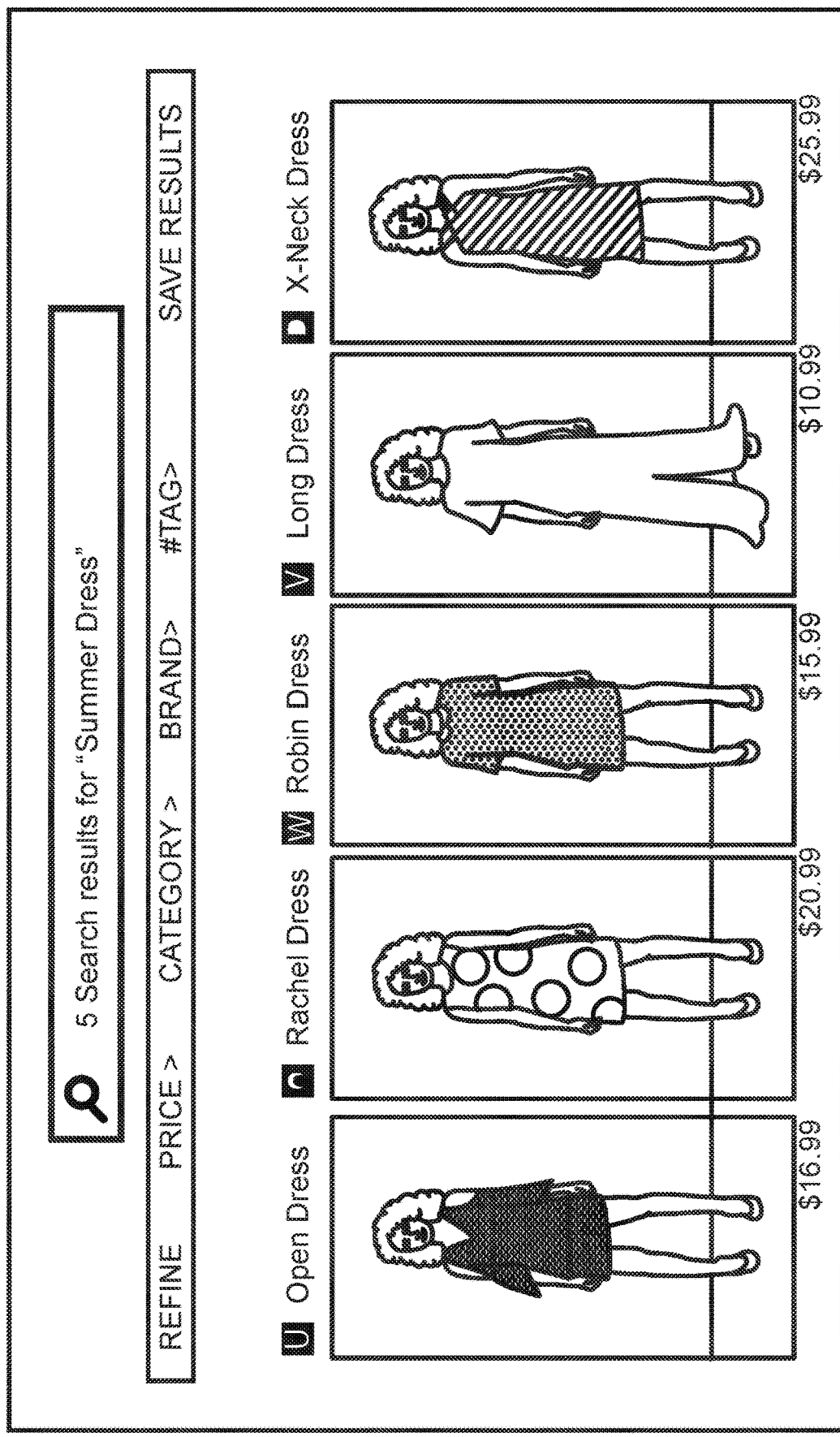
FIG. 20 is a schematic illustration of enhanced search results that are generated by the system of the present invention.

Reference is made to FIG. 20, which is a schematic illustration of enhanced search results 2000 that are generated by the system of the present invention. For example, user Carla has uploaded her own photograph, in which there is shown her light-brown skin color, her arms and legs, her "spaghetti style" white shoes, and her smiling face with her hair style (curly, brushed to the left side of Carla and to the right side of an observer). Carla then utilizes a search engine, or a retailer's website or "app" or application, in order to search for a query such as "Summer Dress". Instead of receiving multiple search results of generic images of summer dresses shown on a hanger or shown on a shelf or shown on a third person (e.g., a fashion model), the system generates, serves and/or displays to Carla her user-specific, virtually tailored, search results; for example, the five images shown.

For example, from left to right, a first search result is an image of a short flower-themed summer dress, shown virtually dressed on Carla's body based on her own image that she uploaded, and clearly showing Carla's own face, as well as her arms, her legs, and her unique "spaghetti style" white shoes; the second search result shows a similar image of another dress with a front-side zipper, virtually dressed on the image of Carla; the fourth search result shows a long summer dress or gown, virtually dressed on the image of Carla, but this time hiding all of Carla's right leg and hiding most of Carla's right leg, since this is an elongated dress that reaches the ground; and so forth, thereby providing to the user Carla a real-life understanding and grasping of how the various different summer dresses, will actually appear if worn by her. Optionally, the system may operate to maintain in the generated image, the entire background or portions of the background of the image that Carla uploaded, in order to make the search results even more personalized to her and to make her purchase decision more efficient. For example, the photograph that Carla uploaded includes Carla standing next to her motorcycle; and accordingly, the system identifies that in addition to Carla, the uploaded image contains particular background features that should be maintained, thereby generating the five search results of the five summer dresses to be virtually dressed on the image of Carla standing next to her same motorcycle, or with the same image background of the original uploaded photo; thereby producing a realistic, real-life image of the product, virtually dressed by the actual user, and virtually located in the particular environment or spatial location that appeared in the originally-uploaded image of the actual user.

Each one of the search results, is also a click-able link that redirects the user to a particular product page or particular vendor web-site, in which the shown product can be purchased online. Additionally or alternatively, each search result may be accompanied by UI elements enabling immediate purchase of the product (e.g., a button of "click here to add to cart and checkout through Amazon"), thereby shortening the time or the steps required for completing the purchase transaction. Optionally, if the search results are generated by a third-party server that is not controlled by the online retailer, the third-party server may perform steps to ensure that the third-party server operator receives a commission or an affiliate fee or referral fee or other consideration, for facilitating the purchase transaction.

Figure 21:
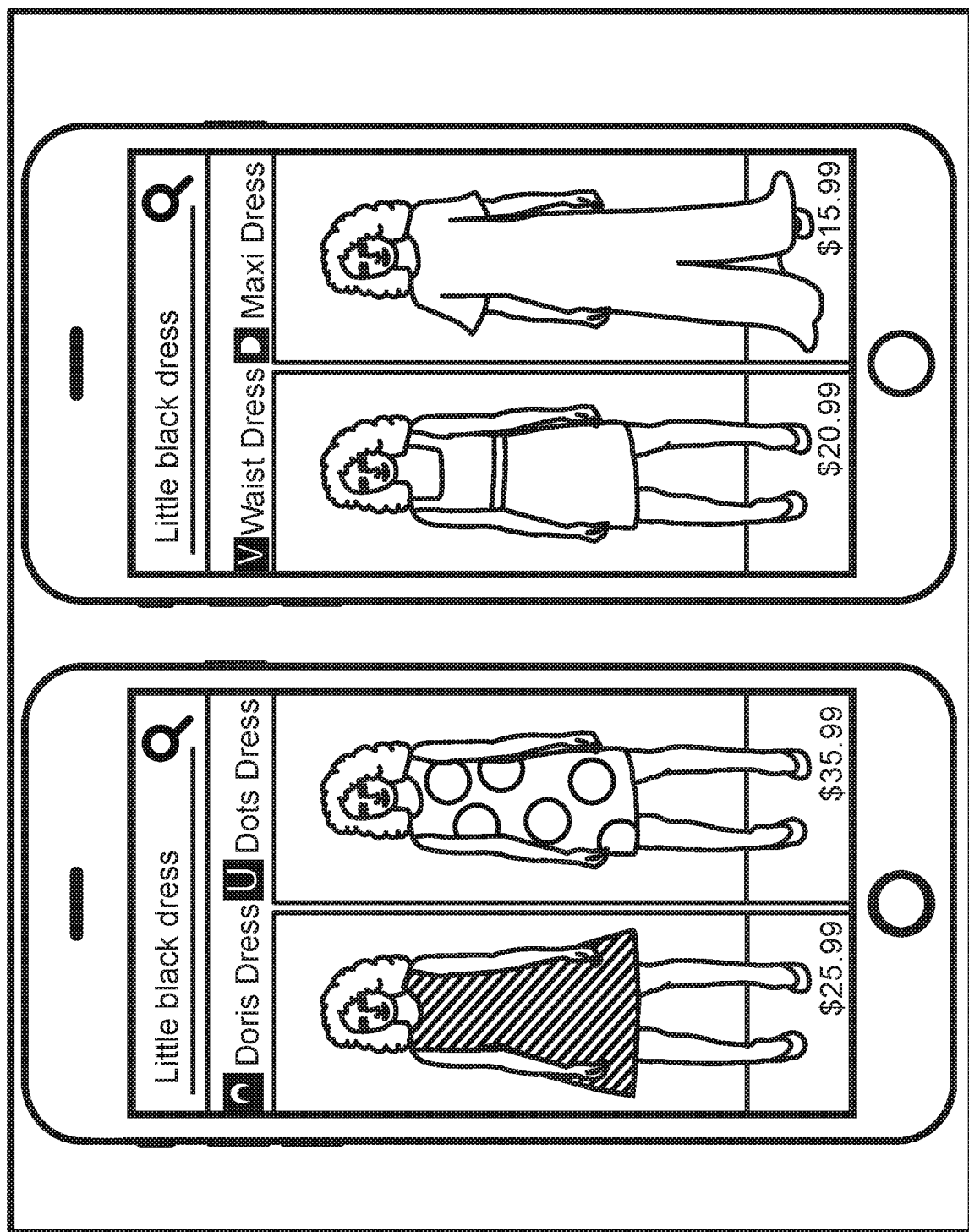
FIG. 21 is a schematic illustration of other enhanced search results that are generated by the system of the present invention.

Reference is made to FIG. 21, which is a schematic illustration of other enhanced search results 2100 that are generated by the system of the present invention. Augmented Reality (AR) search results, may be displayed side-by-side, and/or may be displayed in a mobile-friendly or touchscreen-friendly presentation format, in which one or more images are shown at a time, and other images are displayed only upon a swipe or a scroll command is performed manually by the user, or are shown at pre-defined time intervals (e.g., autonomously scrolling the search results every two seconds, in an automatic slide-show mode).

Figure 22:
FIG. 22 is a schematic illustration of still other enhanced search results that are generated by the system of the present invention.

Reference is made to FIG. 22, which is a schematic illustration of other enhanced search results 2200 that are generated by the system of the present invention. For example, a particular user Becky is shown, based on her own real-life image, being virtually dressed by multiple "black dress" products from multiple different retailers or vendors; all of them shown side-by-side or in a scroll-able interface, that allows the user Becky to see how she would appear, herself, if she wears these various types of "black dress" items; thereby enabling her to choose more efficiently the particular dress or dresses that appear to her more pleasing to her taste.

In some embodiments, a Background Modification module may handle the extraction, modification and/or replacement of a background or of a context on which the product is shown, even though the product is virtually-dressed or virtually-placed on the same actual user. For example, as shown in the following demonstrative drawing, user Jane has uploaded her image; and product search results are shown for Four different "summer dresses" based on her "summer dress" search query, each one of the four search results shows the relevant summer dress being virtually dressed on the body of Jane based on her originally-uploaded image.

Optionally, user Jane may request to see the virtually-dressed image of herself, on varying backgrounds, such as, outdoor next her office (first image from the left), in her kitchen (second image), in her garden (third image), and in her office (fourth image). The system may replace of modify the background of each search result, based on a generic image of such place (e.g., generic flower garden, generic office space, generic kitchen, or the like); or, the system may utilize actual, real-life backgrounds that were extracted from one or more photographs that the particular user Jane has uploaded; thereby enabling the user to see and to grasp, not only how each item will appear when worn on her own body, but also how it would appear when she wears it in various spatial locations or various surroundings.

In some embodiments, the system may autonomously perform background modification or background replacement, based on morphologic and/or contextual analysis, based on Natural Language Processing (NPL), based on tagging or meta-data, or the like; even if the user did not request to change backgrounds, and/or even if the user did not supply alternate backgrounds, did not upload them, or did not select them from a set of backgrounds. For example, the system may detect that user Carla is searching for "summer dress"; and that the first search result, on "Gap. com", has a textual description (or a user's review) of "an excellent summer dress to wear for work in your office", and thus may automatically and autonomously generate the virtually-dressed image of Carla with that particular dress, shown on the background of an office space; whereas, the system may detect that the second search result, on "Old-Navy.com", has a textual description of "Pretty summer dress, perfect for the beach", or is also tagged with the tag of "beach dress", and may thus generated the second search result to show Carla virtually-dressed with the second dress but shown on the background of the beach.

Figure 23:
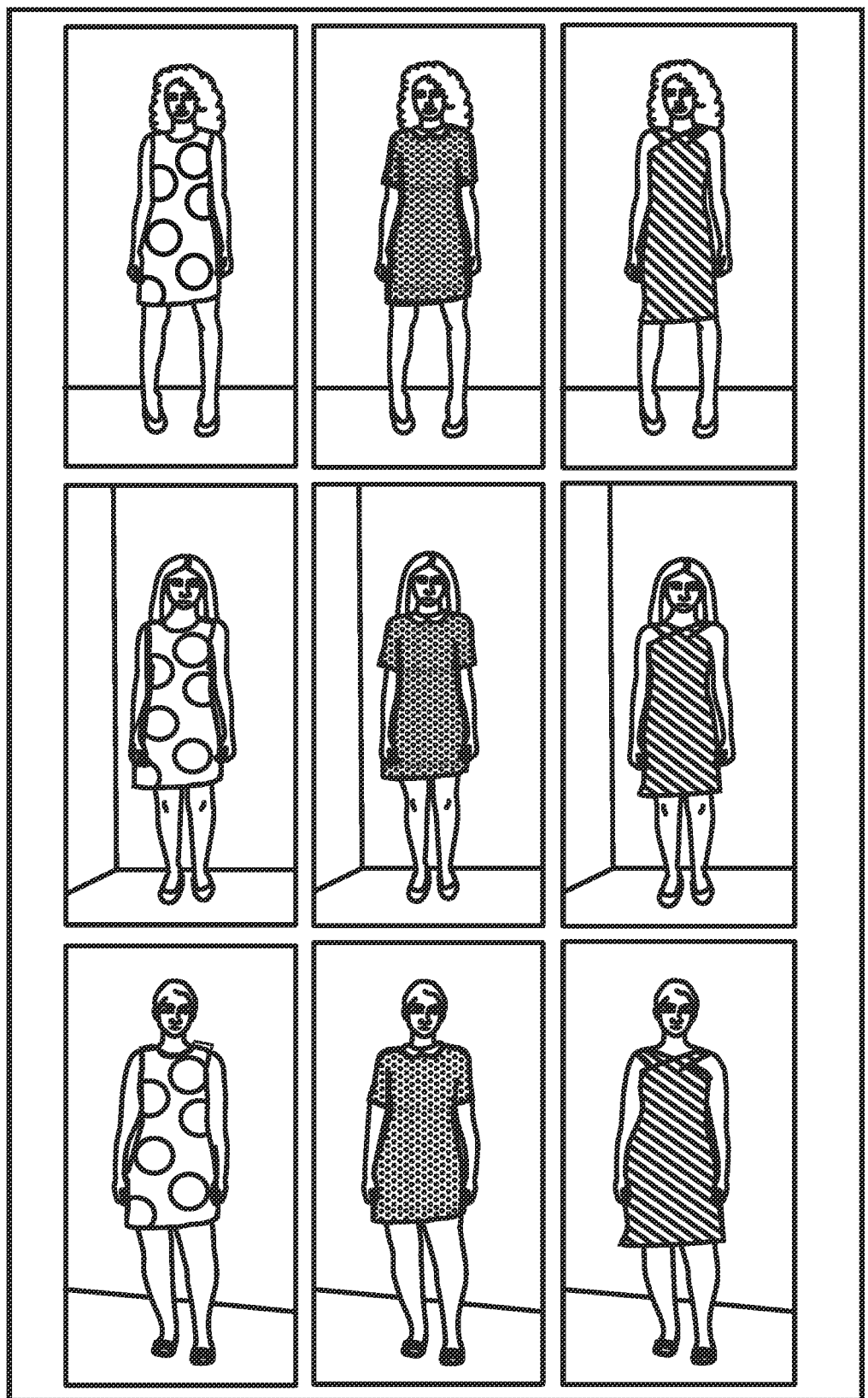
FIG. 23 is a schematic illustration of yet other enhanced search results that are generated by the system of the present invention.

Reference is made to FIG. 23, which is a schematic illustration of enhanced search results 2300 that are generated by the system of the present invention. It demonstrates how the system enables to generate a user-tailored or user-personalized catalog of products, each one of them depicted as virtually-dressed on: (a) the actual user herself, based on her uploaded image; or, (b) a particular other person (e.g., a celebrity, a singer, a fashion model, a television figure) that the user selects from a pre-defined set of images of such other persons, or that the user uploads or otherwise provides to the system (e.g., via a link or pointer to an image of that celebrity or model or third party).

For example, the first row shows three particular search results of "summer dress", each one of those three dresses being virtually-dressed on the image of the actual user Carla herself. Alternatively, the second row shows the same list of search results, but each dress is depicted virtually-dressed on an image of a famous singer that the user Carla selected from a list of persons. Alternatively, the third row shows the same list of search results, but each dress is depicted virtually-dressed on an image of Jane who is Carla's sister, since Carla plans to purchase a summer dress for her sister, and based on an image of Jane that sister Carla has uploaded to the system. The system thus enables a vendor or retailer, to generate in real-time a personalized catalog that is user-specific tailored to a particular user, based on her particular appearance and/or preferences; while relying on the already-existing database of generic images of products, and by utilizing a single image of the user herself, or a single image of a third-person that the user selected or uploaded.

The system may thus enable a user to switch an entire catalog of products, or an entire set of search results, or a particular item or items, among various "view types"; for example, a "Myself/Me" view, in which each of the products is virtually placed on the image of the actual user himself; a "Like Me" view, in which each product is virtually placed on an image that the user selects as being generally-similar to his own body type; a "Celebrity" view, in which each product is virtually placed on a user-selected image of a celebrity of his choice; a "Different User" view, in which each product is virtually placed on an image of another person (e.g., sister of the actual user, who is shopping for a birthday dress for her); or other suitable presentation formats.

As discussed, the system may further modify, replace, or otherwise augment or change the background of each such image, in order to further personalize the catalog to each user, based on user-specific data (e.g., browsing history, shopping history) and/or based on contextual analysis, image analysis, tagging analysis, NLP analysis, or the like (e.g., showing the "beach summer dress" on a background of a beach, while showing the "workplace summer dress" on a background of an office).

Figure 24:
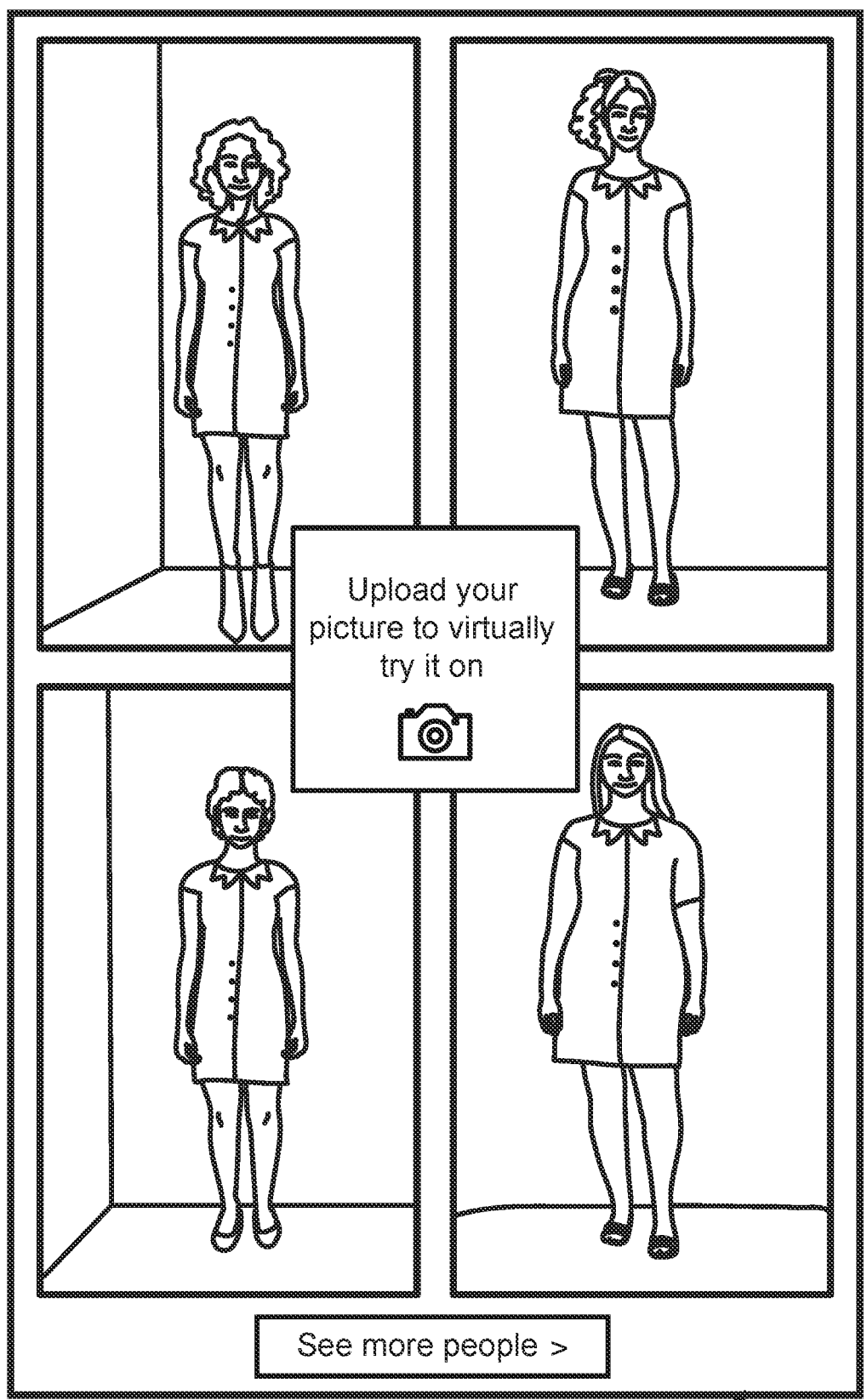
FIG. 24 is a schematic illustration of an enhanced product page that is generated by the system of the present invention.

Reference is made to FIG. 24, which is a schematic illustration of an enhanced product page 2400 that is generated by the system of the present invention. A product page or a web-page may be dynamically generated or is modified in a manner that entices a user to upload her own photograph in order to view user-specific depictions of the product. For example, a product page for a particular summer dress, is generated to show, instead of one single generic summer dress, four depictions of that particular dress being virtually-worn on four different female users of different types (e.g., different skin colors, different heights, different hair styles); and a notification or UI element invites the current user to upload her own photo in order to, similarly, see her own image being virtually-dressed with that particular dress or product.

Figure 25:
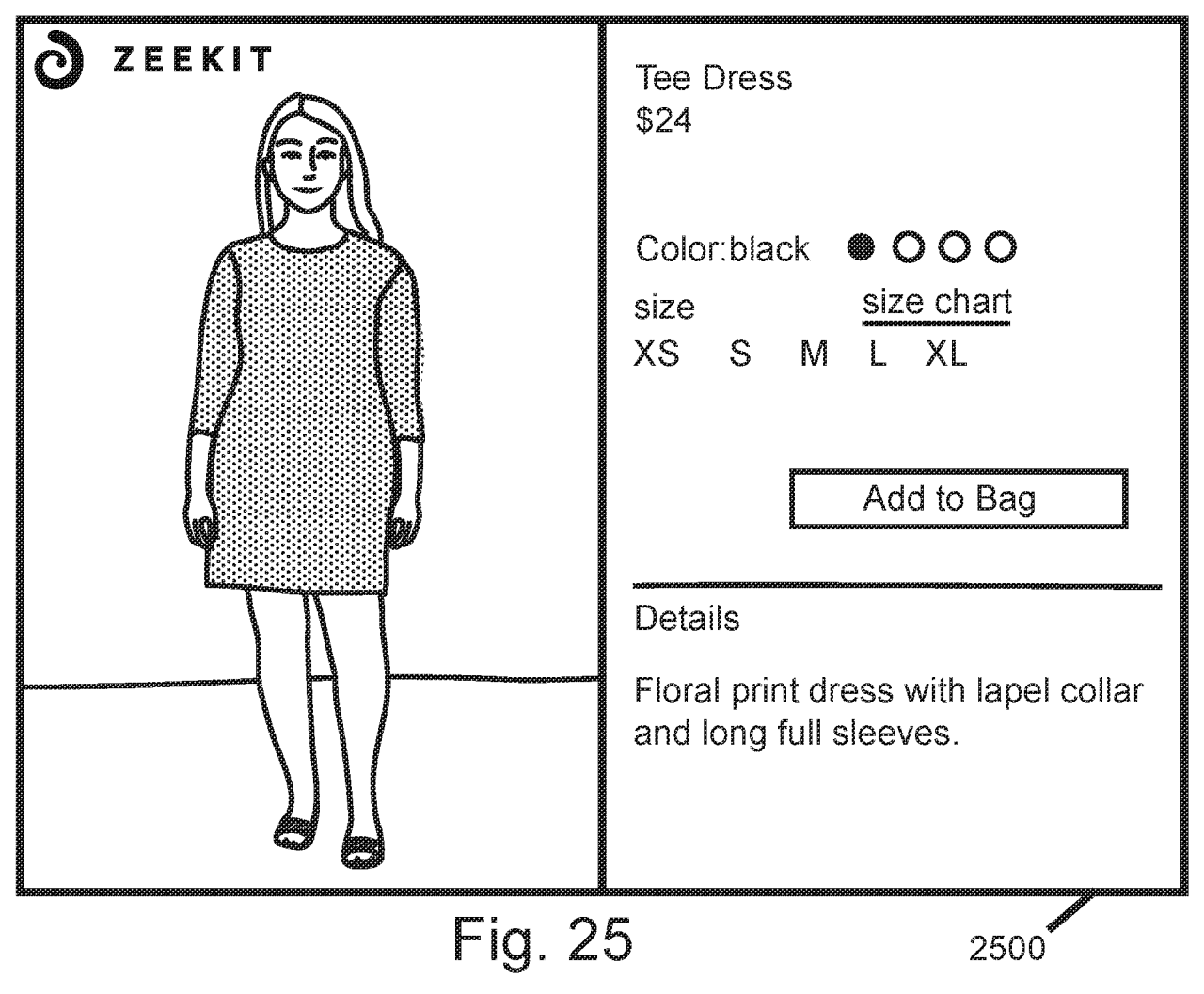

Reference is made to FIG. 25, which is a schematic illustration of enhanced user-specific Product Page 2500 that are generated by the system of the present invention; for example, a user-specific Product Page at a retailer website (or, on a retailer shopping "app" or application), in which the user-searched product (e.g., summer dress) is shown to the user Carla as being virtually-dressed on her own, actual, image; and optionally, on the actual background that appeared in the originally-uploaded background from her original image, or on a replacement background based on her choice (or based on automatic background replacement via analysis): The other UI elements may continue to operate, but may operate on the AR modified image; for example, the buttons that allow the user to change the color of the dress from "Red" to "Black", cause the virtually-dressed image of Carla to be dynamically modified such that the virtually-dressed product would change its color within it, while keeping Carla herself (and her background) as user-specific contexts for the product.

Figure 26:
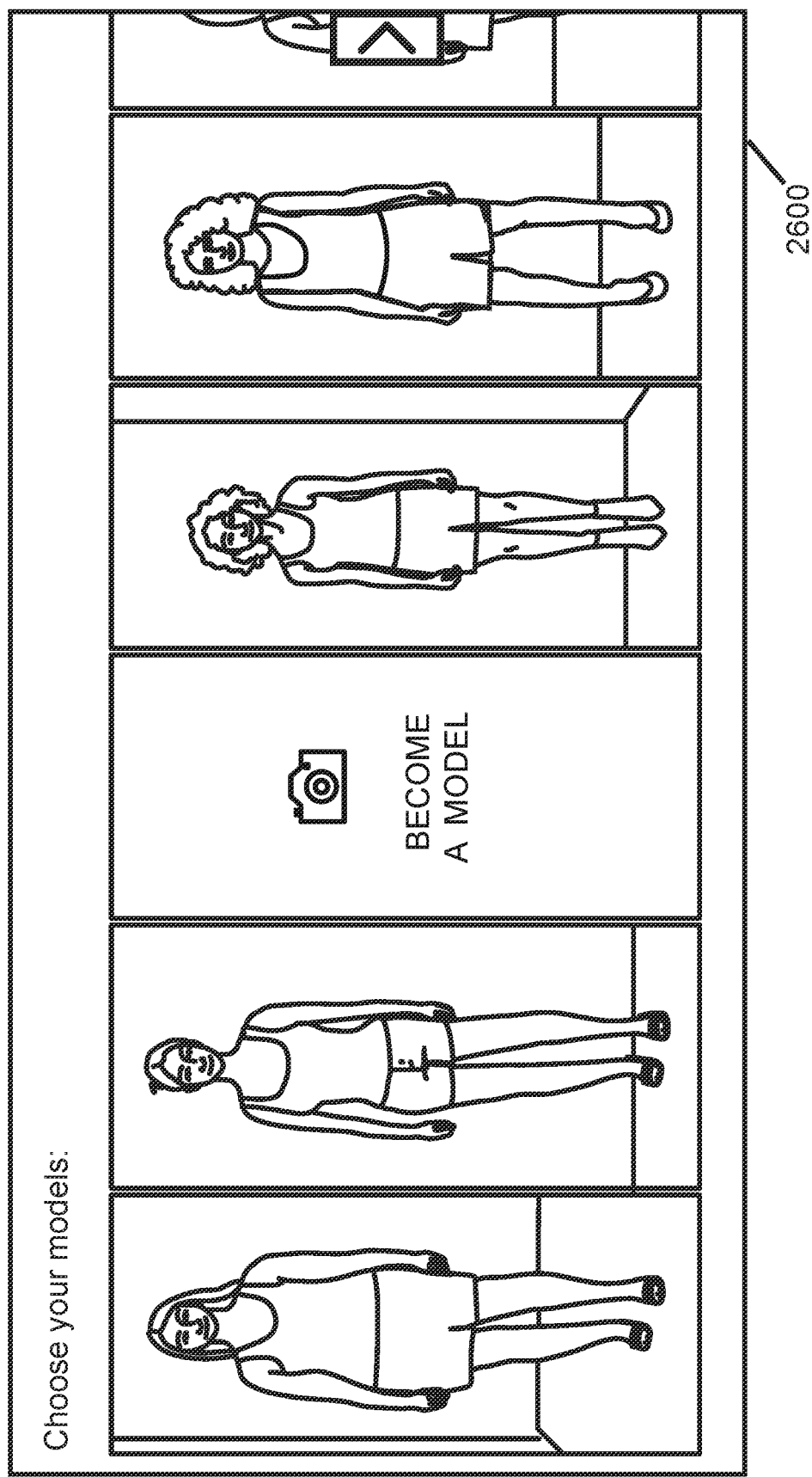
FIG. 26 is a schematic illustration of an interface generated by the system of the present invention.
Figure 27:
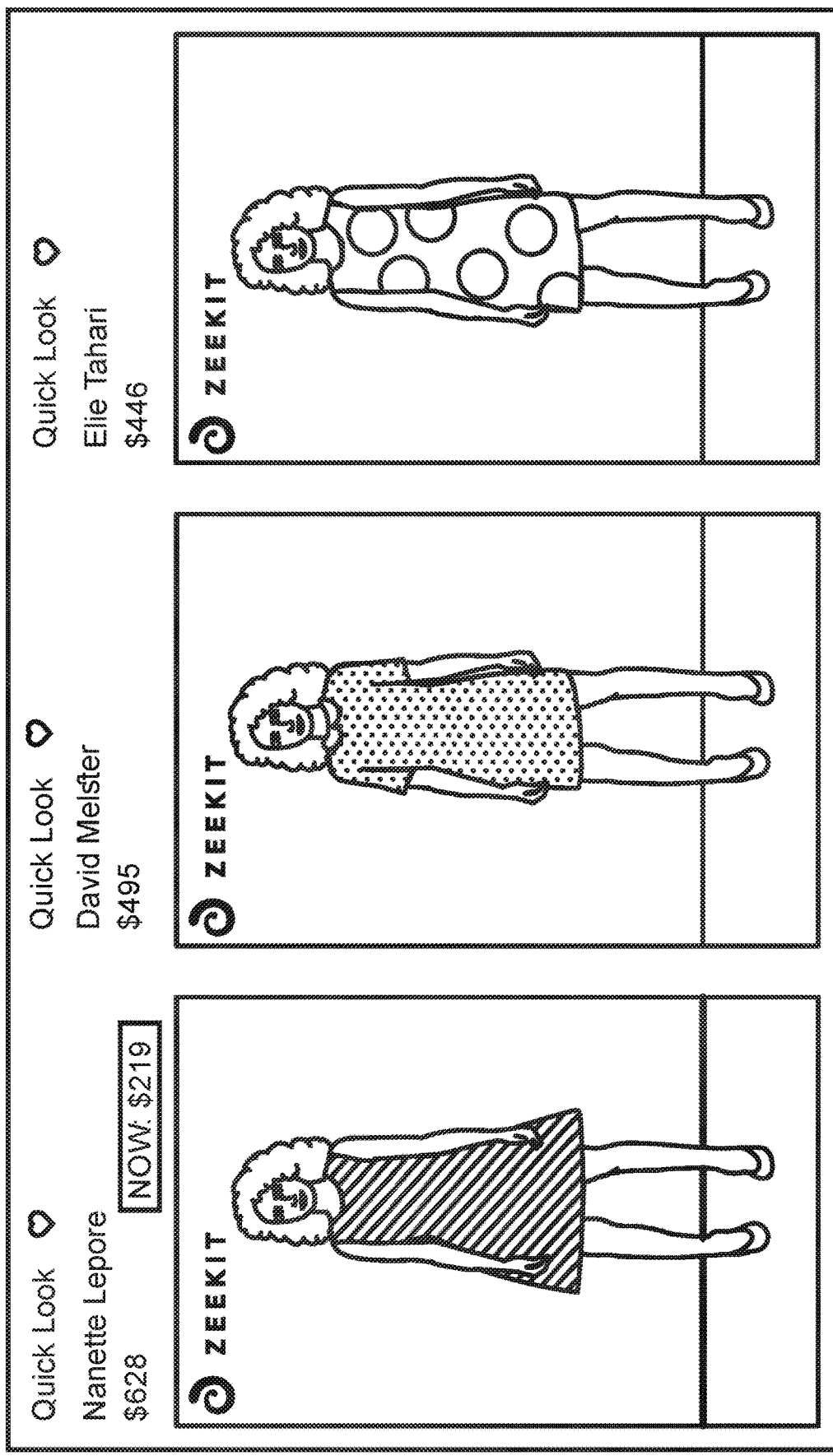
FIG. 27 is a schematic illustration of an interface generated by the system of the present invention.

Reference is made to FIG. 26, which is a schematic illustration of an interface 2600 generated by the system of the present invention. For example, a website or an "app" or application of a vendor or a retailer may ask the user to "choose your model" from a pre-defined group of images which depict different body types (e.g., tall and short; thin and fat; dark skin and light skin; long hair and short hair; etc.), and/or invite the user to "become a model" by uploading the user's own photograph and/or by capturing now the user's own photograph (e.g., via a webcam of a laptop computer, or via a front-side camera of a smartphone or tablet, or the like): Reference is made to FIG. 27, which is a schematic illustration of an interface 2700 generated by the system of the present invention. For example, once the user selects the model of her choice, or alternatively once the user captures or uploads her own photograph, a catalog of products (e.g., summer dresses in the example shown) is generated such that each product is virtually dressed on the particular model that the user selected, or on the particular body of the user herself if she requested:

Reference is made to FIG. 28, which is a schematic illustration of a user-specific Search Results page 2800 generated by the system of the present invention; for example, a user-specific Search Results page at a retailer website (or, on a retailer shopping "app" or application), or a "product category page" at such retailer; in which multiple products (e.g., summer dresses) are shown to the user Carla as being virtually-dressed on her own, actual, image; and optionally, on the actual background that appeared in the originally-uploaded background from her original image, or on a replacement background based on her choice (or based on automatic background replacement); thereby enabling the user to grasp how each one of these items would appear on her own body.

Figure 29:
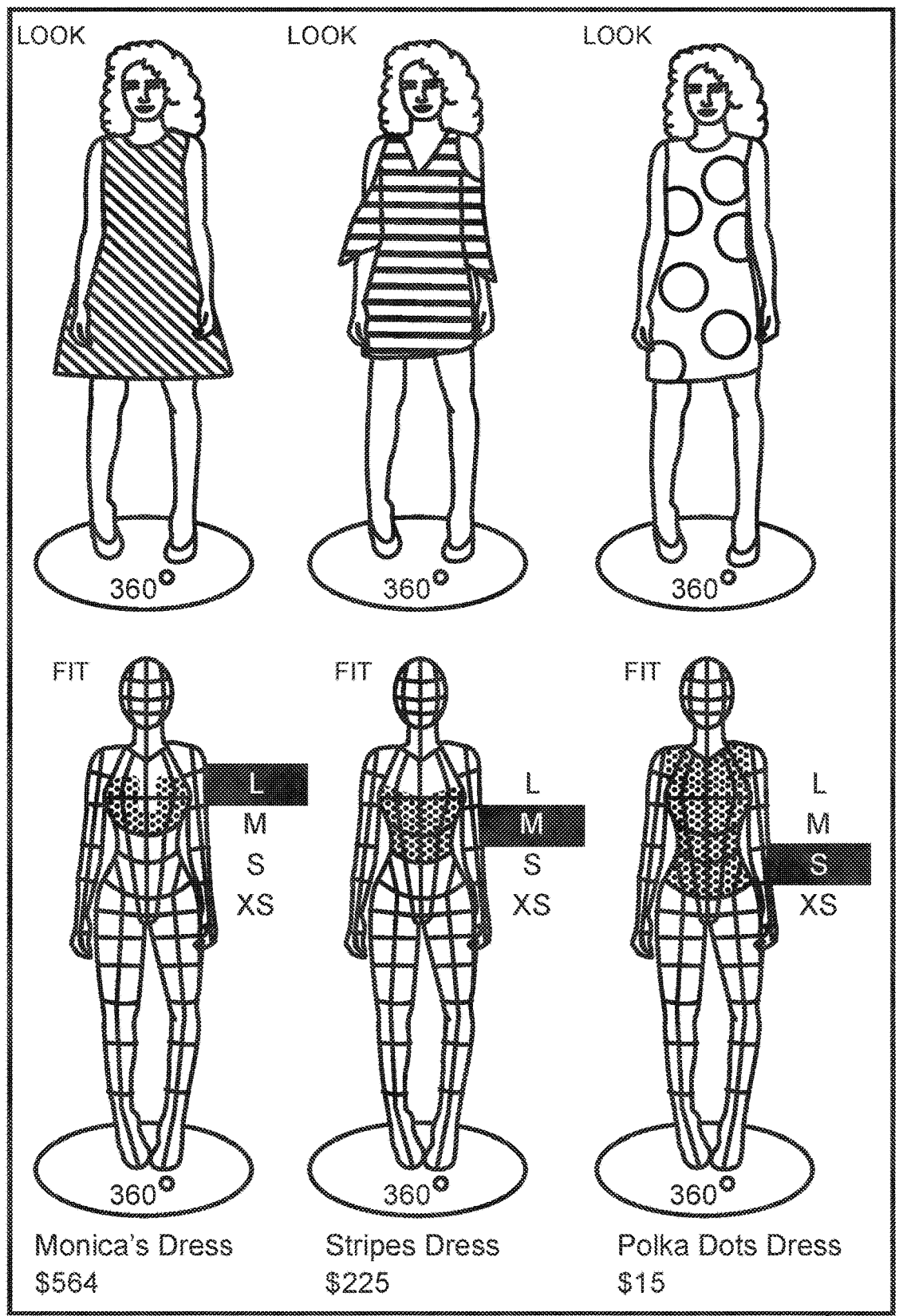
FIG. 29 is a schematic illustration of a user-specific recommendations page, generated by the system of the present invention.

Reference is made to FIG. 29, which is a schematic illustration of a user-specific recommendations page 2900 generated by the system of the present invention. The system of the present invention may further be able to generate user-specific recommendations, with regard to which size of a particular garment or clothing-article is estimated by the system to be the most suitable or the most appropriate or the most conveniently-fitting for the particular user; and/or to generate virtual dressing images, as well as a three-dimensional mannequin or avatar, that resembles the user's body structure and that demonstrates how each size would fit on that particular user.

The system of the present invention may generate and display smarter, more efficient, more useful, search results that depict each product (or search result) in the particular, relevant, context that is virtually-placed near or around or behind or on top of the "generic" product image, via a computer vision algorithm that performs such AR modifications.

The system may further sort the search results based on one or more criteria, for example, conversion rate of each product or each retailer; popularity of each product, browsing popularity, actual purchasing popularity; reputation of the seller or vendor; how high or how low the particular product appears in ordered search results of a third-party server or database (e.g., on Amazon, on eBay, on Google); based on user-specific browsing history and/or shopping history (e.g., detecting that user Adam typically purchased items in the price range of 10 to 30 dollars, and therefore placing search results in this price-range prior to search results that are more expensive); or the like.

The system may utilize a tagging module able to generate tags based on contextual analysis, morphologic analysis, NLP analysis of textual description and/or user reviews and/or user comments and/or product description, image analysis and computer vision (e.g., adding a tag of "heart" to a shirt that has a heart-shaped embroidery on it), based on similarity of the product image to other products and/or to products that were previously indexed or analyzed, or the like.

The system may further order search results in a user-specific manner, taking into account user preferences, user settings, user profile, user questionnaire, user body type or ratio or dimensions, current trends or shopping trends or fashion trends (e.g., ranking higher the products that match a current shopping trend), current weather or season (e.g., ranking higher Summer Dresses, if the user searches for "dress" in the United States in July), geographic location, or the like.

Optionally, the system may enable the user to provide feedback, such as, indicating that a first virtual-dressing of a first product on himself appears very realistic, and that a second virtual-dressing of a second product on himself appears non-realistic to him; thereby enabling the system to be self-learning, self-improving, and self-correcting over time.

Optionally, an entire catalog of products of a retailer, may be modeled or indexed by using a suitable training set; and the entire catalog may be tailored or personalized to be virtually-dressed on various users based on their particular images.

Figure 30:
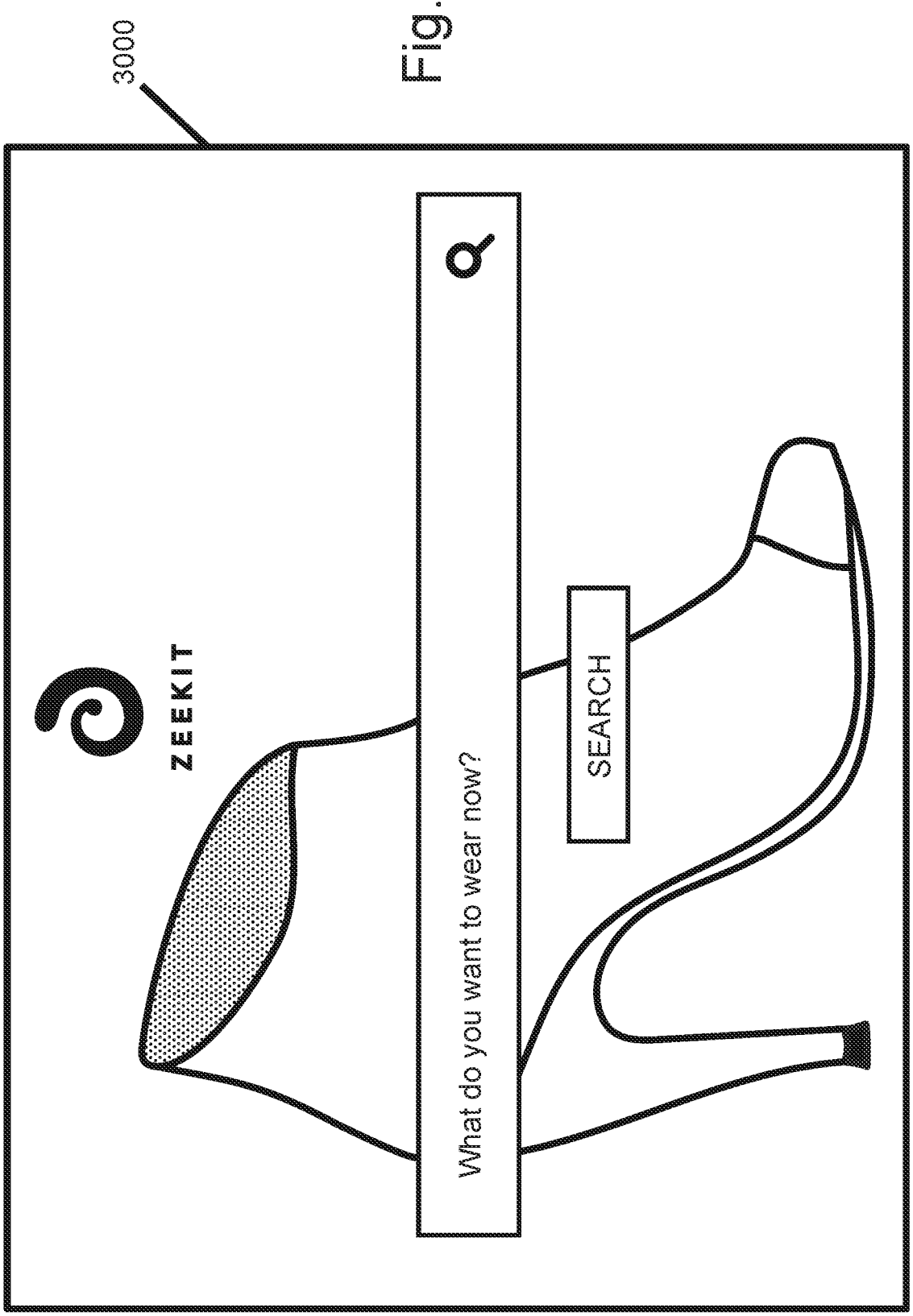
FIG. 30 is a schematic illustration of a search engine interface, generated and operated by the system of the present invention.

Reference is made to FIG. 30, which is a schematic illustration of a search engine interface 3000 generated and operated by the system of the present invention. The system may include a search engine, or an extension or modification to search engine, in which the system asks the user "what would you like to wear/to purchase today?"; the user enters a search query (e.g., "summer dress", or "red vase"); the system performs a search of one or more sources (e.g., online retailer(s) that are relevant to the search query), obtains data and meta-data and generic images of each product, and then generates an Augmented Reality (AR) modified image for each such search result, for example, depicting each relevant clothing article being virtually dressed on the image of the user himself, or depicting each red vase product being placed in the particular living room that the user herself had photographed and uploaded to the system; thereby enabling the system to generate a user-tailored, AR-modified, context-based search results that are tailored for each user.

Figure 31:
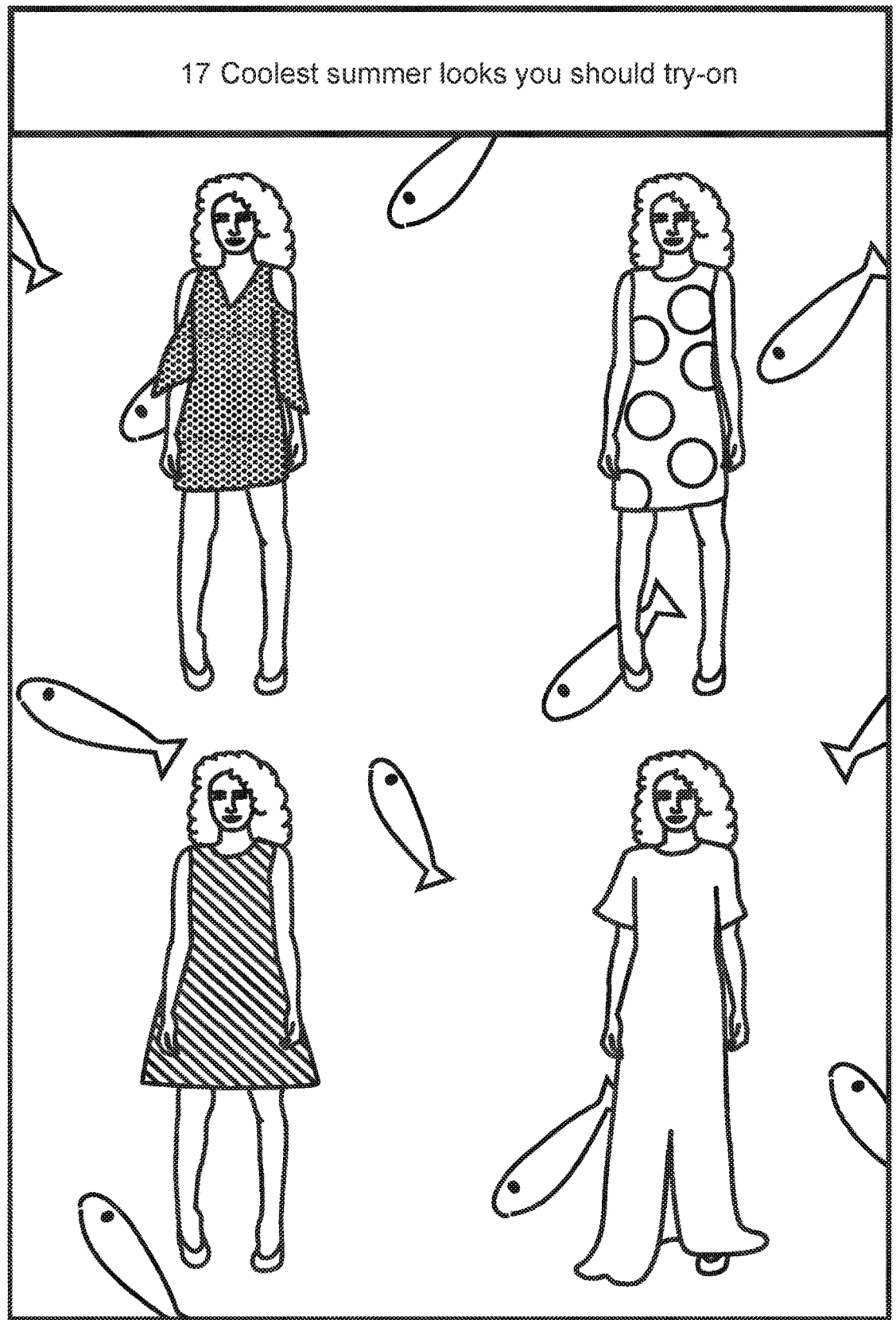
FIG. 31 is a schematic illustration of automatically-generated editorial content, in accordance with the present invention.

Reference is made to FIG. 31, which is a schematic illustration of automatically-generated editorial content 3100 in accordance with the present invention. The system may be used for automated generating of user-tailored editorial content, articles, lists, recommendations, stories, presentations, commercials, and/or other content containers or content structure. In a demonstrative example, an online magazine or an online fashion retailer may utilize the system to generate a story or an article titled "17 Cool Summer Looks that You Should Try This Summer"; and instead of showing in that story merely 17 "generic" photos of summer dresses by themselves, or 17 such dresses that are modeled by one particular model or by multiple models, the system may generate a user-tailored article in which all the 17 summer dresses are shown as being virtually dressed on the body of the particular user who is browsing or is otherwise consuming the content, based on the user's own, previously-captured or previously-uploaded photo.

Figure 32:
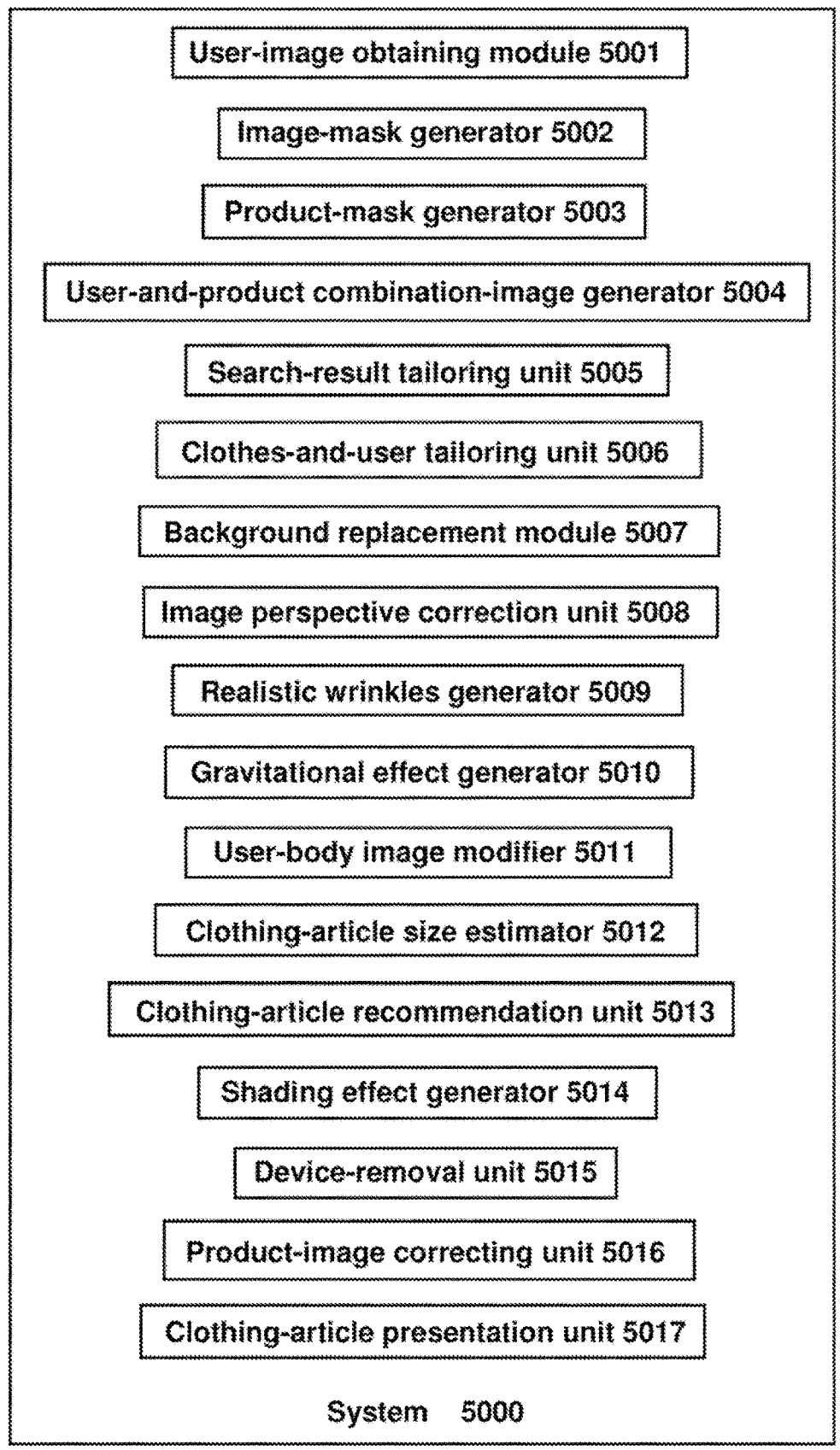
FIG. 32 is a schematic illustration of a system, in accordance with some demonstrative embodiments of the present invention.

Reference is made to FIG. 32, which is a schematic illustration of a system 5000, in accordance with some demonstrative embodiments of the present invention. System 5000 may comprise one or more, or some, or all, of the units or modules described herein, denoted with reference numerals 5001 through 5017.

In some embodiments, system 5000 may comprise a user-image obtaining module 5001, to obtain a user-image of a user of an electronic device (e.g., from a captured selfie, or from an uploaded image, or from a link provided by the user); an image-mask generator 5002, to generate a user-mask image that corresponds to said user-image processed to exclude background image-data of said user-image (e.g., by utilizing a computer vision algorithm or an image recognition process that recognizes non-user or non-human background portions of an image and removes them or fills them with null values); a product-mask generator 5003, to receive a product-image of a particular product, and to generate from said image a product-mask image that corresponds to said product image processed to exclude background image-data of said product-image (e.g., by utilizing a computer vision algorithm or an image recognition process that recognizes non-product background portions of an image and removes them or fills them with null values); and a user-and-product combination-image generator 5004 (or a suitable Image Fusion unit), to receive said product-mask image and said user-mask image, and to generate from them a combined user-and-product image that depicts said user engaging with said product (e.g., by utilizing an image fusion algorithm that super-imposes the product-mask image over the user-mask-image, or vice versa; and/or by performing image resizing operations to ensure that the dimensions of the product-mask image match the corresponding dimensions of the user-mask image, or vice versa).

In some embodiments, system 5000 may comprise a search-result tailoring unit 5005, to receive a plurality of search results in response to a user query that searches for a product, and to modify each one of said search result by replacing each one of said search results with a combination image that depicts said user engaging with said product. For example, an image-based search engine may operate, to obtain image-based search results that correspond to the query "red shirt"; then, to produce a product-mask image of each such red shirt that was part of the search results; then, to fuse the product-mask image of each red shirt, with the user-mask image of the particular user that performed that search, thereby generating a set of image-based search results that are tailored to the specific user that performed the search query.

In some embodiments, system 5000 may comprise a clothes-and-user tailoring unit 5006, to receive a user-image of said user (e.g., from a captured selfie, or from a hyperlink, or from an uploaded file); to receive a user-query for a clothing article (e.g., the user enters a search query of "little black dress"); to generate a plurality of image-based search results in response to said user-query, wherein each image-based search result corresponds to a different instance of said clothing article (e.g., to find on the Internet a set of search results that have images of such little black dresses that are offered for sale by vendors, and to obtain or download the images of such dresses); to modify each image-based search result into a combined image that depicts a combination of said user wearing said instance of the clothing article (e.g., by fusing the processed image of the user, with a processed version of the dress image); to present to said user a set of image-based search results, wherein each image-based search result comprises a combined image that depicts the combination of said user wearing said instance of the clothing article (e.g., via an interface or an output panel that presents such multiple image-based search results that are tailored to show the actual user in each search result).

In some embodiments, system 5000 may comprise a clothes-and-user tailoring unit 5006, to receive from a first user, a user-image of a second, different, user (e.g., user Adam uploads or captures a photo of user Bob); to receive from said first user (user Adam), a user-query for a clothing article (e.g., green pants); to generate a plurality of image-based search results in response to said user-query, wherein each image-based search result corresponds to a different instance of said clothing article (e.g., by retrieving from the Internet multiple search results for "green pants" that are offered for sale by online retailers); to modify each image-based search result into a combined image that depicts a combination of said second user (user Bob) wearing said instance of the clothing article (e.g., by fusing together a processed image of Bob, with a processed version of each image of green pants); to present to said first user (user Adam) a set of image-based search results, wherein each image-based search result comprises the combined image that depicts the combination of said second user (user Bob) wearing said instance of the clothing article (e.g., the green pants).

In some embodiments, system 5000 may comprise a background replacement module 5007, to receive from said user a selection of a particular product (e.g., the user searches for a Blue Scarf and then selects one particular blue scarf from various search results); to receive from said user the user-image of said user (e.g., a selfie image, an uploaded image, a hyperlink to an image of the user); to generate and to present to said user, a set of different images, each image depicting said user engaging with said particular product but on a different image-background (e.g., using an image processing unit, which takes the image of the user and cleans out all background components by utilizing image recognition process, and then fuses the user's clean image with a processed version of the Blue Scarf image that was selected by the user, and then modifying or replacing the background portions of the fused image, multiple times, with multiple different types of background content).

In some embodiments, system 5000 may comprise an image perspective correction unit 5008, to receive said user-image which depicts said user in a non-frontal perspective (e.g., the image showing the user at an angle of 20 degrees perspective relative to a straight frontal perspective); to generate from said user-image a modified user-image which depicts said user in a frontal perspective (e.g., by using an image processing module that virtually rotates the perspective, by estimating how the user would appear to look if the point-of-view is rotated; for example, by making the user's body wider than depicted in the original image); to generate a user-and-product combination image that depicts said user engaging with a particular product in a frontal perspective (e.g., by fusing the processed image of the user, with a processed version of a product image, thereby generating the fused image of the user with the product, at a full frontal perspective).

In some embodiments, system 5000 may comprise a realistic wrinkles generator 5009, to receive an image of a clothing article (e.g., an image of a yellow shirt, in response to a user selection of a yellow shirt from an online catalog or from a set of search results); to generate a combined image of said clothing article worn by said user (e.g., by fusing together, a processed version of that product image, with a processed or improved version of the user's image or with a mask/template image of the user, for example excluding the background portions of the user's image and maintaining the human body of the user in that image); and to modify the combined image to further comprise images of wrinkles that are determined by taking into account at least one of: image perspective, gravity effect, product dimensions (e.g., by a wrinkles generation module that generates realistically-looking wrinkles portions; not by inserting the same or similar wrinkle lines or wrinkle squares, but rather, by utilizing a computer vision process that determines one or more particular locations in the shirt that should be wrinkled based on gravitational effect and/or based on illumination and shading and/or based on the body dimensions of the user, and selectively adds a depiction of non-identical wrinkle lines or wrinkle areas to the image of the clothing article).

In some embodiments, system 5000 may comprise a gravitational effect generator 5010, to receive an image of a clothing article (e.g., based on a user selection of a particular product from an online catalog or from search results); to generate a combined image of said clothing article worn by said user (e.g., by fusing together a processed version of the user image, with a processed version of the product image); and to modify the combined image to reflect an effect of gravitational force a particular portion of said clothing article (e.g., to determine whether a sleeve of a shirt has a narrow tube-like structure and therefore is not affected or is less affected by gravity, or in contrast, whether the sleeve of the shirt has a cone-like structure and therefore its lower portion is more affected by gravity and should be modified in the processed image to be stretched downwardly to emulate gravitational pull of the sleeve).

In some embodiments, system 5000 may comprise a user-body image modifier 5011, to receive an image of the user in which at least one of the user's arms or hands is not positioned generally towards the ground (e.g., by using a computer vision process that recognizes body parts, and/or that detects that a user's arm is not a straight line, and/or that detects that a user's hand or palm is resting on the user's waist in the image); to modify said image of the user into a modified image in which both user arms and user hands are positioned generally towards the ground (e.g., using an image processing module that moves or removes portions of the human body depictions in the image, from a first location (e.g., resting on the waist) to a second location (e.g., hanging vertically parallel to the body), or by otherwise removing a depiction of a body part from the image (e.g., removing the original arm and hand depictions from the image) and inserting a replacement depiction of that body part into the image at a nearby by different location (e.g., adding an arm portion into the user image, at a location descending from the user's shoulder downwardly towards the ground and ending at a level of the user's waist); and to generate a combined user-and-product image that depicts that user, as modified in said modified image, wearing said particular product (e.g., by fusing together the processed version of the image of the user, with a processed or enhanced version of the clothing article or product).

In some embodiments, system 5000 may comprise a clothing-article size estimator 5012, to receive an image of said user (e.g., a captured selfie, or an uploaded image, or a link to a stored image); to determine real-life dimensions of multiple body parts of said user as depicted in said image (e.g., by using a computer vision unit that recognizes or detects or identifies particular body parts or body regions); and to determine from said dimensions a size of a clothing-article that would match said user (e.g., to calculate the length and/or width in pixels of each recognized body part, such as shoulders, bust, waist, chest, leg, or the like, and to determine a body size based on the ratio of such dimensions; and/or by utilizing a computer vision algorithm that identifies in the user's image an item having a standard size, for example, a standard electrical socket, or a standard plastic bottle of water, or a smartphone, and utilizing a lookup table to determine a real-life size of such known item based on pre-defined data, and then utilizing a ratio calculation to determine; for example, if a smartphone is shown in the photo and occupies a height of 100 pixels, then determining that each 100 pixels in the photo correspond to approximately 16 centimeters in real life, and from this ratio calculating or estimating the real-life dimensions of recognized body parts of the user in that image).

In some embodiments, system 5000 may comprise a clothing-article recommendation unit 5013, to receive an image of said user (e.g., a captured selfie, or an uploaded photo, or a link to a stored photo); to determine real-life dimensions of multiple body parts of said user as depicted in said image (e.g., as detailed above); to determine from said dimensions a size of a clothing-article that would match said user (e.g., as mentioned above; for example, by utilizing a pre-defined lookup table that matches a particular clothing size, such as "XL", with a particular set of dimensions of chest, waist, and/or other body parts); to search a digital catalog of clothes for clothing articles that are provided in said particular size (e.g., if the system estimates that the matching size should be "XL", then, excluding from the search results any results of products that are not offered at that size of "XL", or, by performing a search only for products that are offered at that particular size); and to present to said user the results of said search.

In some embodiments, system 5000 may comprise a clothing-article recommendation unit 5013, to receive an image of said user (as detailed above), to determine real-life dimensions of multiple body parts of said user as depicted in said image (as detailed above), to determine from said dimensions a size of a clothing-article that would match said user (as detailed above), to search a digital catalog of clothes for clothing articles that other users, who also have said dimensions, had purchased, and to present to said user the results of said search; for example, by determining that the user's body size is "XS", and searching the online catalog only for products that are offered at this particular size, and/or by searching historical purchase transactions of other user's whose body size was estimated to be "XS" based on their own images that had been similarly processed by the system.

In some embodiments, system 5000 may comprise a shading effect generator 5014, to receive an image of a clothing article (as detailed above), to generate a combined image of said clothing article worn by said user (as detailed above, for example, by fusing together a processed image of the user sans the background, with a processed image of the product); and to modify the combined image to reflect a shading of a particular portion of said clothing article due to a body-part of said user (e.g., based on a computer vision process that determines or generates an illumination map for the image or for the user, and determines a particular portion of the clothing article that should be depicted as shaded based on the casting of a shadow by a body-part of the user such as his arm or his chin in view of the user's standing position or posture and/or illumination condition, and/or taking into account one or more detected folding portions or folded portions of the clothing article that are determined to cast a shadow on a nearby region of the clothing article).

In some embodiments, system 5000 may comprise a device-removal unit 5015, to receive a selfie image of said user which depicts said user holding said electronic device; to apply a computerized vision process that detects the image-portion that depicts said electronic device (e.g., by applying a computer vision algorithm or an image recognition process, that recognizes a generally-rectangular or generally-cuboid item, having a ratio of width to length in accordance with pre-defined ratio values or a range of values such as 2:3 or 2:3.5, and/or identifying or detecting that the item estimated to be a smartphone is indeed depicted as being held by a recognized hand or palm of the user in that image); to selectively replace said image-portion with a replacement portion that excludes said electronic device (e.g., by replacing that image-portion that showed the smartphone, with an image-portion that shows the shirt of the user if it is recognized by the system that the smartphone was held in a position that partially hid the shirt of the user in that image); wherein the system is to generate a combined user-and-product image that depicts said user engaging with said product and wherein the combined image excludes an image of said end-user device (e.g., by generating fused image, based on a processed version of the image of the product, and the processed image of the user from which the smartphone portion was removed or replaced).

In some embodiments, system 5000 may comprise a product-image correcting unit 5016, to receive an image of said product, wherein the image depicts said product worn by a human model (e.g., by retrieving from an online catalog or a website of a retailer, an image corresponding to a search query of "red shirt SKU 3578", and by detecting via computer vision algorithm or image recognition process that the retrieved image contains a depiction of the red shirt being worn by a human model; or by utilizing a lookup table or a pre-definition which indicates that all the images of shirts (or other type of items) on a particular website or catalog are always depicted as being worn by a human model); to modify said image of said product by removing image-portions that correspond to body-parts of said human model (e.g., by using a computer vision process or image recognition process, to identify or recognize the depicted body parts such as face and arms, and to replace them with a white background or other filling); to further modify said image of said product by selectively filling with a particular image-texture, at least one image-portion that, in said image, depicted a body-portion of said human image hiding a portion of said product (e.g., based on the computer vision or image recognition process, to detect that a braid of hair of the human model, in the original image of the product, obstructs or hides a portion of the product such as the shirt, and to remove that hair portion that hides the shirt, and to replace it with a filling that corresponds to nearby color(s) or texture of the shirt).

In some embodiments, system 5000 may comprise a clothing-article presentation unit 5017, to receive a user selection of a particular clothing article (e.g., based on a user selection from an online catalog or an online retailer, or from a set of search results); to generate a plurality of image-based search result, wherein each one of the image-based search result depicts said same particular clothing article depicted as worn by a different human user; for example, by producing a single template or mask of the product image, sans any background, and sans portions that correspond to a human model that may be depicted in the original image of the product, such removal of human model or of background being performed by utilizing computer vision or image recognition process; and to generate multiple different fused-versions of the product mask, each version depicts a fusion of that same product mask with a different user-mask or user-template, wherein each user-mask or user-template corresponds to or depicts a different human user; thereby generating a gallery of multiple different users that are virtually dressed, each one separately, with the same clothing article (e.g., red shirt); each fused image of user-and-clothes being shown on the same background (e.g., against the same background of an office room), or being shown on different backgrounds (e.g., a first human user depicted to wear the red shirt and depicted to be located in an office room, and nearby, a second and different human user depicted to wear the same red shirt but depicted to be located in a kitchen). The present invention may be utilized in, or with, or in conjunction with, a variety of devices or systems; for example, a smartphone, a tablet, a smart-watch, a "magic mirror" device intended for utilization at real-life stores, a laptop computer, a desktop computer, a device having an imager or camera, a vehicular device or unit, a gaming device, a gaming console, a wearable device, a Virtual Reality (VR) device or helmet or glasses or headgear, an Augmented Reality (AR) device or helmet or glasses or headgear, an Internet of Things (IoT) device or appliance, an Internet-connected device or appliance, a wireless-connected device or appliance, and/or other suitable systems and devices.

The present invention includes a system comprising: a user-image obtaining module (5001), to obtain a user-image of a user of an electronic device; an image-mask generator (5002), to generate a user-mask image that corresponds to said user-image processed to exclude background image-data of said user-image; a product-mask generator (5003), to receive a product-image of a particular product, and to generate from said image a product-mask image that corresponds to said product image processed to exclude background image-data of said product-image; a user-and-product combination-image generator (5004), to receive said product-mask image and said user-mask image, and to generate from them a combined user-and-product image that depicts said user engaging with said product.

In some embodiments, the system comprises: a search-result tailoring unit (5005), to receive a plurality of search results in response to a user query that searches for a product, and to modify each one of said search result by replacing each one of said search results with a combination image that depicts said user engaging with said product.

In some embodiments, the system comprises: a clothes-and-user tailoring unit (5006), to receive a user-image of said user, to receive a user-query for a clothing article, to generate a plurality of image-based search results in response to said user-query, wherein each image-based search result corresponds to a different instance of said clothing article, to modify each image-based search result into a combined image that depicts a combination of said user wearing said instance of the clothing article; to present to said user a set of image-based search results, wherein each image-based search result comprises a combined image that depicts the combination of said user wearing said instance of the clothing article.

In some embodiments, the system comprises: a clothes-and-user tailoring unit (5006), to receive from a first user, a user-image of a second, different, user, to receive from said first user, a user-query for a clothing article, to generate a plurality of image-based search results in response to said user-query, wherein each image-based search result corresponds to a different instance of said clothing article, to modify each image-based search result into a combined image that depicts a combination of said second user wearing said instance of the clothing article; to present to said first user a set of image-based search results, wherein each image-based search result comprises the combined image that depicts the combination of said second user wearing said instance of the clothing article.

In some embodiments, the system comprises: a background replacement module (5007), to receive from said user a selection of a particular product, to receive from said user the user-image of said user, to generate and to present to said user, a set of different images, each image depicting said user engaging with said particular product but on a different image-background. In some embodiments, the system comprises: an image perspective correction unit (5008), to receive said user-image which depicts said user in a non-frontal perspective, to generate from said user-image a modified user-image which depicts said user in a frontal perspective, to generate a user-and-product combination image that depicts said user engaging with a particular product in a frontal perspective.

In some embodiments, the system comprises: a realistic wrinkles generator (5009), to receive an image of a clothing article, to generate a combined image of said clothing article worn by said user, and to modify the combined image to further comprise images of wrinkles that are determined by taking into account at least one of image perspective, gravity effect, product dimensions.

In some embodiments, the system comprises: a gravitational effect generator (5010), to receive an image of a clothing article, to generate a combined image of said clothing article worn by said user, and to modify the combined image to reflect an effect of gravitational force a particular portion of said clothing article.

In some embodiments, the system comprises: a user-body image modifier (5011), to receive an image of the user in which at least one of the user's arms or hands is not positioned generally towards the ground, to modify said image of the user into a modified image in which both user arms and user hands are positioned generally towards the ground, and to generate a combined user-and-product image that depicts that user, as modified in said modified image, wearing said particular product.

In some embodiments, the system comprises: a clothing-article size estimator (5012), to receive an image of said user, to determine real-life dimensions of multiple body parts of said user as depicted in said image, and to determine from said dimensions a size of a clothing-article that would match said user.

In some embodiments, the system comprises: a clothing-article recommendation unit (5013), to receive an image of said user, to determine real-life dimensions of multiple body parts of said user as depicted in said image, to determine from said dimensions a size of a clothing-article that would match said user, to search a digital catalog of clothes for clothing articles that are provided in said particular size, and to present to said user the results of said search.

In some embodiments, the system comprises: a clothing-article recommendation unit (5013), to receive an image of said user, to determine real-life dimensions of multiple body parts of said user as depicted in said image, to determine from said dimensions a size of a clothing-article that would match said user, to search a digital catalog of clothes for clothing articles that other users, who also have said dimensions, had purchased, and to present to said user the results of said search.

In some embodiments, the system comprises: a shading effect generator (5014), to receive an image of a clothing article, to generate a combined image of said clothing article worn by said user, and to modify the combined image to reflect a shading of a particular portion of said clothing article due to a body-part of said user.

In some embodiments, the system comprises: a device-removal unit (5015), to receive a selfie image of said user which depicts said user holding said electronic device, to apply a computerized vision process that detects the image-portion that depicts said electronic device, to selectively replace said image-portion with a replacement portion that excludes said electronic device; wherein the system is to generate a combined user-and-product image that depicts said user engaging with said product and wherein the combined image excludes an image of said end-user device.

In some embodiments, the system comprises: a product-image correcting unit (5016), to receive an image of said product, wherein the image depicts said product worn by a human model, to modify said image of said product by removing image-portions that correspond to body-parts of said human model, to further modify said image of said product by selectively filling with a particular image-texture, at least one image-portion that, in said image, depicted a body-portion of said human image hiding a portion of said product.

In some embodiments, the system comprises: a clothing-article presentation unit (5017), to receive a user selection of a particular clothing article, to generate a plurality of image-based search result, wherein each one of the image-based search result depicts said same particular clothing article depicted as worn by a different human user.

The present invention includes system, device, and method of image processing, particularly utilizing machine learning and computer vision. A user selects a particular shirt from an online catalog; and instead of seeing an image of the shirt on the shelf or being worn by a model, the system generates and shows to the user an image of that particular shirt being virtually dressed by that particular user. The user requests the system to show search results for blue pants; and instead of producing generic images of blue pants, on the shelf or worn by various models, the system generates user-tailored search results that shown various types of blue pants being virtually worn by the user himself, or virtually worn by a particular other person that is selected by the user. The system enhances the product image by correcting it and by adding realistically-looking shading and wrinkles.

Some embodiments comprise a method for processing user selectable product images and facilitating visualization-assisted coordinated product transactions, the method comprising: identifying one or more products having one or more associated product images; image processing said one or more said product images by incorporating said image(s) into an anchor image to generate a composite anchor image that depicts said one or more products according to an intended manner of use thereof; said image processing including using product dimension information to scale said one or more product images as necessary to match a scale of said anchor image; causing said composite anchor image to be displayed; causing one or more user interface elements to be displayed in association with said composite anchor image, said one or more user interface elements being operable to initiate a coordinated product transaction involving said one or more products; and responsive to said one or more user interface elements being activated, initiating said coordinated product transaction.

In some embodiments, there are two or more products with two or more corresponding product images, and said composite anchor image depicts said two or more products in a spatial relationship corresponding to an intended manner of use of said two or more products.

In some embodiments, said product dimension information is obtained from product dimension data maintained in association with said one or more products or is derived from numeric or alphanumeric product size data maintained in association with said one or more products.

In some embodiments, said coordinated product transaction is one of a purchase transaction or a redirect transaction. In some embodiments, said one or more product images are retrieved from separate sources of said one or more products. In some embodiments, said one or more product images are retrieved from a single source of all of said one or more products. In some embodiments, said composite anchor image depicts only said one or more products and a background that is blank or includes a background image. In some embodiments, said composite anchor image depicts said one or more products being worn by an anthropomorphic entity. In some embodiments, said anthropomorphic entity comprises an image of a human that may be a user image received from a user system or device. In some embodiments, said anchor image includes a background image and said human image or said background image are scaled to match each other.

In some embodiments, a system comprises: one or more processors operably coupled to one or more memory devices; program instructions stored in said memory and executable by said one or more processors to perform operations for processing user selectable product images and facilitating visualization-assisted coordinated product transactions, said operations comprising: identifying one or more products having one or more associated product images; image processing said one or more product images by incorporating said image(s) into an anchor image to generate a composite anchor image that depicts said one or more products according to an intended manner of use thereof; said image processing including using product dimension information to scale said one or more product images as necessary to match a scale of said anchor image; causing said composite anchor image to be displayed; causing one or more user interface elements to be displayed in association with said composite anchor image, said one or more user interface elements being operable to initiate a coordinated product transaction involving said one or more products; and responsive to said one or more user interface elements being activated, initiating said coordinated product transaction.

The present invention includes a process for combining user selectable product images and facilitating visualization-assisted coordinated product acquisition. One or more products having one or more associated product images may be identified. The one or more product images may be image processed by incorporating the image(s) into an anchor image to generate a composite anchor image that depicts the one or more products according to an intended manner of use thereof. The image processing may include using product dimension information to scale the one or more product images as necessary to match a scale of the anchor image. The composite anchor image may be caused to be displayed in association with one or more user interface elements, the user interface elements being operable to initiate a coordinated product transaction involving the one or more products. Responsive to the one or more user interface elements being activated, the coordinated product transaction may be initiated.

The present invention may include, for example, systems, devices, and methods of virtual dressing, utilizing image processing, computer vision, and machine learning. For example, an electronic device may be used to capture one or more images of a user; to analyze and process the image(s); and to generate a realistic image that emulates or simulates how that particular user would appear if he or she wears a particular article of clothing, or other article (e.g., accessory item).

In accordance with the present invention, a user may capture a single image (or multiple images, or a video clip) of the user; for example, by taking a "selfie" image (or self-portrait image) of himself, or by photographing herself standing in front of a mirror, or by asking a friend to take a photo of the user. A local or remote application (e.g., client side, server side, native application or "app", mobile application, web-site, web-page, or the like) may utilize the image, and may process or analyze the image of the user, in order to automatically improve it or prepare it for virtual dressing.

Optionally, the user may manually enter his gender, and/or his height, and/or other optional user parameters (e.g., weight; shirt size; pants size; or the like); and these optional parameters may further be utilized for enhancing or preparing the user of the image for virtual dressing of clothes or other products. Optionally, such data or parameters may be determined autonomously by the system, based on one or more other data; for example, based on the user's name (e.g., "Adam" indicating a male; "Eve" indicating a female), based on the user's appearance (e.g., identifying anatomical structure or features that are typical of a male, or a female); utilization of other objects to infer user height (e.g., if the photo also shows a standard-size item, such as an electrical socket on a wall, or a banana or an orange located on a shelf behind the user, or a published book whose dimensions may be obtained from an online source, or a smartphone or tablet whose dimensions may be known or estimated). Optionally, user height may be estimated by the system, based on a ratio between head-size and body-size of the user; or based on a ratio between head-size and size of other body organ or body part (e.g., arm; leg).

The system may further receive an indication of a product, such as a clothes item, that the user would like to virtually dress on his image. The indication may be provided by the user, who may select the item from an online catalog; or may scan a barcode or a QR code or a price-tag or a clothes-tag of an actual product in a store; or may capture an image of the product; or may enter or dictate or say a name of a product or vendor, for example, "Old Navy, skirt, model Barbara" which the system may look-up online or at a vendor's website in order to extract therefrom the items' data and image. The obtained image may then be analyzed and/or processed, to prepare it for enhanced virtual dressing or enhanced virtual fitting onto the image of the user.

The system may then perform a virtual dressing process, in which the image of the item is resized, enhanced, and/or modified, and then superimposed or pasted or otherwise inserted onto or into the image of the user. Optionally, shading effects may be added or removed, from the user's portion of the combined image and/or from the product's portion of the combined image, in order to generate a more realistic look of the combined image of the user and the product. Optionally, gravitational effects may be added or removed, from the user's portion of the combined image and/or from the product's portion of the combined image, such as by causing portions of the product (e.g., portions of the sleeve) to appear to be "dropping down" due to gravity, to in order to generate a more realistic look of the combined image of the user and the product. Optionally, folding or wrinkling effects may be added or removed, from the user's portion of the combined image and/or from the product's portion of the combined image, such as by causing particular portions of the product (e.g., stomach area of a shirt) to appear slightly wrinkled or slightly folded-in, in order to generate a more realistic look of the combined image of the user and the product. Other suitable effects may be used.

In some embodiments, the system may perform actual resizing of the product's image, in a manner that does not merely attempts to forcefully fit the product onto the image of the body of the user; but rather, in a manner that would allow the user to visualize whether a particular size of a particular product would actually fit this particular user. In a demonstrative example, a user who is 160 centimeter tall, and who typically wears a "small" size T-Shirt, may scan a barcode of an Extra Large T-Shirt. The system may perform suitable calculations to determine, that this particular shirt, if worn by this particular user, would create a visual appearance in which the lowest edge of the shirt reaches the knees of the user; and in which the short-sleeve of the shirt reaches below the user's arm. Accordingly, instead of trying to "precisely fit" the image of the shirt onto the image of the user, and instead of trying to show a perfectly-fitting shirt that is shown together with the face of the user or with an avatar or a model figure, the system of the present invention may actually generate as output, for example: an image of the actual user, showing his actual head and arms and legs, and showing thereon the pasted or superimposed image of the particular selected shirt, with the particular proportions true to life; such that the image that is shown to the user actually shows to him that if he would purchase and wear this shirt, then it would reach his knees and below his elbows.

Accordingly, instead of performing a simple resize operation, that would attempt to merely resize the chest area of the T-Shirt image to fit on the chest area of the actual user, the system of the present invention may perform improved re-sizing, that would allow the user to see an actual image of the user emulating his virtual wearing of this particular shirt (or other item) having this particular item-size, even if such item does not fit this particular user (at all, or partially, or perfectly).

The present invention may further enable a user, to obtain an emulated or simulated image which shows the user to appear to be wearing, concurrently, two different products that optionally originate from (or are sold by) two different vendors or sources; such as, a shirt made or sold by Vendor A, and a skirt made or sold by Vendor B. Each one of the products may be separately resized and enhanced, and the two (or more) items may then be overlayed or superimposed or pasted or otherwise inserted onto or into the image of the user; while also keeping true-to-life dimensions or ratios, allowing an oversized item to appear oversized in the combined image, or the like. Furthermore, the user may proceed to place a purchase order for the two (or more) items, via a single click mechanism, or via a single checkout mechanism; and a universal digital wallet or payment mechanism may be used in order to enable the user to perform a single checkout process with regard to multiple items that were collected from multiple different vendors.

Some embodiments of the present invention may comprise a system, device and method that may allow a user to take one or more photos of himself or herself, in order to virtually try-on countless products sold online and/or sold offline, and to see different looks of such products (e.g., clothes, accessories, or the like) shown in a realistic manner on the user's own image. The user may also virtually dress himself by scanning physical codes, such as QR-codes, barcodes, price tags, clothes tags, or the like, captured from physical clothes located in real-life shops; in order to similarly achieve a virtual dressing of the user's image with such items or clothes.

For each product, the user may also receive from the system one or more computed properties, such as the correct size estimation that fits one's body shape and/or measurements.

The dressing process may utilize image processing and/or computer vision methods, for example, with regard to the user's image and/or with regard to the product (e.g., clothes) image; and may include additional parameters inserted by the user and/or generated from external resources regarding the user and/or the cloth properties or attributes or characteristics; for example, the user may be asked to manually insert his height and/or weight and/or gender, and such data may be used by the system in order to further improve the output shown to the user and/or to make it more realistic. After the virtual-dressing process, in which the user is shown a composite or combined user-and-product image, the user may proceed to purchase a single product, or an entire multiple-item attire or assembly of clothes, from a single vendor or even from multiple different vendors (e.g., online vendors and/or offline vendors), optionally by using a single click mechanism, utilizing a universal digital wallet or payment mechanism.

Interactive Ribbon and Multiple-Ribbon Generator:

Some embodiments of the present invention may comprise a system able to generate and utilize a rotating or rotatable on-screen spinner or ribbon or band of items, which the user may rotate or spin by sliding or gesturing sideways (e.g., right or left), and which cause a particular item out of several multiple items (e.g., of the same item type) to be virtually dressed on a body or on a body-portion of the user, particularly featuring an image of the real-lift head of the user and/or other body organs of the user (e.g., beck, arms, hands, feet, or the like) that are fused together with the virtually-dressed item. For example, the user may search an online shop for a "red shirt"; the system may find seven such shirts of different styles, each search-result associated with a different image of each such red shirt; then, instead of showing to the user a gallery of the seven red shirts, the system generates an image of the user (e.g., based on his selfie photo) that is virtually dressed with Shirt 1 out of those seven shirts; and a Graphical User Interface (GUI) shows a ribbon or band or spinner that allows the user to slide sideways and to change or switch which particular red shirt (out of the seven search results) is going to be virtually dressed on his image. For example, images of the other six red shirts, may be shown to the right and/or to the left of the upper-body of the user as depicted to be virtually dressed in Shirt 1, and if the user slides sideways that Shirt 2 becomes virtually dressed onto the user's body on the screen, whereas Shirt 1 becomes (for example) undressed from the user's image.

In some embodiments, two or three or multiple such ribbons or bands or spinners may be used concurrently or simultaneously; for example, as generally-parallel generally-horizontal ribbons or spinners or bands. For example, a first (e.g., upper body) ribbon or band may show the seven red shirts, and may enable the user to swipe or to gesture the first ribbon sideways in order to change or switch which one of the seven red shirts is virtually dressed on the user; whereas, in parallel or concurrently, a second ribbon (e.g., lower body ribbon) may show also six blue pants (e.g., since the previous search of that user on that online shop was a search for "blue pants"), such that Pants 1 are virtually dressed on the user's image, together with Shirt 1 virtually dressed on him as well; and enabling the user to slide or swipe or gesture (e.g., sideway movement) in order to switch which pants out of the six search results of "blue pants" is being virtually dressed on the user, concurrently with the current virtually-dressed shirt that the upper ribbon or band allows to choose.

Similarly, a third ribbon or band may enable the user to virtually-dress on himself a third, cumulative, type of item, such as shoes or boots that are rotating horizontally at the area of the user's feet. Similarly, a fourth ribbon or band may enable the user to virtually-dress on himself a fourth type of item, such as a hats of various types that may be rotated via the fourth ribbon or band at the top area of the user's image.

This unique system enables a user to rapidly and efficiently simulate or emulate how the user would appear, when the user selects different items from multiple sets of search results, enabling the user to efficiently and rapidly and visually perform a virtual mix-and-match of virtual dressing options in order to efficiently find a desired combination of items.

It is noted that the items of each such rotatable ribbon or band, are images of actual search-results that are selected through or from a catalog of a store or online shop or search engine, that are actually offered for sale; and are not merely general depiction of items in an online game; and the depiction of the virtual dressing comprises the actual real-life image of the actual user, rather than an avatar or a pre-defined illustration or a third-party fashion model.

Figure 33:
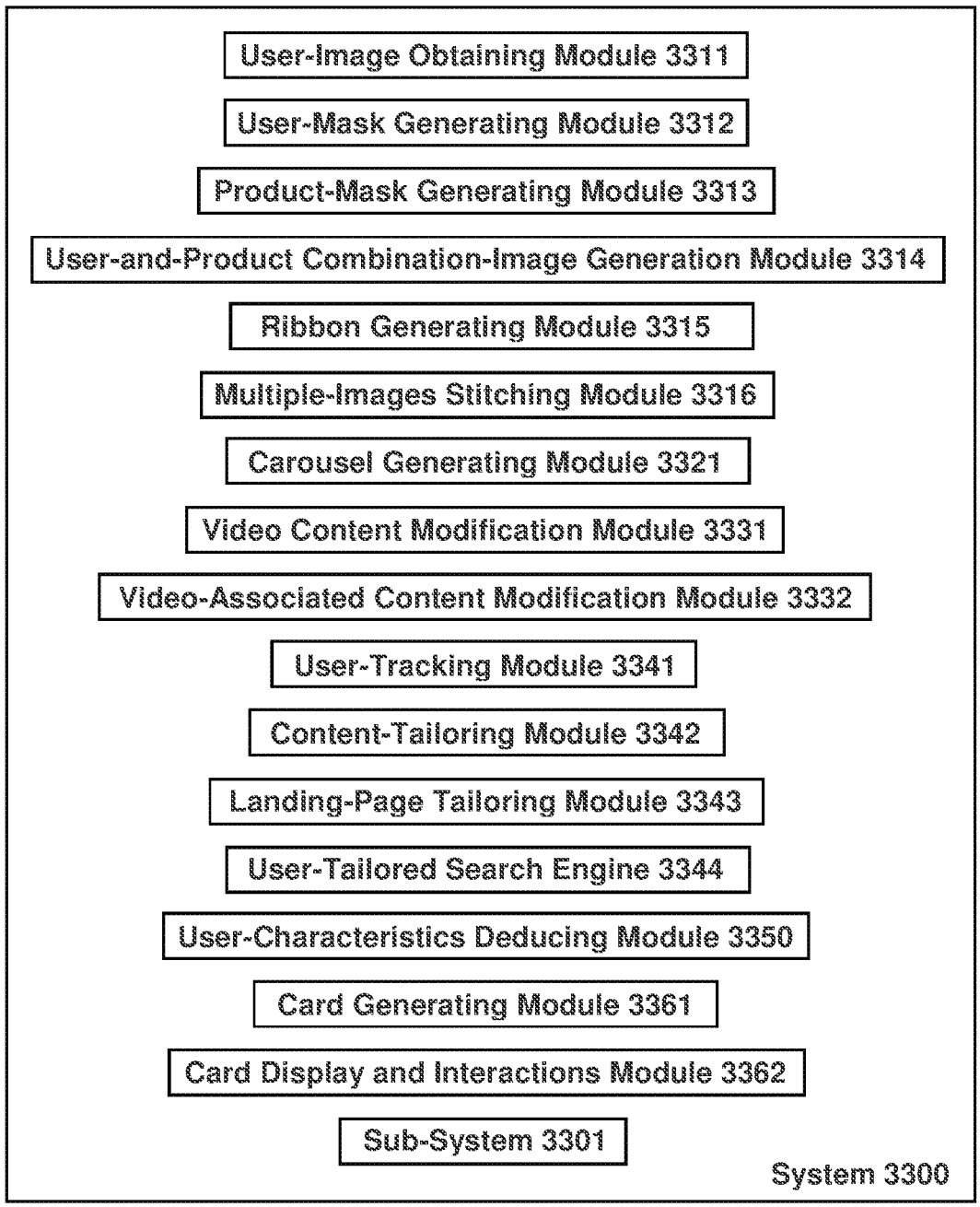
FIG. 33 is a schematic block-diagram illustration of a system, in accordance with some embodiments of the present invention.

Reference is made to FIG. 33, which is a schematic block-diagram illustration of a system 3300, in accordance with some embodiments of the present invention. System 3300 may comprise a sub-system 3301, which may be generally similar to system 5000 of FIG. 32, and/or which include some or most or all of the units of system 5000 of FIG. 32. Particularly, such units of sub-system 3301 enable system 3300 of FIG. 33 to capture or obtain an image (or a set of images, or a video clip) of the user, via a User-Image Obtaining Module 3311; to generate a user-mask of the user via a User-Mask Generating Module 3312; to generate a product-mask for each product that system 3300 may process or handle, via a Product-Mask Generating Module 3313, and to generate a composite image of the particular user being virtually-dressed with that particular product, via a User-and-Product Combination-Image (or Composite Image) Generation Module 3314, which generates a combined image or a composite image of user-and-product. The structure and operations of these modules may be generally similar to the detailed discussion above with regard to image processing and/or computer vision operations.

In a demonstrative example, a Ribbon Generating Module 3315 may receive as input a list of identifiers of products (e.g., product numbers; URLs URIs pointing to product pages; remote and/or local resource locators; record identifiers in a local or remote database of products; discrete images of products; pointers or shortcuts or web-addresses or online destinations or web-pages that include or store or otherwise display or serve images or information of products when accessed; SKU numbers of products; or the like). Optionally, one of the product identifiers may be pre-marked as the First product to be displayed, or as the Central product to be displayed centrally within a ribbon interface; alternatively, a pre-defined rule may indicate that the first item on the list would be used as the first (or, as the central) item to be displayed; or that the central or median item within the list would be used as the central item in the displayed ribbon. The Ribbon Generating Module 3315 may utilize the User-Image Obtaining Module 3311 and the User-Mask Generating Module 3312 to obtain an image of the user and generate a user-mask to be used for virtual dressing. The Ribbon Generating Module 3315 may also obtain images of the listed products, and may utilize the Product-Mask Generating Module 3313 to generate a product-mask of each product. These pre-processing operations may be performed prior to a ribbon being fully-generated and/or displayed, for example, in order to speed-up the display and/or utilization of the ribbon GUI element(s). The Ribbon Generating Module 3315 may determine which product is to be displayed centrally in the ribbon, and may further determine at which order the other products on the list are to be organized to the left side and to the right side of that central product. For example, Product numbers 1 to 7 may be received as input; and a pre-defined rule may indicate that Product 4 would be used as the Central image, while Products 1-3 would be displayed to its left, and while Products 5-7 would be displayed to its right.

In some embodiments, the Ribbon Generating Module 3315 proceeds to utilize the User-and-Product Combination-Image Generation Module 3314 in order to generate at least one composite image of the user virtually-dressed with Product 4; and to display that composite image at a central location within a ribbon GUI element on the screen of an electronic device of the user. This operation may be performed when the ribbon is being generated for display, or at any time prior thereto.

Then, in some embodiments, the Ribbon Generating Module 3315 causes the screen to display only reduced-size images (or, full-size images; or thumbnail images) of Products 1-3 and Products 5-7 on the sides of the central image, such that those products are displayed without having a composition of the user virtually-dressed in them yet; and only upon scrolling or swiping or selection by the user of another product (e.g., of product 5 in the ribbon), does the Ribbon Generating Module 3315 proceed to utilize the User-and-Product Combination-Image Generation Module 3314 to generate a composite image of the user being virtually dressed with Product 5, and to display it in the central location within the ribbon, replacing there the previous composite image of the user with Product 4, and causing other images in the ribbon to shift one place to the left. In some embodiments, the generating of such alternate composite images may be done in real-time or near-real-time (e.g., within 10 or 20 or 40 milliseconds), for example, in response to the user's input.

Alternatively, in other embodiments, even before the user selects any of the 7 products on the ribbon, the Ribbon Generating Module 3315 may utilize the User-and-Product Combination-Image Generation Module 3314 to pre-generate seven composite images of the user being virtually-dressed with each one of the Products 1-7, but only show one (or some, but not all) of the composite images at a time. This may be advantageous on some systems, for example, to ensure rapid response time as the user browses or scrolls or swipes back and forth along the ribbon; may shorten the response time, may improve the user experience, and/or may offload or reduce processing resources from the end-user device, or may otherwise improve performance. The pre-generated composite images may be stored temporarily or for long-term, in the electronic device of the user and/or at a remote server that performs the image composition of the user with the relevant product. In some embodiments, the Ribbon Generating Module 3315 may further allow the user to select to inspect or enlarge (zoom in) any of the displayed products, and/or to purchase one or more of them via an online transaction. In some embodiments, the structure and functionality of the Ribbon Generating Module 3315 may be duplicated into two or more such Ribbon Generating Modules, that may operate in parallel with regard to different body parts of the user and with regard to multiple different products that match such body parts. For example, a first instance of the Ribbon Generating Module 3315 may operate to generate a top-side ribbon, which generates an image of only the top-half of the body of the user (e.g., from the belt upward) being virtually-dressed with a Shirt Product out of a list of 6 possible Shirt Products; whereas, in parallel, a second first instance of the Ribbon Generating Module 3315 may operate to generate a bottom-side ribbon, which generates an image of only the lower-half of the body of the user (e.g., from the belt downward) being virtually-dressed with a Skirt Product out of a list of 8 possible Skirt Products. The system 3300 thus presents a combined or virtually-stitched image, with two nearby yet separately-operating ribbon GUI elements, such that a top-side ribbon GUI element allows the user to swipe or scroll or browse sideways in order to virtually dress her image with different Shirts, whereas a second, nearby, lower-side ribbon GUI element allows the same user to swipe or scroll or browse sideways in order to virtually dress her image with different Skirts.

Optionally, a Multiple-Images Stitching Module 3316, which may be part of the Ribbon Generating Module 3315 or may be part of sub-system 3301, may automatically generate an image portion that provides a visually-smooth transition between the top-side composite image and the lower-size composite image; and may optionally be associated with a Tuck/Untuck button or GUI element, enabling the user to command whether the top-side product (shirt) should be shown as "tucked" or as "untucked" relative to the lower-side product (skirt). The image stitching may be performed in real-time or near-real-time in response to user input (e.g., as a post-processing operation) based on computer vision algorithms; for example, a Gradient Filling algorithm that generates a transition image-portion, that begins with the color of the top-side product, and transitions gradually to the color of the lower-side product; or by placing at the stitching region an image of another item or accessory (e.g., a belt); or by causing the upper-side product to be displayed as partially-covering the lower-side product to create an "untucked" version of the pair of two composite images; or the like.

This unique mechanism provides various benefits to the user, who may now be able to visualize how she would appear in various particular combinations of clothes, that are virtually-dressed on her own image; such that, in the above example of 6 shirts and 8 skirts, the user may easily and rapidly and efficiently utilize the dual-ribbon GUI mechanism to generate and inspect 48 combinations of these two clothing articles, and may proceed to save or share or purchase preferred combination(s).

Figure 34:
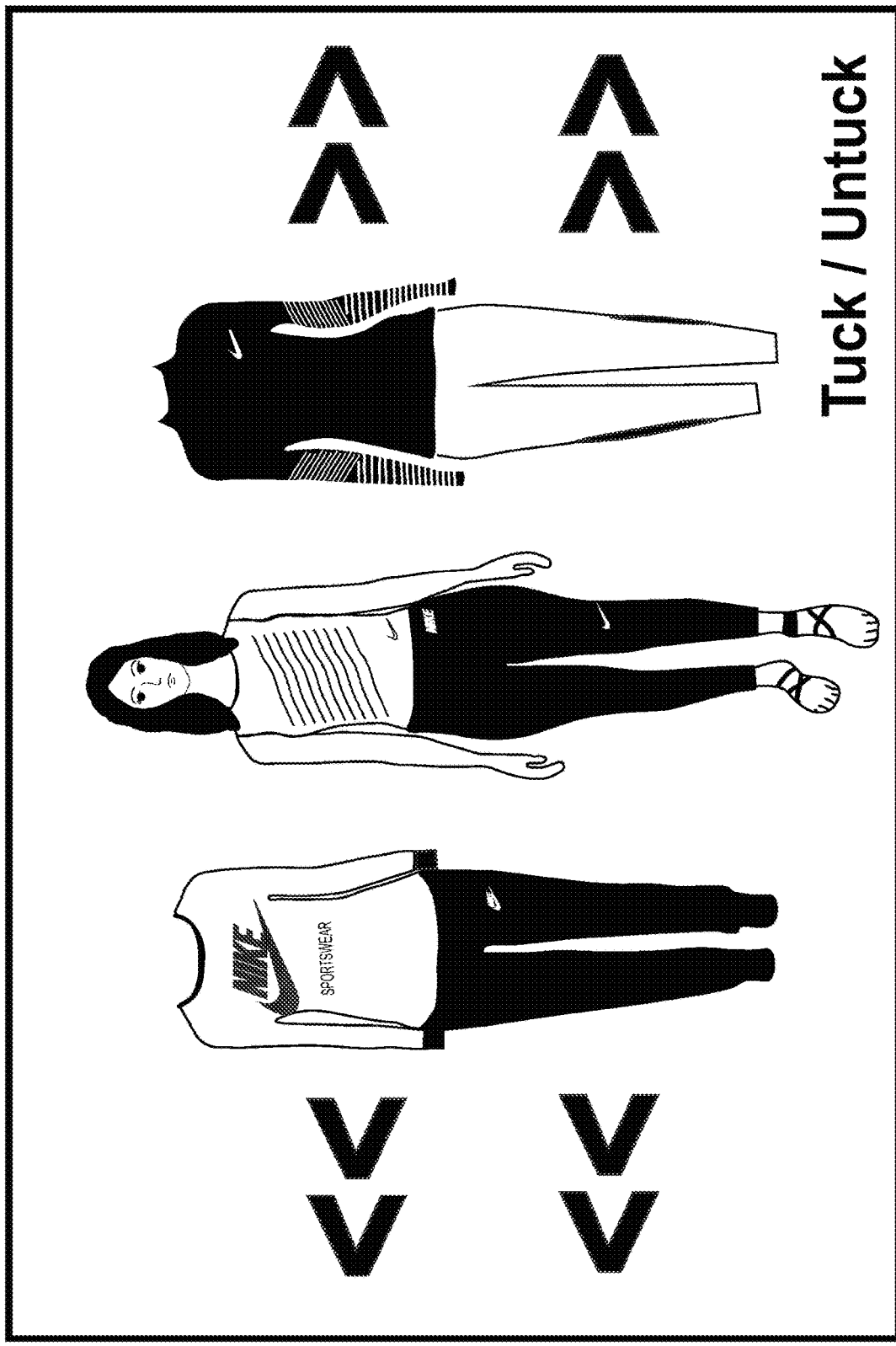
FIG. 34 is a schematic illustration of a ribbon-based GUI that is generated and operated (e.g., via a screen of a touch-screen of an electronic device), in accordance with some demonstrative embodiments of the present invention.

Reference is made to FIG. 34, which is a schematic illustration of a ribbon-based GUI that is generated and operated (e.g., via a screen of a touch-screen of an electronic device), in accordance with some demonstrative embodiments of the present invention. Centrally shown is a composite image of a particular user, who is virtually-dressed with a particular shirt and particular pants. A top-left button indicating "<<" and a top-right button indicating ">>", enables the user to command the system to change the central image, such that the top-side of the depicted user would be virtually-dressed with the shirt shown, respectively, to the left or to the right of the central shirt. Similarly, a bottom-left button indicating "<<" and a bottom-right button indicating ">>", enables the user to command the system to change the central image, such that the lower-side of the depicted user would be virtually-dressed with the pants shown, respectively, to the left or to the right of the central shirt. Optionally, a "Tuck/Untuck" button or slider or other GUI element enables the user to indicate to the user which stitching technique to utilize for stitching together the top-side and the lower-side of the pair of composite images. Carousel Generator:

In some embodiments, the system may utilize a tag or a script or a code-portion, that triggers the automatic generation and display of an interactive on-screen carousel or rotatable gallery; in which each item in such carousel is: a different type of a clothing article, that are virtually-dressed on the same (single) real-life image of the same user.

In some embodiments, the system may utilize a tag or a script or a code-portion, that triggers the automatic generation and display of an interactive on-screen carousel or rotatable gallery; in which each item in such carousel is: a different type of a clothing article, that are virtually-dressed on two or more different, real-life images of the same (single) user.

In some embodiments, the system may utilize a tag or a script or a code-portion, that triggers the automatic generation and display of an interactive on-screen carousel or rotatable gallery; in which each item in such carousel is: a different type of a clothing article, that are virtually-dressed on two or more different, real-life images of two or more different users.

For example, Jane is a blogger that maintains an online blog about fashion. Jane selects seven shirts (or, four shirts and three skirts) from a particular online vendor (e.g., from OldNavy.com) or from two or more different online vendors. Jane provides to the system of the present invention her selection of those seven items, as well as her own selfie photo.

The system generates automatically a short code snippet or tag, that Jane can easily insert or embed into her online blog; and that code snippet or tag calls or triggers the execution of a second code or function, which causes the system to serve to the end-user (e.g., a reader of Jane's blog) an online carousel or user-rotatable gallery of seven images; each image features the real-life photo of the blogger Jane, which is virtually-dressed with one of the seven items that Jane selected from that vendor or from those vendors. Optionally, in order to accommodate form-factor or screen constraints, only some of the seven virtually-dressed images are shown at a time, and the end-user is able to rotate or switch among the displayed and hidden (non-displayed) virtually-dressed depictions, in an efficient or rapid manner.

The system thus allows the producers of content, such as Jane the blogger, to efficiently and rapidly produce a website or a webpage that efficiently depicts multiple or many items, that are virtually-dressed on the image of that particular user herself, in a space-efficient form-factor that enables the end-user (the viewer) to easily slide sideways or to perform other gesture in order to efficiently browse through the multiple virtual-dressing compositions.

In some embodiments, the content producer (Jane) may select two or more multiple photos of herself, such that the generated carousel would feature the seven selected articles of clothing, that are virtually dressed on alternating or otherwise changing images of the user herself; for example, Shirt 1 dressed over Jane-1 photo; then Shirt 2 dressed over Jane-2 photo; then Shirt 3 dressed over Jane-1 photo again; and so forth.

In some embodiments, the content producer (Jane) may select one image of another person, or may select two or more images of two or more persons, such that the seven selected clothes would be depicted as virtually-dressed onto that other person or onto those other persons, as selected by Jane, within the space-efficient interface of the rotating carousel.

Some embodiments may be implemented, for example, by utilizing a pre-programmed code template of a rotating carousel; that receives as changing parameters, for example, links to or images of the seven selected clothing articles, and a link to or an image of the user's photo that is to be utilized for the virtual dressing; and the code template is updated by or augmented by those user-selected parameters, in order to tailor the actual content shown to each such blogger or content producer or website.

Figure 35:
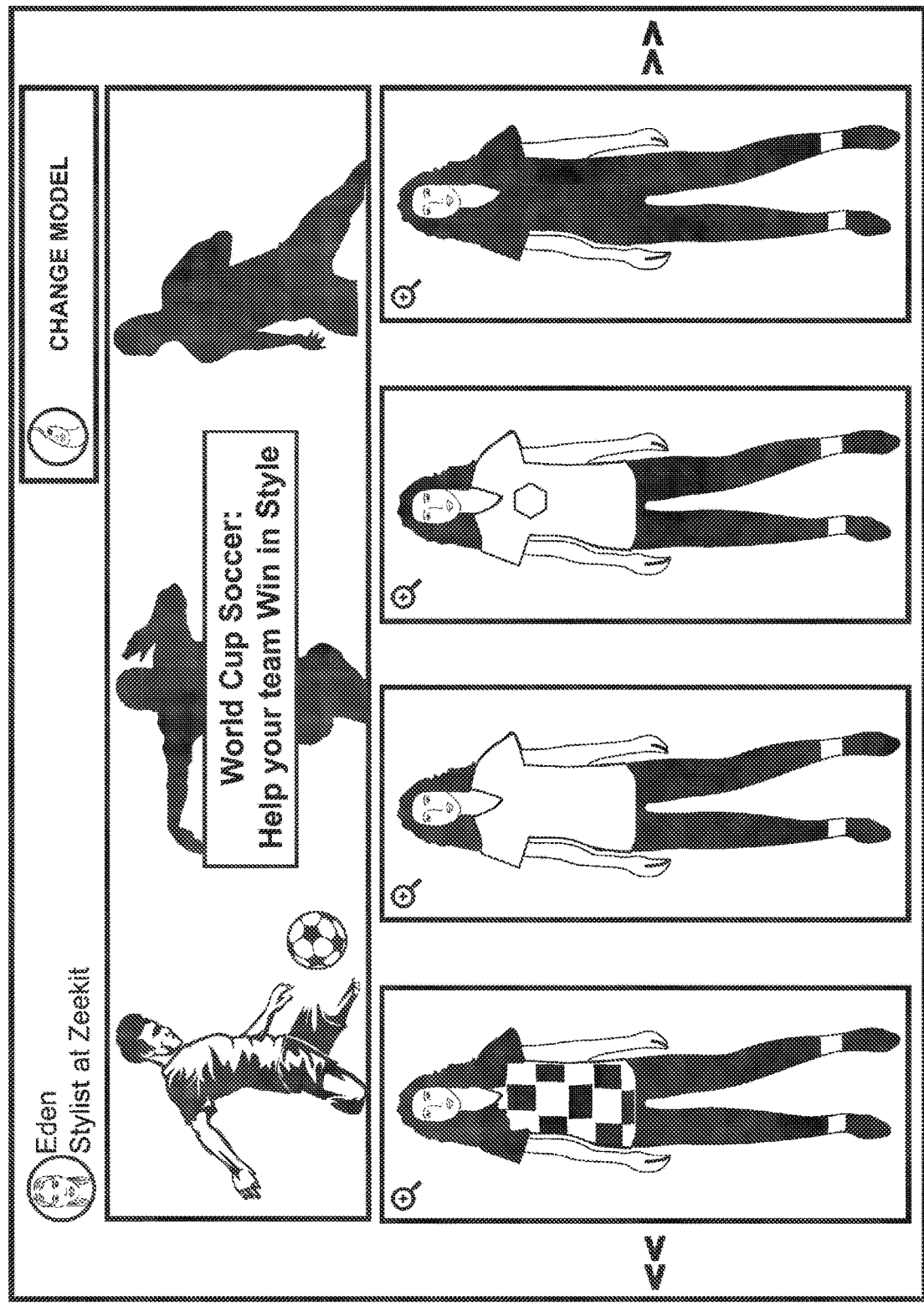
FIG. 35 is a schematic illustration of a carousel-based (or gallery-based) GUI that is generated and operated (e.g., via a screen of a touch-screen of an electronic device), in accordance with some demonstrative embodiments of the present invention.

Reference is made to FIG. 35, which is a schematic illustration of a carousel-based (or gallery-based) GUI that is generated and operated (e.g., via a screen of a touch-screen of an electronic device), in accordance with some demonstrative embodiments of the present invention. Centrally shown is a content-item, such as an image and a textual component that reads "World Cup Soccer: Help your team Win in Style", in which an author or publisher (e.g., a blogger) invites readers or end-users to perform an online purchase of a shirt, out of multiple types of shirts that are made and/or sold by multiple different makers and/or vendors. At the bottom of the screen there is depicted a rotatable carousel GUI element, or a rotatable gallery of images; such that each one of the images in that carousel or gallery is a composite image of the particular end-user being virtually-dressed with a particular different shirt (or clothing article). Right-side and left-side GUI elements, such as a button marked ">>" and a button marked "<<", enable the user to cause the carousel to rotate, thereby exposing additional images and hiding one or some of the current images, emulating a side-scroll or a rotating carousel in which only a portion of the carousel is within the current field-of-view of the user. Clicking or selecting one of the particular images in the carousel, may cause the system to perform one or more pre-defined actions; for example, may cause the system to display an enlarged or magnified or zoomed-in version of the selected composite image, and/or may navigate to a different page in which the selected product can be purchased online from the relevant vendor or maker, and/or may cause a new window or tab to open in which a rotating Ribbon or a rotating Gallery of the images (e.g., in an enlarged version) is shown for further inspection Further depicted in the top-right area of in FIG. 35 is a "Change Model" button or GUI element, enabling the user to command the system to replace the currently-shown user with another user to be virtually-dressed with the same items of clothes as shown; for example, enabling the user to upload or capture his own self-image ("selfie" photograph), or to select a particular model or celebrity from a bank or pool of images, or to upload an image of another person (e.g., friend, family-member) that the current end-user wishes to envision how these products would appear if virtually-dressed by such other person. Upon such change as commanded by the user, the system generates new composite images of user-and-product, by utilizing the other image as selected or uploaded by the current user, and dynamically updates the display unit to depict the combined user-and-product using that other image which was freshly provided or selected. Optionally, in the top-left area there are shown details of the publisher or content creator, such as a blogger name or nickname, a small image thereof, an indication of a publishing channel or medium associated with the content, or other suitable data.

Referring back to FIG. 33, system 3300 may comprise a Carousel Generating Module 3321 able to generate and operate this mechanism of the present invention. For example, the publisher or author (e.g., a blogger) of the Carousel may utilize or may invoke a step-by-step wizard tool, which may be part of the Carousel Generating Module 3321 or may be separate therefrom, to cause the system to create code that implements the above. The blogger commands the system to "create a new carousel"; then selects a main image and a main textual component to be displayed in the upper portion, being a non-changing portion that contains the call-for-action. Then, the blogger selects a list or group of products; such as, by providing a list of URLs, and/or by providing a list of images (optionally with hyperlinks to pages that sell them online; optionally with a textual description for each image), and/or by browsing an already-linked online catalog of products that was prepared in advance for bloggers to select from.

The Carousel Generating Module 3321 records and stores the blogger's input and selections; and fetches or obtains or downloads or otherwise copies (or, receives via an upload operation by the blogger) the set of images of the selected products (e.g., at least four products/four images, in the depicted example), and optionally their respective URLs or hyperlinks to the suitable product pages. The Carousel Generating Module 3321 may utilize the User-Image Obtaining Module 3311 to obtain an image of an end-user and generate a user-mask to be used for virtual dressing. The Carousel Generating Module 3321 may also obtain images of the listed products and utilize the Product-Mask Generating Module 3313 to generate a product-mask of each product. The Carousel Generating Module 3321 may utilize the User-and-Product Combination-Image Generation Module 3314 to generate the corresponding composite images of a particular end-user being virtually-dressed with each one of those products, and to display the composite images (or, at least some of them, based on the size of the Carousel compared to the total number of products) in the Carousel area. The Carousel may include user interface controls or GUI elements such that, in response to the user selection or clicking or tapping on one of the images (or on GUI element(s) located near any of the images), the GUI functionality provided by the Carousel performs the pre-defined action(s), such as: displaying the selected image in an enlarged window or tab, and/or navigating to a pre-defined URL or web-page in which the particular product can be purchased.

In some embodiments, the image of the end-user that is virtually-dressed with each product, and is shown in the Carousel GUI element, may be an image of the blogger that he uploaded to the system in advance. In other embodiments, the image of the end-user that is virtually-dressed with each product, and is shown in the Carousel GUI element, is an image of the actual end-user of the electronic device; namely, the end-user who reads or consumes the digital content, who may be a logged-in user that had previously used the system and had previously uploaded or captured her own image in the past, and that the system can track and/or identify based on one or more tracking methods (e.g., based on a tracking "cookie" data-item; based on a logged-in session that the end-user continues; based on previous authentication of user credentials within an online social network or another online system (e.g., an email system; an online retailer website); or the like.

In some embodiments, the Carousel Generating Module 3321 may further generate program code (e.g., in HTML and/or JavaScript), which the blogger (or other publisher) may copy-and-paste into his website or web-page or blog or publishing medium; and such program code may obtain a second, longer, program code that may be stored on a remote server and which implements and executes the functionalities described above (e.g., placement of images on the screen, placement of GUI buttons, responsiveness to clicks or taps, or the like). In some embodiments, the generated code may be short and may include only a location-reference or a shortcut or URL or URI to a remotely-stored data-set that comprises the whole set of product images, product hyperlinks, textual components, and/or other components. In other embodiments, the generated code may optionally comprise within itself, one or more data-items that are utilized by the code in order to locally generate the carousel GUI element; for example, the generated code may inherently comprise the URLs to the product pages, and/or hard-coded hyperlinks to a remote repository in which the product images are statically stored. Other suitable implementations may be used in accordance with the present invention.

Video/Images Interactivity Module:

In some embodiments, the system may comprise video/image interactivity modules able to generate and implement unique end-user interactions between (i) a video featuring one or more clothing articles, and (ii) one or more images of those clothing articles; in a unique manner that enables the end-user (e.g., the viewer, or the consumer of the online content) to interact in new ways with the presented information.

In a First Demonstrative Example:

A video clip shows three girls that are eating lunch together and are talking with each other; for example, showing Anne wearing a red shirt, talking with Becky wearing a blue shirt, talking with Carla wearing a green shirt. The video is a 30 second video, and is displayed, for example, at a website of an online store or vendor that sells those three shirts.

An end-user Sarah is browsing that website and is viewing the video. Sarah utilizes a pointing device (mouse, touch-screen) to touch the video as it is played, and particularly to touch Anne in the video. In response to this user selection, the video continues to play as before, but the web-page portion that is shown beneath or above or near the video is automatically modified, to show, for example: (I) the red shirt that Anne was wearing in the video, together with its price and other data; and/or (II) a depiction of Sarah herself (e.g., based on the selfie photo of Sarah) that is virtually-dressed with that particular red shirt that Anne wears in the video and that Sarah clicked on (or even, hovered upon).

As the video keeps on playing, after five seconds, Sarah then clicks on Becky in the video. In response, the content that is displayed in proximity to the video is automatically updated or modified, to show: (I) the blue shirt that Becky is wearing in the video, together with its price and other data; and/or (II) a depiction of Sarah herself (e.g., based on the selfie photo of Sarah) that is virtually-dressed with that particular blue shirt that Becky wears in the video and that Sarah clicked on (or even, hovered upon).

The system may implement this interactivity, for example, by utilizing a pre-programmed time-sensitive image-map or heat-map of the video. For example, the system may pre-define that during the first five seconds of the video, a click (or hovering) over the left-most 250×400 pixels of the video, would trigger a code portion that causes the screen to display also the red shirt with its price and other data, and/or that triggers a code portion that causes the system to generate and display a virtual-dressing depiction of the actual-user that is virtually-dressed with that particular red shirt. Similarly, the system may pre-define that a click or hovering, during those first five seconds, over the right-most 300×400 pixels of the video, would trigger a similar code that takes the green shirt of Carla as its variable, rather than the red shirt of Anne. Similarly, the system may pre-define that a click or hovering, during the next four seconds of the video, in another particular video region, would trigger a code portion that generates and displays a depiction of the actual end-user being virtually-dressed with the blue shirt of Becky; and so forth, The indications may be location-based and/or time-based; and the persons in the video may move or may change their relative position (e.g., may dance, may walk or run) such that the heat map follows their in-video depiction to trigger the suitable image manipulation that corresponds to the selected (clicked, hovered) video portion.

In a Second Demonstrative Example:

A 30-second video clip has three portions: a first ten-seconds portion in which only Anne is shown in the video, dancing and wearing the red shirt; then, a second portion (nine seconds) in which only Becky is shown in the video, dancing and wearing the blue shirt; then, a third portion (eleven seconds) in which only Carla is shown in the video, dancing and wearing the green shirt.

The end-user Sarah is watching the video, and does not need to click or hover at all; the system automatically operates to generate and to modify the content that is displayed near the video, as follows: (I) during the first ten seconds of the video playback, which shows only Anne wearing the red shirt, the proximate page-region shows the end-user herself (Sarah) virtually dressed with that same red shirt; then, (II) during the next nine seconds, which shows only Becky wearing the blue shirt, the proximate page-region shows the end-user herself (Sarah) virtually dressed with that same blue shirt; then, (III) during the next eleven seconds, which show only Carla wearing the green shirt, the proximate page-region shows the end-user herself (Sarah) virtually dressed with that same green shirt. Optionally, if the end-user Sarah pauses the video playback, then the depiction of the virtually-dressed image of Sarah is maintained with the current virtually-dressed version; and resuming the video playback would cause resuming of the modification of the virtual dressing of the end-user's image accordingly.

This may be implemented, for example, by using a time-sensitive or time-triggered code portion; which automatically generates and displays a fused image of the end-user's image together with the first item (the red shirt) during the time-period that is defined as associated with the first item in the video (the first ten seconds); then, the code being executed monitors the elapse of time in the video playback, and upon elapsing of ten seconds since the beginning of the video, modifies that content to display a fused image of Sarah together with the second item that is features in the video during that time-slot (e.g., the blue shirt, during those nine seconds); and so forth.

In a Third Demonstrative Example:

A video-clip is automatically generated and/or modified in response to the end-user selection of an item. For example, end-user Sarah performs a search for "flower skirt" at an online vendor website. The website has five search results, and they are shown to Sarah as five depictions of Sarah's actual image (e.g., extracted from her selfie photo) being virtually-dressed by each one of those five found skirts; for example, side by side. Then, when Sarah clicks on or taps on Depiction 1, which shows Sarah being virtually-dressed with Skirt 1, this causes the server to serve (e.g., on the same page or web-page, in proximity to the image) a video that shows another person (e.g., Anne) being actually dressed with that particular Skirt 1 and performing one or more actions (e.g., walking, dancing). While that video of Anne dancing with Skirt 1 is playing, the end-user Sarah clicks or taps on her virtually-dressed image that features Skirt 2; and in response, the system replaces the video of Anne dancing with Skirt 1, with another video of Becky walking with Skirt 2; and so forth.

This may be implemented, for example, by utilizing a database or lookup table that associated between: (i) a particular clothing article (e.g., Skirt 1), and (ii) a particular video-segment or video-clip that shows a person wearing that particular clothing article.

In a Fourth Demonstrative Example:

A video-clip is automatically generated and/or tailored by selectively fusing together or selectively merging together, multiple video-segments that were pre-produced, in response to a search query entered by the user, such that a video is dynamically constructed and played based on the current search or browsing (or browsing history) of a particular end-user.

For example, an online shopping website may offer for sale the following catalog of items: (1) red shirt; (2) purple pants; (3) green shirt; (4) green scarf; (5) red skirt; (6) yellow pants; (7) white shirt; (8) red scarf. Each one of these items, is associated with an image of the particular article of clothing (e.g., image of the red shirt; image of the purple pants; and so forth). Additionally, each one of these items, is also associated with a video-clip (e.g., ten seconds long) showing a person wearing that article (e.g., a first video clip showing Anne wearing the red shirt and dancing; a second video clip showing Becky wearing the purple pants and running; a third video clip showing Carla wearing the green shirt and talking; and so forth).

The end-user Sarah enters a search query of "red clothes" in that website or catalog or search engine. Based on pre-defined tags or categories, the server identifies three relevant (or most-relevant) search results: the red shirt, the red skirt, and the red scarf.

The server proceeds to generate, and to serve and display, three depictions of the end-user Sarah being virtually-dressed with each one of those three relevant results; namely, a first depiction of the end-user Sarah being virtually-dressed with the red shirt, near a second depiction of the end-user Sarah being virtually-dressed with the red skirt, near a third depiction of the end-user Sarah being virtually-dressed with the red scarf.

The server also proceeds to generate a unique 30-seconds merged video that is comprised of three pre-defined video segments; the merged video comprising: (I) the pre-defined video segment of the person that wears the red shirt; followed immediately by (II) the pre-defined video segment of the person that wears the red skirt; followed immediately by (III) the pre-defined video segment of the person that wears the red scarf. The system generates a single video, that has those three video segments one after the other; and the system serves or causes playback of that user-tailored video, that was tailored based on the search query of end-user Sarah, from pre-defined various video-segments that are associated with various corresponding articles.

In another embodiment, the server or website or application or "app" tracks and monitors the search history and/or the browsing history of the end-user Sarah; and identifies that the end-user Sarah has inspected the page of the Green Pants, and then inspected the page of the Yellow Shirt, and then inspected the page of the White Scarf. The system may then proceed to automatically generated a merged video clip, which features the cumulative video segments of these three particular items that end-user Sarah has browsed or inspected.

In a Fifth Demonstrative Example:

A video-clip is automatically generated and/or tailored by the system, based on particular selection of items by a content producer. For example, Jane is a blogger that produces an online blog about fashion. Jane selects three particular clothing articles from an online catalog of an online vendor; for example, Jane selects a particular white scarf, a particular red shirt, and a particular green skirt. Based on Jane's selections, the system generates a code-snippet or tag or script, that Jane can embed or insert into her blog; which causes execution of a script or a code that, in turns, generates and plays a unique, tailored, video clip that is an aggregation of the three video segments of these particular items, stitched together or appended into a single smooth-playing video; for example, featuring firstly a video segment of Anne wearing the shite scarf, then a video segment of Becky wearing the red shirt, and then a video segment of Carla wearing the green skirt. The system thus enables a content produce, such as Jane the blogger, to rapidly and efficiently produce content that comprises a unique, tailored, video clip that is comprised of the cumulative video-segments of the respective producer-selected items from that catalog or from that website, or even from multiple websites (e.g., a video segment of the red shirt from OldNavy.com, stitched together with a subsequent video segment of the green skirt from Gap.com; and so forth).

The functionality of the five above-described examples may be implemented via a Video Content Modification Module 3331 and/or via a Video-Associated Content Modification Module 3332. For example, the Video-Associated Content Modification Module 3332 may monitor the elapsed time during the playback of the video; may monitor a pre-defined Timing Scheme of products that are associated with that particular video; may determine that from time-point T1 to time-point T2, a first product is to be displayed near (e.g., under) the playing video, and may cause such limited-time display of the image of the first product there during that time-period; may detect that time-point T2 has been reached; and may automatically replace the display of the first product, with an image of a second product which the Timing Scheme dictates as being the product that should be displayed from time-point T2 to time-point T3.

Optionally, instead of displaying the mere image of the relevant product, the Video-Associated Content Modification Module 3332 may utilize the User-and-Product Combination-Image Generation Module 3314; such that at each pre-defined time-period according to the Timing Scheme, the depicted image (e.g., shown near or under the playing video) would be a composite image of the particular product being virtually-dressed on a particular end-user. For this purpose, the image of the particular user that would be used in such composite images, may be the image of the content publisher (e.g., a blogger or author); or, may be the image of the actual end-user of the electronic device (e.g., the final consumer of the digital content), who had previously captured or uploaded to the system her own image and was tracked by the system (e.g., based on being logged-in; based on a tracking cookie; or the like).

The Video-Associated Content Modification Module 3332 may utilize the User-Image Obtaining Module 3311 to obtain the image of the end-user and generate a user-mask to be used for virtual dressing. The Video-Associated Content Modification Module 3332 may also obtain images of the products shown in the video (e.g., based on a pre-defined list or table, which is associated with that video, and which points or indicates a location or a web-page or a file from which the image of each product may be obtained, or that otherwise include shortcuts to online descriptors of those products and/or to their images, or even from a pre-defined group of actual image files which may be prepared or supplied with that particular video as images of products depicted in that video); and may utilize the Product-Mask Generating Module 3313 to generate a product-mask of each product. The Video-Associated Content Modification Module 3332 may utilize the User-and-Product Combination-Image Generation Module 3314 to generate the corresponding composite images of a particular end-user being virtually-dressed with each one of those products during the different pre-defined time-periods.

In some embodiments, instead of changing the Video-Associated content based on a pre-defined Timing Scheme of associated products, or in addition to such changes, the Video-Associated Content Modification Module 3332 may change the Video-Associated content based on interactions of the user with the video being played. For example, the Video-Associated Content Modification Module 3332 may utilize a "heat map" representation, that indicates that a click (or a hover) of the user in a particular video-region or rectangle or polygon of the playing video, during a particular time-period (e.g., during the first ten seconds of the video playback), would cause the associated content (e.g., displayed near or under the playing video) to automatically be changed to a pre-defined product that appears in that video-segment or video-region, and/or to be automatically changed to a composite image of that pre-defined product being virtually-dressed by a particular user (e.g., on an image of the publisher or blogger; or, on an image of the end-user/consumer of the digital content).

Additionally or alternatively, the Video Content Modification Module 3331 may implement the functionality that modifies the content of the video itself, based on the user interaction or based on other data about the current end-user. For example, as end-user Sarah browses an online catalog or products, the system tracks and stores her browsing history (e.g., Sarah browsed Shirt number 4, then Skirt number 7, then Shoes number 3, out of a catalog of numbered products). Then, the Video-Content Modification Module 3331 may access a repository of pre-stored video segments, which stores discrete video segments that depict various persons interacting while wearing the relevant products; for example, video segment number 4 in the repository depicts a person wearing Shirt number 4 and dancing, whereas video segment number 7 in the repository depicts a different person (or, the same person) wearing Skirt number 7 and walking. The video-segments obtained from the repository are then joined or merged together by the Video Content Modification Module 3331, or are played one after the other in a single loop or in multiple loops; optionally with added video effects or video transitions; and optionally while the Video-Associated Content Modification Module 3332 operates to modify, in parallel, an image of the product that is shown near the video while the video is playing, to match the product shown in the video-segment that is currently being played, and optionally such that the currently-shown product is a composite image of that product being virtually-dressed on a particular user (e.g., the publisher or blogger; or, the actual end-user/consumer).

Eternal Tag/Cookie, and Personalized Landing Pages:

In some embodiments, the end-user Sarah visits a first website, such as Gap.com, and browses or searches for a particular item such as a "flower skirt". End-user Sarah uploads her selfie image; which the system then utilizes in order to generate, and to display to Sarah, on-screen depictions of Sarah being virtually-dressed in various types of skirts that are pre-tagged as "flower skirts". Then, user Sarah proceeds to search for "green pants" on the same website. The system tracks the browsing history of the end-user, such as via a client-side cookie and/or a corresponding server-side database record that is associated with that cookie; and when Sarah searches for "green pants", the search results on that same website (Gap.com) are presented to her as multiple depictions of herself (based on Sarah's selfie image) being virtually dressed with various types of such "green pants" items.

This remains valid and operable even if a long period of time elapses between the first and the second searches, such as even days or months of even years. The cookie mechanism or other state-maintaining mechanism or user-tracking mechanism, enables the system to recognize that the currently-visiting end-user is a previously-seen user that had uploaded her own selfie photo, even one time only, even several years ago; and enables the system to retrieve from its database that previously-uploaded selfie photo, and to generated virtually-dressed depictions of that particular end-user.

Moreover, this may be implemented by the system in a cross-website or cross-applications (cross-app) manner. For example, the cookie and/or the database record and/or the generation of the virtually dressed depiction of the end-user Sarah, when she visits the website Gap.com, need not necessarily be performed by a Gap.com server; but rather, may be implemented, in whole or in part, by a tag or code-snippet that is embedded (or is served by) Gap.com but triggers the execution of code that is hosted elsewhere, such as in a third-party cross-website advertising network that serves multiple different vendors and can track a user across multiple non-related websites. Therefore, when Sarah would visit, for her first time ever, the website of Walmart.com, which may utilize the same advertising network as the one utilized by Gap.com, the newly-visited website (Walmart.com) may be able to request the third-party advertising network to utilize the previously-uploaded selfie photo of Sarah (that was uploaded months or years ago at Gap.com) in order to generate depictions of Sarah being virtually-dressed with items that are offered for sale on Walmart.com.

The system of the present invention may thus create a first "Wow Factor" for a user, who has never visited a certain website (e.g., Walmart.com), and who certainly has never uploaded his selfie photo into that website; such that, even immediately in the first-ever visit of that end-user in that new website, the new website may indirectly trigger the utilization of the previously-uploaded photo that was uploaded days or months or years ago to another website associated with the same advertising network. The end-user may be fascinated and surprised to see, that when she now searches for "yellow hats" on the new website that she never visited in the past, with a query (yellow hats) that she never searched in the past, the new website displays to her the search results as depicting her own image being virtually-dressed with various yellow hats that are offered for sale on that new website.

The system of the present invention may further create a second type of "Wow Factor" for a user, by generating and tailoring a user-specific Landing Page for each user that clicked on a banner or that selected a search result from a search engine. For example, the same end-user Sarah, later uses a general search engine (such as Google.com, or Bing.com) in order to enter a new, never-before entered (by her), search query such as "pink jacket". The search engine displays several links (e.g., textual links and/or image-based links) to various websites that sell pink jackets; whereas, at least one of those links (or all of them) is to a Landing Page in the target website that tailors its content to the specific visiting user. Therefore, when end-user Sarah clicks on the search result of "Sears.com", she is redirected to a particular landing page at Sears.com that utilizes the cross-website cookie (or other user-tracker item or user-tracking mechanism) to recognize that this is an end-user that had uploaded her selfie image one time in the past in a different website; and accordingly, to display a Landing Page of that website (Sears.com) in which some, or even all, the items are depicted as being virtually-dressed by that particular end-user Sarah who had never visited that website (Sears.com). Accordingly, instead of seeing a general or generic landing page or home-page of the target website, in which items are shown on the shelf or are shown worn by a third-party model, the system of the present invention may surprise and fascinate the end-user by redirecting the end-user to a particular tailored landing page that shows to the end-user items offered for sale on that new website being depicted as virtually-dressed by that end-user.

A similar implementation may operate without necessarily being redirected from a search engine, and even if the user directly accesses a new website (that she had never visited before) by directly typing its address in the URL line. For example, a month later, end-user Sarah types into the URL line in her browser, the URL of a website that she never visited before, such as DKNY.com; and instead of reaching the general or generic all-purpose all-audience home page of that destination, the server at that website utilizes the third-party/advertising network cookie in order to recognize that this particular end-user (Sarah) had visited in the past (even months ago or years ago) another website that is (or that was) a member of that advertising network, and had uploaded her selfie image to that other website; and accordingly, the newly-visited website may now trigger the code of the advertising network that retrieves that previously-uploaded selfie image of that particular user, and fuses it with images of products (e.g., clothes) that are offered for sale by this newly-visited website (DKNY.com). Therefore, even though the end-user Sarah performed a direct manual typing of the destination URL into the address bar or the URL field in the browser, and she expects to reach a general-purpose non-tailored home page for the general public, she is surprised and fascinated to see that the website serves to her a tailored home page (or landing page) that shows images of herself (based on her once-uploaded selfie that she uploaded years ago at Gap.com) being virtually-dressed with various clothes that the newly-visited website (DKNY.com) offers for sale.

The system of the present invention may thus generate and utilize an "eternal" of long-term cookie file or cookie data-item, or other user-tracking item or mechanism; such that once the end-user uploaded at least one photo of herself to at least one website (or "app"), then hundreds or other websites or other "apps", even months or years later, may utilize that once-uploaded photo in order to generate depictions of that particular user being virtually-dressed with the particular offerings of such newly-visited website; optionally showing in this manner a user-tailored landing page, or a user-tailored home page, or a user-tailored list of search results within such website; and thereby presenting to the end-user, immediately upon her first-ever visit to a new website, a Personalized Catalog of products (e.g., clothing articles), each one being depicted as virtually-dressed by that particular end-user herself, based on her historic selfie image that she uploaded years ago into another website or through another "app" (mobile application).

The above-mentioned functionality may be implemented, for example, via a User-Tracking Module 3341 which may operate to track the end-user Sarah across multiple websites or destinations, in conjunction with a Content-Tailoring Module 3342 that tailors the content to be displayed to this particular end-user to be comprised of multiple composite images such that each composite image depicts that particular end-user being virtually dressed by various different products (e.g., clothing articles).

For example, the User-Tracking Module 3341 detects that the end-user Sarah is now utilizing, even for one single time, the system of the present invention in order to capture or to upload her own image to the system, for the purpose of viewing her composite image being virtually-dressed with a particular single "flower shirt" on Amazon. The User-Tracking Module 3341 writes a cookie (e.g., a third-party cookie, controlled by a server of a marketing provider or advertising network, and not necessarily by Amazon itself) that indicates that this particular end-user (e.g., Sarah, but without even necessarily knowing her name or identification) is hereby identified as user number 12,345 in the system, thereby pointing to record number 12,345 in a user database of the system that stores user records. A month later, the same user utilizes the same web-browser to visit Gap.com. As the web-page of Gap.com loads, it executes a script (e.g., a server-side script) that reads the cookie (e.g., the third-party cookie of the advertising network) from the device of that end-user; to parse (on the server side) the content of the cookie and to notice that this is end-user number 12,345; to obtain from the system's repository the previously-stored image (or, image-mask created by the User-Mask Generating Module 3312) of that end-user; and to generate, using User-and-Product Combination-Image Generation Module 3314, at least one composite image depicting that end-user being virtually-dressed by a product offered on Gap.com (and that product and its product-image may be processed or pre-processed into a product-mask by the Product-Mask Generating Module 3313), or alternatively, a set of group or batch of such composite images such that each composite image depicts that particular end-user being virtually dressed by a different product of Gap.com.

Optionally, the Content-Tailoring Module 3342 may be implemented as, or in conjunction with, a Landing-Page Tailoring Module 3343, such that the above-mentioned operations are performed automatically by the system in response to a click or a tap of the end-user on an online banner or other online advertisement; such that instead of reaching a generic landing page that shows five different skirts of Gap.com worn by a model (or by different models), the particular end-user lands (after selecting the banner or advertisement) into a dynamically-constructed landing page that shows those five skirts such that each skirt is depicted as being virtually-dressed on that particular end-user.

In some embodiments, a User-Tailored Search Engine 3344 may operate to implement the above operations, or similar operations, in response to Search Queries performed in a search engine or performed on a retailer website or in an online catalog of products. For example, the User-Tailored Search Engine 3344 receives from the end-user a search query such as "red dress"; then, it fetches or obtains search results via a contention search engine mechanism (e.g., a search in a database of previously-crawled or previously-indexed websites or web-pages, and/or comparison of the query strings to content of previously-indexed web-pages); it fetches or obtains or downloads or extracts images of relevant products, for example, similar to the manner in which Google Images creates a group of generic image results in response to the query "red dress"; but, instead of showing the group of generic images, the User-Tailored Search Engine 3344 may utilize the User-Mask Generating Module 3312, the Product-Mask Generating Module 3313, and the User-and-Product Combination-Image Generation Module 3314 to generate a group of corresponding composite images, such that each one of the composite images depicts one of the image search results being virtually-dressed by the actual end-user who typed the search query, and who has been tracked by the system since her previous utilization of the system to capture and/or upload her own image.

Indirect Analytics about End-Users:

The system of the present invention may analyze data in order to infer, deduce, estimate and/or determine characteristics or preferences of a user, in an indirect manner, based on operations that the user had performed with regard to questions or polls that were posed by other users of the system.

In a demonstrative example, end-user Alice has shared with her friends a poll or a question such as, "do I look better in Shirt 1 or in Shirt 2", such that the system shows to Alice's friends depictions of two different shirts for their selection, optionally depicting each one of the two shirts as being virtually-dressed on Alice herself (based on Alice's uploaded selfie image). In response to this question, end-user Wendy votes or indicates or responds to the system, that Wendy prefers Shirt 1 over Shirt 2, from the two options presented by Alice to her friends.

A week later, end-user Barbara performs a similar poll, requesting her friends to decide whether she looks better in Dress 3 or Dress 4; and this time, her friend Wendy selects Dress 4 as her preferred choice. A month later, end-user Claire performs a similar poll, requesting her friends to decide whether she looks better in Skirt 5 or Skirt 6 or Skirt 7; and this time, her friend Wendy selects Skirt 6 as her preferred choice.

The Applicants have realized that often, when User A indicates his opinion about User B, this information indicates what User A himself may prefer if a similar question was posed with regard to User A himself. The system may now deduce or estimate characteristics of end-user Wendy, based on her voting or her preferred choices with regard to her friends.

For example, Shirt 1 is a red shirt, Shirt 2 is a green shirt; Dress 3 is a yellow dress, Dress 4 is a red dress; Skirt 5 is a white skirt, Skirt 6 is a red skirt, Skirt 7 is a blue skirt. Wendy had indicated on different polls, that she prefers Shirt 1 (red shirt), that she prefers Dress 4 (red dress), and that she prefers Skirt 6 (red skirt). The system may thus deduce or estimate that generally, Wendy prefers clothes having red color; even though Wendy had never visited any online shop, or had never browsed any clothes online, or had never clicked on any advertisement, or had never inspected or even visited any particular page of any particular clothing article; merely based on the fact that Wendy had voted three times, in three different voting questions or polls, that she prefers the Red item(s) for her friend(s).

The system may perform deducing operations that are more complex in their nature, and may correlate or cross-correlate between or among multiple Tags or Descriptors of multiple items that Wendy had preferred (had chosen) for her friends, in order to deduce further characteristics. For example, each one of the three items that Wendy preferred in the three polls, and none of the other four items (that Wendy did not prefer in the three polls), may be tagged as "velour fabric" item; and the system may deduce that Wendy prefers clothing articles made of velour. Similarly, each one of those three items that Wendy preferred (and none of the other four items that she did not prefer), may be pre-tagged with a "formal attire" tag (e.g., rather than as a "casual attire" tag, or a "sports attire" tag); and this may enable the system to deduce that Wendy prefers "formal attire" tagged items for herself and not only for her friends.

These insights may be utilized by the system, in order to selectively display pages and/or content and/or catalogues and/or search results to user Wendy, by taking into account such deduced preferences that are attributed to her.

In a first example, user Wendy then visits, for her first time ever, the website of Gap.com, and searches for "jacket". The system had already deduced that Wendy preferred red items for her friends; and therefore, instead of showing to Wendy search results of various jackets in various colors, sorted by popularity or sorted by price, the system shows—only to Wendy—a modified list (or gallery) of search results, in which all (or most, or at least some) of the displayed jackets are Red jackets.

In a second example, when user Wendy visits, even for her first time ever, the website of DKNY.com, the system already knows that this end-user had preferred, for her friends, clothes that were tagged as "formal attire" on other websites (e.g., that are members of the same advertising network or user-tracking network); and therefore, instead of showing to user Wendy a general-purpose landing page of various types of clothing, the system generates and displays to Wendy a tailored home page (or a tailored landing page) that shows only (or mostly, or partially) clothing articles that are tagged as "formal attire" in this newly-visited website; thereby providing to user Wendy a personalized browsing experience, and showing to her the particular offerings that are estimated to be more relevant to her; even though she had never explicitly shared her own preferences with this website.

This functionality may be implemented, for example, via the User-Tracking Module 3341; which may track and analyze the browsing history of the end-user (Wendy), may deduce or extract a common characteristic to previous online behaviors of that end-user (e.g., Wendy had repeatedly browsed Red clothes on Amazon; Wendy had repeatedly voted for Red clothes when being asked by her friends to vote in online poles), and accordingly, may command the server of the current retailer or vendor to selectively display items (or, search results) that correspond to that particular common characteristics that were observed in previous browsing history of that end-user. Accordingly, when that user searches for a "jacket" on that retailer website, which she may have never visited in the past, due to the tracked history of her preferences on other websites, the User-Tracking Module 3341 operates the server to selectively show her search results of a "red jacket", and not merely of a "jacket". Optionally, the User-Tracking Module 3341 may utilize a sub-module that appends or adds adjective(s) or descriptors (e.g., "Red", "Yellow", "Flower", "Summer", "Long", Short") to search queries entered by the user, based on the previously-extracted characteristic(s) of the browsing history of that particular end-user; and such server-side "behind-the-scenes" modification of the search query (e.g., from "jacket" that the end-user typed, to "red jacket" or to "long jacket" based on her browsing history or online behavior) causes the server to modify accordingly the search results or the content shown to her. Optionally, the User-and-Product Combination-Image Generation Module 3314 may be triggered to cause further, that instead of displaying generic images of those products (e.g., of "red jacket" products), the server would generate and display composite images that depict the end-user herself being virtually-dressed with each one of those products or search-result items.

In some embodiments, the system may utilize Artificial Intelligence (AI) and/or Machine Learning (ML) and/or a Neural Network (NN) and/or a Bayesian Network, or other type of a User-Characteristics Deducing Module 3350, in order to "bridge the gap" between (or among) known parameters and unknown parameters, and/or in order to further deduce preferences of characteristics of the end-user Wendy. For example, Wendy had indicated (in a voting poll of Friend 1) that she prefers Pants 1, which are long green pants; and had also indicated (in a voting poll of Friend 2) that she prefers Skirt 5 (which is a short yellow skirt). The above-mentioned mechanisms, optionally utilizing a dataset of numerous other scenarios, and optionally utilizing firstly a training phase or a learning phase, may determine more complex rules of preferences that may be attributed to Wendy; such as, for example, that if the item is a Summer Season item then Wendy prefers yellow, whereas if the item is a Winter Season item then Wendy prefers green; and these preference rules may be applied by the system in order to select which search results to display to Wendy, or in which order, or which items on a home page or on a landing page to display to Wendy (or in which order).

In some embodiments, optionally, the User-Characteristics Deducing Module 3350 may operate by analyzing pre-defined Tags or Classification Descriptors that were pre-associated with various products or images or web-pages; for example, determining that the end-user has previously browsed a particular jacket that has a descriptor of a "jeans jacket", and later browsed a particular pants that have a description of "jeans pants", and thereby deducing that the common characteristic of "jeans" may be estimated to describe a preference of that end-user, and may be added to search queries or search results that are processed for that particular end-user. Other suitable determinations or insights may be deduced by the system, based on such second-degree user engagement in which the end-user had merely expressed her preferred option out of two or more options presented to her by a friend.

Card-Based Interface:

In some embodiments, one or more of the above-mentioned features may be implemented by utilizing a "card" or a card-based mechanism or interface.

For example, a collection of clothing articles that a blogger would like to present to her readers may be implemented as a Collection Card or as a Blog Card, enabling the content producer to select particular items, such that the system generates a short code-snippet or tag or script that in turn calls the functions that perform the display of the clothing item (with the virtual dressing) and the interactions of the end-user with it.

Similarly, a "wish list" card or tag may enable the content producer to efficiently and rapidly construct a wish-list type of content, enabling the end-user to browse (e.g., sideways) among the wished items that the content-producer had selected.

A "vlog" or "video blog" card may enable the content producer to construct a page that contains both a video (e.g., automatically stitched together from video-segments that correspond to items selected by the content producer) and an interface for browsing such items as images (e.g., virtually dressed on the image of the end-user who is browsing).

A "voting" card may enable an end-user to select two or more depictions of herself, being virtually-dressed with two (or more) respective items; and those depictions are presented to friends of that end-user to ask for their votes, which depiction is (or which depictions are) the most preferred ones by those friends. The voting card enables the friend to vote for preferred depictions, and further shows the accumulated votes for each depiction.

A mix-and-match card, or a Ribbon Interface card, enables a content producer to construct an interface that shows a central depiction of the end-user being virtually-dressed by an item (e.g., a shirt), with other shirts being shown on the right and/or on the left relative to the virtual dressed depiction, enabling the end-user to slide or swipe sideways in order to switch which shirt would be virtually dressed on the end-user's selfie image. Similarly, a secondary ribbon may be concurrently presented, enabling similar switching of another type of clothing article (e.g., pants); thereby enabling the end-user to efficiently create depictions of virtually-dressed combinations of various types of items.

In some embodiments, such "card" interface elements may be implemented by server-side code that resides on a server (e.g., able to perform the virtual dressing onto a selfie image), and/or by client-side code (e.g., utilizing HTML5+ CSS+JavaScript) that resides on the end-user device (e.g., enabling the capturing of swiping gestures that the end-user performed).

In some embodiments, the photo (e.g., the selfie photo) of the end-user who is browsing the retailer website or who is consuming content, may be the utilized for virtual-dressing of the image of the user onto or together with or in combination with one or more clothing articles and/or accessories; with the original background that surrounded the user in the original selfie photo (e.g., the user's kitchen, or bedroom, or office, or outdoor background) in order to enable the user to more easily imagine how he or she would look in that outfit in a particular setting or background; or, instead of the original background, a modified background (e.g., darker, lighter, having less items therein, or the like) or an augmented background may be created or used by the system for the virtual-dressing (e.g., only white or only solid color; a gradient of color(s), or the like), such as a pre-defined background that is relevant to the type of article being viewed, such as, for example, when the clothing article is a beach hat then the background may be automatically replaced with (or modified to) a beach background, or when the clothing article is a formal work suit then the background may be automatically replaced with (or modified to) an image of an office setting, or other suitable background that is visually relevant to that type of clothing article. In some embodiments, the replacement background or the modified background may be selected manually by the user from one or more options presented to her by the system, or may be automatically selected by the system based on one or more criteria (e.g., a beach background is selected based on the item's name or tag as "beach hat"; an office background is selected based on the item's name or tag as "work suit").

In some embodiments, the Cards elements may comprise not only or not necessarily items that are offered for sale online, but rather, may comprise items or images that the content-producer has selected from his own catalog of items or from his own inventory or belongings; for example, a Blogger in the field of fashion may efficiently define a Collection Card that features images of particular clothing articles that she has in her own home, which may not necessarily be offered for sale on the Internet or which may not necessarily have their image previously-posted elsewhere on the Internet. This may be used by such content-producer as part of a professional production of content; or, by an end-user that wishes to show one or more of her own items to friends or to third-parties, such as, for social sharing purposes, for blog publishing, for bragging or showing-off items to friends, for asking questions towards friends (e.g., "which one of these skirts looks best on me?"), and/or for other operations targeted towards personal analysis and/or optimization and/or improvement of one's existing closet or wardrobe. Accordingly, with the Ribbon(s) or Mix-and-Match interface of the present invention, as well as the video card and carousel car, a user may plan outfit for future events, may track past outfits, may optimize the utilization of sets of items that she already owns or that she plans to own (e.g., "which items of my collection can go together with my Green Scarf?"), may find new items that may complete or compliment her look together with existing item(s); such that the various Cards may be utilized for both commercial purposes, promotional purposes, content producing purposes, news-related purposes, personal purposes, advice obtaining purposes, outfit planning, outfit optimization, and/or other suitable purposes.

In some embodiments, Cards may optionally enable customization of one or more features of a particular clothing article; for example, switching between colors of the sleeves, changing collar type, changing part of the dress, folding a long sleeve to become shorter, unfolding an already-folded sleeve, opening a button or several buttons of a button shirt, zipping or unzipping of a zipper, or the like. For example, an image of a clothing article may be analyzed by the system, which may utilize computer vision to identify buttons or may utilize other parameters for this purpose (e.g., the item's name is "button shirt", or the item was tagged as "buttoned shirt"), and an image modification algorithm may create modified version of that clothing article which are suitable in view of the identified features (e.g., a first version with all buttons being closed; a second version with one button open; a third version with two buttons open); and the multiple versions may be offered to the user, for example via a carousel interface or a Ribbon interface which allows the user to switch the virtually-dressed depiction of herself among those three virtually-created versions of the same shirt. Such modification or customization may be performed by the system with regard to the clothing article by itself (e.g., over a white or solid-color background), or with regard to the clothing article worn by a model, or with regard to the clothing article being virtually-dressed on the end-user based on her own photograph.

In some embodiments, social sharing of cards or outfits or single items may be done via one or more social channels or social networks or sharing venues. Multiple looks or outfits or items may be shared, for example, by sharing the card itself (e.g., a link is sent to friends via one or more communication channels, and then the card is opened in a web browser for voting and suggestions of more looks), or by sharing a static image (e.g., a single JPG or PNG file) or a dynamic image (e.g., an Animated GIF file) having one or more looks (or items, or outfits) and a corresponding number (or identifier) on each one of the items or looks or outfits (e.g., to enable voting by the recipients, or to enable a recipient to respond to the sender with "I preferred Outfit number 3"). Such image may be shared in one or more communication channels (e.g., email, SMS, instant messaging, WhatsApp, Facebook, Tweeter, Pinterest, Instagram, or the like), and friends' comments may be sent or posted as responses or messages or comments to the original sharing method. Such images may be automatically and/or manually generated (e.g., enabling the user to manually select the looks or the outfits to be included in the final multi-outfits image that is shared with friends). The order of the outfits or items may be edited or modified manually by the user (e.g., dragging or moving item number 3 to become item number 1 in the grid or column or row), and other modifications may be performed by the user (e.g., adding a title or a question, adding a theme picture, adding the sender's name or nickname or photo, or the like).

Cards may be visually customized when integrated at a retailer's or a designer's websites or "app". For example, if a retailer (e.g., Amazon.com) desires to integrate the "mix & match" function but also wants it to have the look and feel of its overall website and app, then the entire look and feel of the card may be visually customized or modified in order to carry or to reflect the host's graphical language or elements, such as the theme or style (e.g., rounded corners or sharp corners; color of navigation arrows; using arrows or triangles to indicate swiping directions; or the like); whereas the functionality of showing multiple items in a carousel or with a dynamic video or with a mix-and-match interface as well as the virtual dressing up and size/fit recommendations may remain the same or generally the same.

In some embodiments, any one of the Cards may be (or may turn into) a "shoppable card", such that the card may include a purchasing function which enables a consumer to purchase one or more of the items (e.g., optionally at the recommended or suggested size/fit if they wish) directly from the interface of the card itself and not necessarily by being redirected to another selling page (e.g., hosted in another online store). This makes the purchasing process faster and easier for the consumer, and drives more frequent purchases for retailers.

The above-mentioned functionalities associated with Cards may be implemented, for example, using a Card Generating Module 3361 that is utilized by the creator of such Card (e.g., a blogger, a video blogger, a content publisher); as well as by a Card Display and Interactions Module 3362 that operates to display the actual Card and its content to the end-user, to capture or collect or receive user-interactions, and to modify the content of the Card (or other on-screen elements) in response.

For example, the Card Generating Module 3361 enables a content creator (e.g., blogger, video blogger, publisher, author) to utilize a step-by-step wizard to firstly select which type of Card he wishes to create (e.g., a Poll/Survey card or a Voting Card; a Video Blog card; a Ribbon card; a Carousel card; a Wish-List Card or Wishlist Card; a Collection Card; or the like), from a pre-defined list of card types. Once the content creator selects a card type, the Card Generating Module 3361 further receives from the content creator a user-image that may be processed into a user-mask utilizing the User-Mask Generating Module 3313. The Card Generating Module 3361 further receives a list of identifiers of products and/or images that would be utilized in this specific card (e.g., a list of URLs or URIs or SKU numbers for particular shirts on Gap.com, or on multiple different websites of different vendors; or a list of web-pages or online product-pages); and the Card Generating Module 3361 proceeds to obtain or download or extract the product image, and optionally also textual description, of each such item or product. This operation may include utilizing the Product-Mask Generating Module 3313 to generate a product mask for each product image. References (e.g., links, directory and file names, URLs, URIs, resource locators, shortcuts, or other types of reference data-items) to the product images (and/or to their respective product-masks) and optional textual descriptions (e.g., product name, product maker/vendor, product price, product features) may be placed or added inside a pre-defined template of program code which implements the functionality of that specific card, such as a poll or survey functionality, a video playback functionality, an implementation of a ribbon GUI element or of a rotatable carousel of products, or other functionality that is implemented as a Card Display and Interactions Module 3362; and the modified or updated program code is stored on a remote server of the system, and is assigned a Card ID number or other unique identifier or resource locator. The Card Generating Module 3361 then generates a short program code or script, that is presented or sent to the content creator, to be copied and pasted or otherwise integrated or inserted into the publishing medium of the content creator; which in turn calls the longer program code at the remote server, which implements and executes the Card Display and Interactions Module 3362 (or a local copy thereof, or a remote copy thereof) towards or within the electronic device of the end-user consumer that accesses or visits the published content, or which causes the end-user device (or its web-browser, or an application or "app" therein) to download and/or execute the code that causes local presentation and operation of the relevant Card functionality. The Card Display and Interactions Module 3362 may utilize the User-and-Product Combination-Image Generation Module 3314 to generate composite images, with each one of the composite images depicting one of the products being virtually-dressed by a user.

As demonstrated in the non-limiting examples of FIG. 36 to FIG. 48, a variety of functional on-screen card-based elements may be generated, displayed, and operated; such that each such Card may comprise at least one composite specifically-tailored user-and-product image, or multiple such images, in accordance with the present invention.

Figure 36:
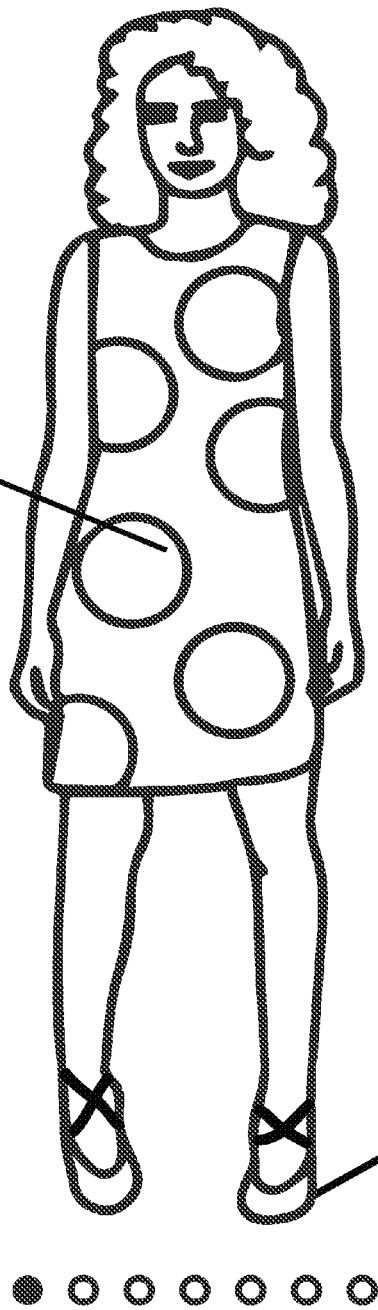
FIG. 36 is a schematic illustration demonstrating a screen of a Collection Card, which may be generated, displayed, and operated in accordance with some demonstrative embodiments of the present invention.

Reference is made to FIG. 36, which is a schematic illustration demonstrating a screen 3600 of a Collection Card, which may be generated, displayed, and operated in accordance with some demonstrative embodiments of the present invention.

Figure 37:
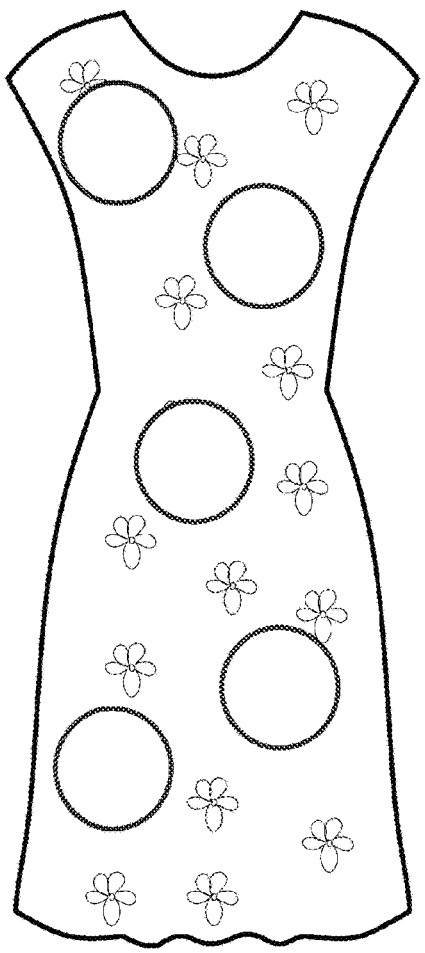
FIG. 37 is a schematic illustration demonstrating another screen of a Collection Card, which may be generated, displayed, and operated in accordance with some demonstrative embodiments of the present invention.

Reference is made to FIG. 37, which is a schematic illustration demonstrating another screen 3700 of a Collection Card, which may be generated, displayed, and operated in accordance with some demonstrative embodiments of the present invention.

Figure 38:
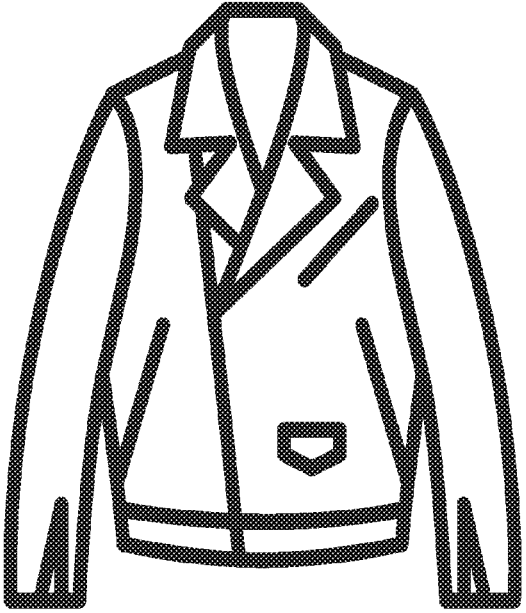
FIG. 38 is a schematic illustration demonstrating another screen of a Collection Card, which may be generated, displayed, and operated in accordance with some demonstrative embodiments of the present invention.

Reference is made to FIG. 38, which is a schematic illustration demonstrating another screen 3800 of a Collection Card, which may be generated, displayed, and operated in accordance with some demonstrative embodiments of the present invention.

Reference is made to FIG. 39, which is a schematic illustration demonstrating another screen 3900 of a Collection Card, which may be generated, displayed, and operated in accordance with some demonstrative embodiments of the present invention.

Reference is made to FIG. 40, which is a schematic illustration demonstrating a screen 4000 of a Collection Card or a Feed Card, which may be generated, displayed, and operated in accordance with some demonstrative embodiments of the present invention.

Figure 41:
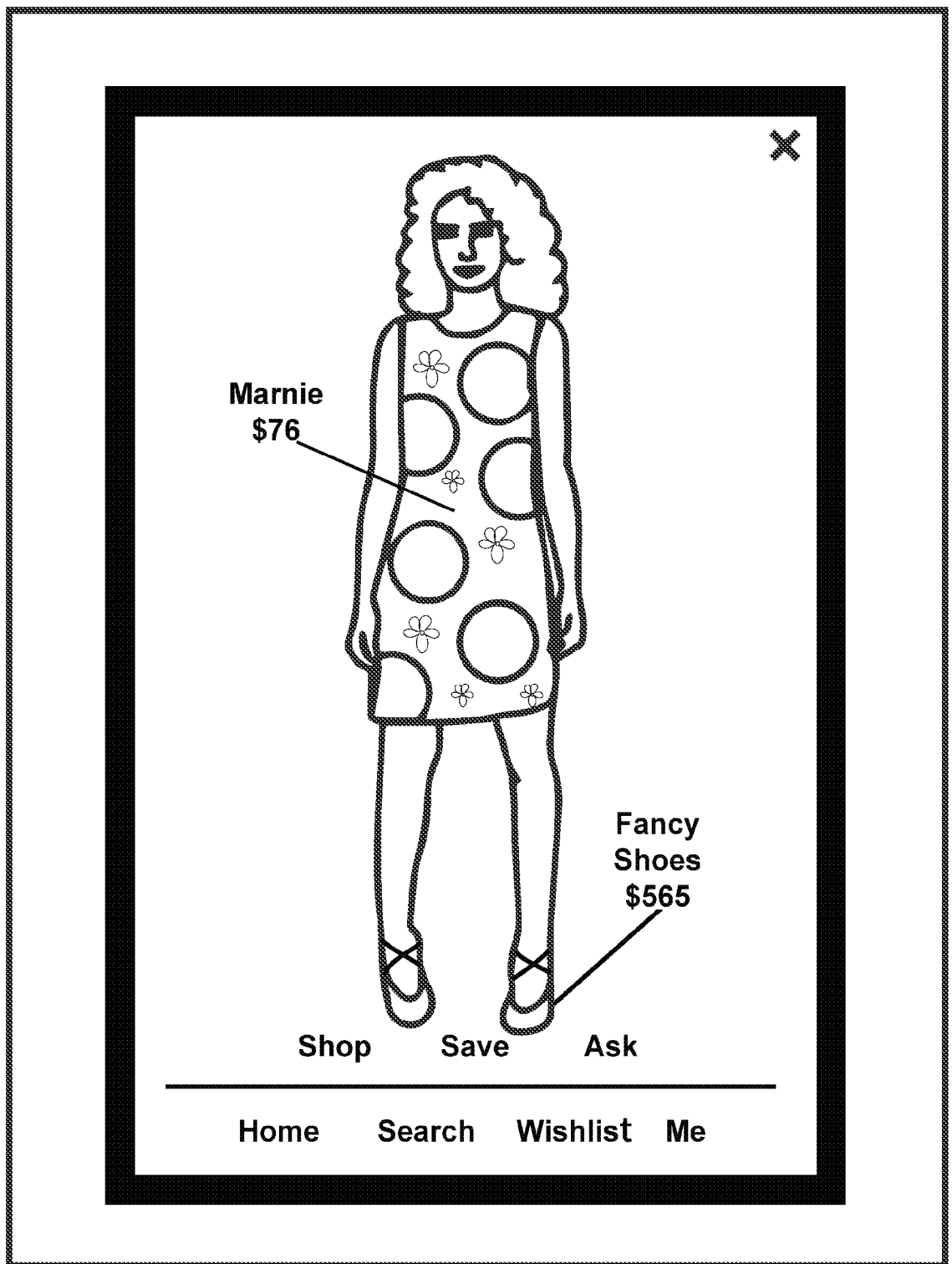
FIG. 41 is a schematic illustration demonstrating a screen of a Collection Card or a Feed Card, which may be generated, displayed, and operated in accordance with some demonstrative embodiments of the present invention; and particularly showing a virtually-dressed user in response to a long-press of the user of an electronic device.

Reference is made to FIG. 41, which is a schematic illustration demonstrating a screen 4001 of a Collection Card or a Feed Card, which may be generated, displayed, and operated in accordance with some demonstrative embodiments of the present invention; and particularly showing a virtually-dressed user in response to a long-press of the user of an electronic device.

Referring to FIGS. 36 to 41, a Collection Card enables a user to rapidly and efficiently show her collection of products, such as, a collection of products (e.g., that she owns, or bought, or considers to buy, or wishes to own, or recommends to others, or reviews); and instead of merely showing those products in their generic form, the Collection Card shows them being virtually-dressed, either on her own image, or on an image of another person of her choice (e.g., a particular model or celebrity or friend). The Collection Card enables the user to select product identifiers; to add product descriptions, or to request the system to automatically obtain or fetch or extract such product descriptions (e.g., product name, maker, vendor, current price, previous price, or the like), and to display one product, or several products, being virtually-worn by the particular user (or person) as indicated by the creator of the Collection Card. Optionally, the creator of the Collection Card may command the system in advance, that every end-user that views the Collection Card, would actually view his own image being virtually-dressed in each one of the selected products, rather than seeing the creator-user's image or the third-person image that she selected; and this may optionally be conditioned upon the end-user having already uploaded or captured his own self-image for this purpose or for other virtual-dressing purposes. Optionally, the Collection Card may display virtually-dressed images in a compact or form-factor friendly manner; for example, using a rotatable or scrollable interface in which some but not all of the images are shown at once. The Collection Card further enables the end-user to share or to save an image of a virtually-worn product; and/or to "ask a friend" for her advice with regard to a particular virtually-worn product. Once the end-user clicks or taps or selects one of the displayed products, an enlarged or substitute version thereof may be shown, with additional details about it (e.g., available sizes and colors; recommended size; textual description), and with an interface to purchase that product online.

In some embodiments, the Collection Card may optionally be implemented as a Feed Card, which integrates with an ongoing or streaming or generally-continuous feed of virtually-dressed items, or which integrates with a feed of other published items (e.g., posts, blog entries, or the like).

Figure 42:
FIG. 42 is a schematic illustration demonstrating a screen of a Feed Card or a Mix-and-Match Card, which may be generated, displayed, and operated in accordance with some demonstrative embodiments of the present invention.

Reference is made to FIG. 42, which is a schematic illustration demonstrating a screen 4002 of a Feed Card or a Mix-and-Match Card, which may be generated, displayed, and operated in accordance with some demonstrative embodiments of the present invention.

Reference is made to FIG. 43, which is a schematic illustration demonstrating a screen 4003 of a Feed Card or a Mix-and-Match Card, which may be generated, displayed, and operated in accordance with some demonstrative embodiments of the present invention, and particularly showing an expanded item of a previous set of products that were previously shown as virtually-dressed on the user.

Figure 44:
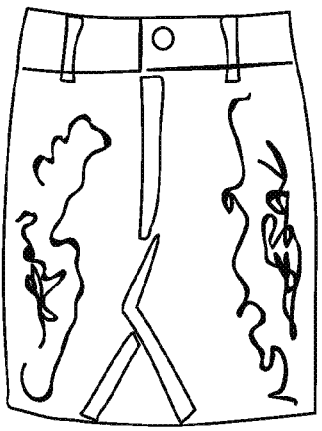
FIG. 44 is a schematic illustration demonstrating another screen of a Feed Card or a Mix-and-Match Card, which may be generated, displayed, and operated in accordance with some demonstrative embodiments of the present invention, and particularly showing another expanded item of a previous set of products that were previously shown as virtually-dressed on the user.

Reference is made to FIG. 44, which is a schematic illustration demonstrating another screen 4004 of a Feed Card or a Mix-and-Match Card, which may be generated, displayed, and operated in accordance with some demonstrative embodiments of the present invention, and particularly showing another expanded item of a previous set of products that were previously shown as virtually-dressed on the user.

Referring to FIGS. 42 to 44, creation and embedding (or otherwise insertion) of a Mix-and-Match card enables the end-user to virtually try-on various items, on her own self-image, out of a pre-defined list of products that the card-creator had selected in advance. For example, the card-creator selects a list of five shirts and seven skirts, and provides their resource locators to the suitable card-creation module. Once the program code for the Card is created, and later served to or invoked by the end-user, the Card shows one or more Ribbon interface elements which enable the end-user to mix-and-match those items (skirts, shirts) out of the inventory pre-selected by the card-creator, similar to the manner in which a stand-alone Ribbon interface operates, as discussed above. Alternatively, the Mix-and-Match Card may be implemented without an active Ribbon interface, but rather, by displaying to the end-user a list or a carousel or a gallery of pre-selected or pre-generated composite images of those pre-selected products being virtually-dressed, on the card-creator's image or on an image of a third-party of her choice (e.g., model, celebrity, friend). The Mix-and-Match Card may similarly provide functionalities for sharing and saving, as well as for consulting with a friend regarding a particular item; and for placing an online order to purchase a product shown in the Mix-and-Match Card.

Reference is made to FIG. 45, which is a schematic illustration demonstrating a screen 4005 of a Wish-List Card, which may be generated, displayed, and operated in accordance with some demonstrative embodiments of the present invention.

Reference is made to FIG. 46, which is a schematic illustration demonstrating another screen 4006 of a Wish-List Card, which may be generated, displayed, and operated in accordance with some demonstrative embodiments of the present invention.

Figure 47:
FIG. 47 is a schematic illustration demonstrating another screen of a Wish-List Card, which may be generated, displayed, and operated in accordance with some demonstrative embodiments of the present invention.

Reference is made to FIG. 47, which is a schematic illustration demonstrating another screen 4007 of a Wish-List Card, which may be generated, displayed, and operated in accordance with some demonstrative embodiments of the present invention.

Referring to FIGS. 45 to 47, the Wish-List (or Wishlist) Card enables a user to rapidly and efficiently create (and publish or share) a wish-list of products that the card-creator wishes to own or to recommend; by selecting the products from an online catalog or from one or more websites, and providing product identifiers to the card-creation module of the system, which in turn generates the program code for creating and operating the Wish-List Card. The end-user device would then show to the end-user the wish-list of products; but instead of showing merely a gallery of generic products, the end-user would see a gallery of those multiple products being virtually-worn by the card-creator, or by a third-person of her choice, or even by the viewing end-user himself (if he had provided his self-image in the past for virtual-dressing purposes); thereby providing and injecting an entirely new user experience to the process of sharing a wish-list with friends.

Reference is made to FIG. 48, which is a schematic illustration demonstrating a screen 4008 of a Voting Card, which may be generated, displayed, and operated in accordance with some demonstrative embodiments of the present invention.

For example, a user may select multiple products; may request the system to generate multiple composite images of herself wearing each one of these products; and may share with friends the set of images of herself being virtually-dressed with each one of those products, enabling the friends to vote or upvote or downvote particular image(s) out of the shown options. The system counts and aggregates the votes (or, in some embodiments, the upvotes minus the down-votes), and presents to the card-creator (and optionally also to the friends as end-users) the current voting results in a real-time manner; thereby injecting an entirely new user experience to the process of asking friends which article of clothing makes a person look better or best.

The above-mentioned Cards are non-limiting examples; other Cards may be implemented in accordance with the present invention; and features or functionalities of two (or more) different Cards may actually be integrated into a single Card, in some implementations.

In some embodiments, a computerized method comprises: obtaining a user-image of a user of an electronic device; generating a user-mask image that corresponds to said user-image processed to exclude background image-data of said user-image; receiving a product-image of a particular product, and generating from said product-image a product-mask image that corresponds to said product-image processed to exclude background image-data of said product-image; receiving said product-mask image and said user-mask image, and generating from them a combined user-and-product image that depicts said user engaging with said product.

In some embodiments, the method comprises: receiving a plurality of search results in response to a user query that searches for a product; modifying each of said search results by replacing each of said search results with a combination image that depicts said user engaging with said product.

In some embodiments, the method comprises: receiving a user-query for a clothing article; generating a plurality of image-based search results in response to said user-query, wherein each image-based search result corresponds to a different instance of said clothing article; modifying each image-based search result into a combined image that depicts a combination of said user wearing said instance of the clothing article; presenting to said user a set of image-based search results, wherein each image-based search result comprises a combined image that depicts the combination of said user wearing said instance of the clothing article.

In some embodiments, the method comprises: receiving multiple product-identifiers of multiple respective products; based on said multiple product-identifiers, extracting a group of images corresponding to said products; for each of said images, generating a combined user-and-product image depicting said user engaging with said product; generating an on-screen interactive carousel interface that comprises a rotatable group of combined user-and-product images of said multiple products.

In some embodiments, the method comprises: in response to a user command to scroll said on-screen interactive carousel interface, causing at least one of said combined user-and-product images to be hidden, and causing at least one new combined user-and-product images to be displayed.

In some embodiments, the method comprises: receiving multiple pointers of multiple respective products; based on said multiple pointers, extracting a group of images corresponding to said products; generating a first combined user-and-product image, which depicts said user being virtually dressed by a first product; displaying the first combined user-and-product image, and further displaying at least a second product having same functionality of said first product; receiving a user command to virtually swap said first product with said second product, and in response: generating a second combined user-and-product image which depicts said user being virtually dressed by the second product; and displaying the second combined user-and-product image instead of the first user-and-product image.

In some embodiments, the method is implemented via an on-screen interactive ribbon that is rotatable by said user to indicate a user request for virtual swap of products.

In some embodiments, the method is implemented via at least two separate on-screen interactive ribbons that are rotatable by said user to indicate a user request for virtual swap of products; wherein user interaction with a first on-screen interactive ribbon causes the method to generate and display a first new combined user-and-product image in which a first body-part of the user is virtually dressed with the first product; wherein user interaction with a second on-screen interactive ribbon causes the method to generate and display a second new combined user-and-product image in which a second body-part of the user is virtually dressed with the second product.

In some embodiments, the method comprises: receiving user-input indicating whether to virtually stitch image-portions of combined user-and-product images via a first image-stitching process or via a second image-stitching pattern; based on said user-input, applying either the first image-stitching process or the second image-stitching process to stitch together a first image-portion and a second image portion and to depict said user wearing two different products on two different body parts.

In some embodiments, the method comprises: storing a list that associates between (i) a particular video, (ii) a particular time-segment of said particular video, (iii) an associated product that is depicted in said video during said particular time-segment; during playback of said video, at said particular time-segment, and independent of any user interaction, modifying a content that is displayed outside said video to show information about said associated product.

In some embodiments, the method comprises: storing a list that associates between (i) a particular video, (ii) a particular time-segment of said particular video, (iii) a particular spatial-area of said video, (iv) an associated product that is depicted in said video during said particular time-segment; during playback of said video, detecting a user-interaction with said particular spatial-area of said video during said particular time-segment of said video; and in response, displaying to said user information about said associated product.

In some embodiments, the method comprises: during a playback of a video, displaying externally to said video information about a particular product during a particular time-segment of said video, based on a pre-defined timing scheme that associates between time-segments of said video and multiple different products.

In some embodiments, the method comprises: during a playback of a video, displaying externally to said video information about a particular product during a particular time-segment of said video, based on a pre-defined heat map that associates between different spatial-areas of said video and multiple different products; wherein said displaying is performed in response to a user interaction with a particular spatial-area of said video; wherein the user interaction comprises one or more of a click event, a tap event, a hover event.

In some embodiments, the method comprises: storing a list that associates between (i) a particular video, (ii) a particular time-segment of said particular video, (iii) an associated product that is depicted in said video during said particular time-segment; during playback of said video, at said particular time-segment, and independently of any user interaction, modifying a content that is displayed outside said video to show a dynamically-generated combined user-and-product image that depicts said user wearing said product.

In some embodiments, the method comprises: storing a pre-defined timing scheme that associates between time-segments of a video and multiple different products; during playback of said video, and based on said timing scheme, and independently of any user interactions, displaying externally to said video a combined user-and-product image that depicts said user wearing one particular product of said different products.

In some embodiments, the method comprises: receiving user selection of multiple products; obtaining from a video repository multiple video segments, wherein each video segment depicts one of said product being utilized by a person; joining said multiple video segments into a combined video clip; causing said video clip to playback on an electronic device.

In some embodiments, the method comprises: at a first website, receiving a self-image from said user; tracking online operations of said user across multiple websites; subsequently, during a first-ever visit of said user to a second website, generating and displaying to said user a combined image of said user being virtually dressed with a product sold on said second website.

In some embodiments, the method comprises: at a first website, receiving a self-image from said user; tracking online operations of said user across multiple websites; subsequently, during a first-ever visit of said user to a second website, generating and displaying to said user a user-specific landing page which comprises multiple images, wherein each image is a combined image of said user being virtually dressed with a different product that is sold on said second website.

In some embodiments, the method comprises: at a first website, receiving a self-image from said user; tracking online operations of said user across multiple websites; subsequently, receiving from said user a search query; obtaining a set of image search results to said search query; modifying each image search query into a combined user-and-product image; and displaying to said user in response to said search query a set of modified image search results wherein each image search result depicts said user being virtually dressed with a different product.

In some embodiments, the method comprises: at a first website, receiving a self-image from said user; tracking online operations of said user across multiple websites, and extracting at least one common characteristic from said online operations of said user across multiple websites; subsequently, at a second website, automatically selecting a particular product that has said at least one common characteristic, and displaying on said website a combined image that depicts said user engaging with said particular product.

In some embodiments, said at least one common characteristic is inferred by analyzing responses of said user to third-party requests to select a preferred image out of two or more images presented to said user.

In some embodiments, the method comprises: receiving multiple product-identifiers of multiple respective products; based on said multiple product-identifiers, extracting a group of images corresponding to said products; generating a group of combined user-and-product images, wherein each combined image depicts said user being virtually dressed by a different product; generating program code that, when executed by an electronic device, causes said electronic device to dynamically generate an on-screen interface that enables a user to interact with at least one image of said group of combined user-and-product images.

In some embodiments, the method comprises: receiving multiple product-identifiers of multiple respective user-selected products that were selected by a first user via a first electronic device; based on said multiple product-identifiers, extracting a group of images corresponding to said products; generating a group of combined user-and-product images, wherein each combined image depicts said first user being virtually dressed by a different product; causing a second electronic device, operated by a second user, to display said group of combined user-and-product images; receiving from said second user, via said second electronic device, an indication of which combined image said second user prefers; and causing said first electronic device to notify said first user which combined image said second user prefers.

In some embodiments, the method comprises: receiving multiple product-identifiers of multiple respective user-selected products that were selected by a first user via a first electronic device; based on said multiple product-identifiers, extracting a group of images corresponding to said products; generating a group of combined user-and-product images, wherein each combined image depicts said first user being virtually dressed by a different product; causing multiple other electronic devices, operated by multiple other users, to display said group of combined user-and-product images; receiving from said multiple other users, via said multiple other electronic devices, indication of which combined image each one of said other users prefers; aggregating indications of users who prefer same combined image, and generating and displaying voting results with regard to said group of combined user-and-product images.

In some embodiments, the method comprises: receiving multiple product-identifiers of multiple respective user-selected products that were selected by a first user via a first electronic device; based on said multiple product-identifiers, extracting a group of images corresponding to said products; generating a group of combined user-and-product images, wherein each combined image depicts said first user being virtually dressed by a different product; generating a wish-list of products associated with said first user, wherein the wish-list comprises said group of combined user-and-product images; transferring to a second electronic device a shortcut that causes said second electronic device to display to a second user said wish-list of the first user which comprises said group of combined user-and-product images.

Some embodiments may comprise a non-transitory storage medium having stored thereon instruction that, when executed by a machine, cause the machine to perform a method in accordance with the present invention.

The system(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic sensor(s), optical sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules. The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device. Functions, operations, components and/or features described herein with reference to one or more embodiments of the present invention, may be combined with, or may be utilized in combination with, one or more other functions, operations, components and/or features described herein with reference to one or more other embodiments of the present invention.

The present invention may thus comprise any possible or suitable combinations, rearrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
one or more processors; and
one or more non-transitory computer-readable media storing computing instructions that, when executed on the one or more processors, cause the one or more processors to perform operations comprising:
generating a first search result comprising a first item in response to a first user query;
generating two or more second search results comprising two or more second items in response to two or more second user queries, wherein the two or more second user queries are for items of one or more different kinds from the first user query;

after generating the first search result and the two or more second search results, modifying the first search result by generating a combination image that depicts subject matter engaging with the first item of the first search result and at least one of the two or more second items of the two or more second search results; and generating one or more user interface elements to be displayed in conjunction with the combination image, wherein the one or more user interface elements enable a user to perform one or more operations, wherein the one or more operations comprises one or more of accessing a source of the first item, adding the first item to a shopping cart, and purchasing the first item, wherein the combination image comprises one or more of two-dimensional images, three-dimensional images, three-dimensional models, videos, or animations, wherein the combination image incorporates a background of an image of a user-defined subject matter, and wherein the subject matter comprises the user-defined subject matter.

2. The system of claim 1, wherein:

the first search result further comprises a plurality of first search results that each depict a respective different instance of the first item; and the combination image comprises a plurality of combination images, each of which is generated for a different one of the plurality of first search results to produce the user-defined subject matter engaging with different ones of the respective different instances of the first item.

3. The system of claim 2, wherein:

the user-defined subject matter comprises a person, a place, or a thing;

the person comprises the user and a user-selected third party;

the first item comprises an item worn by the user and the user-selected third party;

the first item is selected from the group consisting of clothing articles, accessories, and other items worn by the person;

the accessories are selected from the group consisting of jewelry, eyewear, cosmetics, timepieces, piercing items, purses, bags, hand bags, suitcases, and other carriables;

the place or the thing is selected from the group consisting of indoor structures, outdoor structures, and locations;

the first item further comprises an item that can be placed on or in the indoor structures, the outdoor structures, and the locations; and the first item is further selected from the group consisting of furniture, carpeting, and pieces of art.

4. The system of claim 3, wherein:

the user-defined subject matter is defined by receiving an input that comprises an image of the user-defined subject matter; and the user-defined subject matter is defined by receiving an input that comprises a specification of one or more characteristics of the user-defined subject matter.

5. The system of claim 1, wherein:

the first item is a clothing article, accessory, or other item that can be worn by a person;

the first search result further comprises one or more image-based search results that each depict a different instance of the first item; and the combination image is generated for the one or more image-based search results to produce one or more respective combination images that each depict the user wearing one of the different instances of the first item.

6. The system of claim 5, wherein the computing instructions, when further executed on the one or more processors, further cause the one or more processors to perform an operation comprising:

modifying the combination image in response to receiving an input to switch from a first user-defined subject matter engaging with the first item to a second user-defined subject matter engaging with the first item, wherein modifying the combination image comprises calibrating, normalizing, and resizing of the one or more image-based search results, and wherein the subject matter comprises the first user-defined subject matter.

7. The system of claim 1, wherein the first item comprises clothing and wherein information is used to limit the first search result based on a clothing size or a clothing style.

8. The system of claim 1, wherein:

the one or more user interface elements further comprise one or more link elements for enabling the user to perform the one or more operations involving the first item displayed in the combination image.

9. The system of claim 1, wherein the computing instructions, when further executed on the one or more processors, further cause the one or more processors to perform an operation comprising:

filtering the first search result or the first user query based on information determined from computer image-analysis of a user-specified image that depicts a user-defined subject matter.

10. The system of claim 9, wherein:

the user-defined subject matter comprises a person, a place or a thing;

the information determined from the computer image-analysis of the user-specified image comprises information about one or more size dimensions of the person, the place, or the thing; and the first search result or the first user query is modified to exclude items that are not compatible with or relevant to the one or more size dimensions.

11. A method being implemented via execution of computing instructions configured to run on one or more processors and stored at one or more non-transitory computer-readable media, the method comprising:

generating a first search result comprising a first item in response to a first user query;

generating two or more second search results comprising two or more second items in response to two or more second user queries, wherein the two or more second user queries are for items of one or more different kinds from the first user query;

after generating the first search result and the two or more second search results, modifying the first search result by generating a combination image that depicts subject matter engaging with the first item of the first search result and at least one of the two or more second items of the two or more second search results; and generating one or more user interface elements to be displayed in conjunction with the combination image, wherein the one or more user interface elements enable a user to perform one or more operations, wherein the one or more operations comprises one or more of accessing a source of the first item, adding the first item to a shopping cart, and purchasing the first item, wherein the combination image comprises one or more of two-dimensional images, three-dimensional images, three-dimensional models, videos, or animations, wherein the combination image incorporates a background of an image of a user-defined subject matter, and wherein the subject matter comprises the user-defined subject matter.

12. The method of claim 11, wherein:
the first search result further comprises a plurality of first search results that each depict a respective different instance of the first item; and
the combination image comprises a plurality of combination images, each of which is generated for a different one of the plurality of first search results to produce the user-defined subject matter engaging with different ones of the respective different instances of the first item.

13. The method of claim 12, wherein:
the user-defined subject matter comprises a person, a place, or a thing;
the person comprises the user and a user-selected third party;
the first item comprises an item worn by the user and the user-selected third party;
the first item is selected from the group consisting of clothing articles, accessories, and other items worn by the person;
the accessories are selected from the group consisting of jewelry, eyewear, cosmetics, timepieces, piercing items, purses, bags, hand bags, suitcases, and other carriables;
the place or the thing is selected from the group consisting of indoor structures, outdoor structures, and locations;
the first item further comprises an item that can be placed on or in the indoor structures, the outdoor structures, and the locations; and
the first item is further selected from the group consisting of furniture, carpeting, and pieces of art.

14. The method of claim 13, wherein:
the user-defined subject matter is defined by receiving an input that comprises an image of the user-defined subject matter; and
the user-defined subject matter is defined by receiving an input that comprises a specification of one or more characteristics of the user-defined subject matter.

15. The method of claim 11, wherein:
the first item is a clothing article, accessory, or other item that can be worn by a person;
the first search result further comprises one or more image-based search results that each depict a different instance of the first item; and
the combination image is generated for the one or more image-based search results to produce one or more respective combination images that each depict the user wearing one of the different instances of the first item.

16. The method of claim 15, further comprising:
modifying the combination image in response to receiving an input to switch from a first user-defined subject matter engaging with the first item to a second user-defined subject matter engaging with the first item, wherein modifying the combination image comprises calibrating, normalizing, and resizing of the one or more image-based search results, and wherein the subject matter comprises the first user-defined subject matter.

17. The method of claim 11, wherein the first item comprises clothing and wherein information is used to limit the first search result based on a clothing size or a clothing style.

18. The method of claim 11, wherein:
the one or more user interface elements further comprise one or more link elements for enabling the user to perform the one or more operations involving the first item displayed in the combination image.

19. The method of claim 11, further comprising:
filtering the first search result or the first user query based on information determined from computer image-analysis of a user-specified image that depicts a user-defined subject matter.

20. The method of claim 19, wherein:
the user-defined subject matter comprises a person, a place or a thing;
the information determined from the computer image-analysis of the user-specified image comprises information about one or more size dimensions of the person, the place, or the thing; and
the first search result or the first user query is modified to exclude items that are not compatible with or relevant to the one or more size dimensions.

* * * * *